United States Patent [19]

Kojima et al.

[11] Patent Number: 5,259,000
[45] Date of Patent: Nov. 2, 1993

[54] MODULATOR-DEMODULATOR APPARATUS AND SYSTEM

[75] Inventors: Yasuyuki Kojima; Yasushi Yokosuka, both of Hitachi; Takeshi Shimanuki, Hadano; Kazuhiko Takaoka, Yokohama; Yukihito Ishihara, Oume, all of Japan

[73] Assignee: Hitachi, Ltd., Tokyo, Japan

[21] Appl. No.: 236,917

[22] Filed: Sep. 23, 1988

[30] Foreign Application Priority Data

Aug. 26, 1987 [JP] Japan .................. 62-210106
Sep. 24, 1987 [JP] Japan .................. 62-237529

[51] Int. Cl.$^5$ .............................................. H04B 1/38
[52] U.S. Cl. ............................................ 375/8; 375/121
[58] Field of Search ................... 375/7, 8, 9, 121; 370/13, 85.1; 340/825.06, 825.12; 379/93

[56] References Cited

U.S. PATENT DOCUMENTS

| | | | |
|---|---|---|---|
| 4,085,449 | 4/1978 | Walsh et al. | 375/8 |
| 4,119,803 | 10/1978 | Jacob | 370/13 |
| 4,387,440 | 6/1983 | Eaton | 370/18 |
| 4,425,664 | 1/1984 | Sherman et al. | 375/8 |
| 4,425,665 | 1/1984 | Stauffer | 375/9 |
| 4,518,823 | 5/1985 | Kessler | 375/8 |
| 4,620,294 | 10/1986 | Leung et al. | 375/8 |
| 4,751,510 | 6/1988 | de Saint Michel et al. | 375/8 |
| 4,782,498 | 11/1988 | Copeland, III | 375/121 |
| 4,811,358 | 3/1989 | Smedley et al. | 375/8 |
| 4,912,723 | 3/1990 | Verbanets, Jr. | 375/7 |

OTHER PUBLICATIONS

Nagal et al "A Signal Processor For Voice Band Application" 1988 IEEE International Solid State Circuit Conf. pp. 260-261.
YM3418 MD96FX (9600 bps Fax Modem Lis) printed in Japan 1988 Jan.

Primary Examiner—Stephen Chin
Attorney, Agent, or Firm—Antonelli, Terry, Stout & Kraus

[57] ABSTRACT

In a MODEM having modulation and demodulation circuits and a circuit for controlling the modulation and demodulation, a modulator-demodulator apparatus includes a register for accepting a macro-instruction from an external source; a circuit for interpreting and executing the macro-instruction; and a circuit for outputting a response to the macro-instruction, whereby the MODEM is controlled in response to the macro-instruction accepted from the outside source. The modulator-demodulator apparatus is suitably integrated over a single semiconductor substrate.

28 Claims, 44 Drawing Sheets

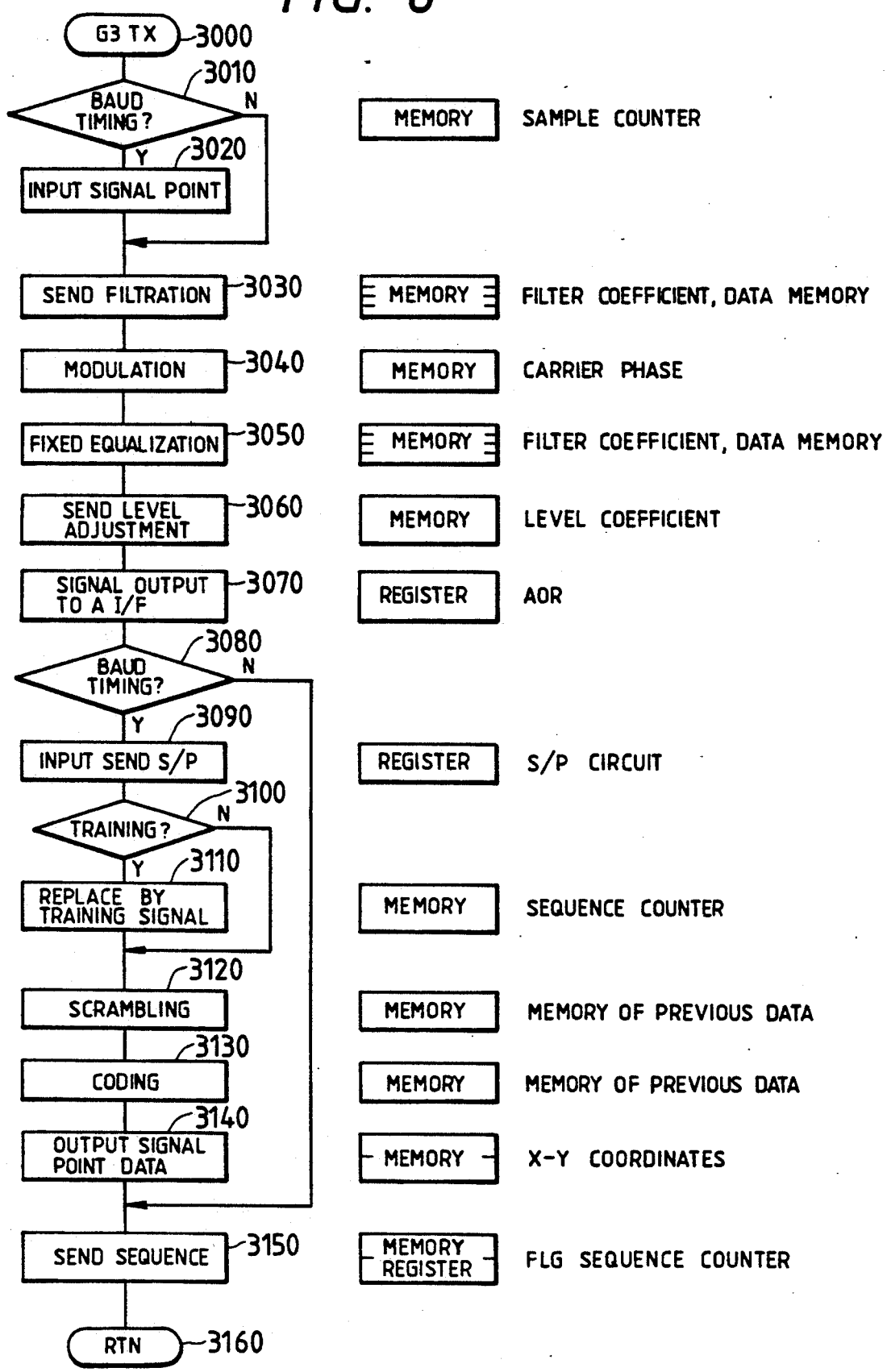

FIG. 10

| KIND | VARIETY | FORMAT | OPE | | | | OPERAND | | | | | | | | | | | |
|---|---|---|---|---|---|---|---|---|---|---|---|---|---|---|---|---|---|---|
| | | | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| EXECUTION CONTROL INSTRUCTION | STRQ | OPE | 0 | 0 | 0 | 0 | | | | | | | | | | | | |
| | CTL | OPE | 0 | 0 | 0 | 1 | RXE | RTS | TAPH | TRD | | | | | | | | |
| | STP | OPE | 0 | 0 | 1 | 0 | | | | | | | | | | | | |
| | ⋮ | OPE | | | | | | | | | | | | | | | | |
| | EO | OPE | 0 | 1 | 0 | 0 | | | | | | | | | PO 3 | 2 | 1 | 0 |
| | DMA | OPE | 0 | 1 | 0 | 1 | R/W | 10 | 9 | 8 | 7 | 6 | 5 | 4 | 3 | 2 | 1 | 0 |
| | RST | OPE | 0 | 1 | 1 | 1 | | | | | | | | | | | | |
| MODE SETTING INSTRUCTION | CONFIG | OPE | 1 | 0 | 0 | 0 | | | | | MMD 1 | 0 | MCS 3 | 2 | 1 | 0 | P/S | |
| | PARM 1 | OPE | 1 | 0 | 0 | 1 | | | EPT | PF | HD 1 | 0 | LOOP 1 | 0 | f* 2 | 1 | 0 | |
| | RARM 2 | OPE | 1 | 0 | 1 | 0 | | TX LEVEL 4 | 3 | 2 | 1 | 0 | RX LEVEL 4 | 3 | 2 | 1 | 0 | |
| | RARM 3 | OPE | 1 | 0 | 1 | 1 | TAEQL 2 | 1 | 0 | TDEQL 2 | 1 | 0 | RAEQL 2 | 1 | 0 | RDEQL 2 | 1 | 0 |
| OTHERS | STR | f* | 7 | 6 | 5 | 4 | 3 | 2 | 1 | 0 | TD 1 | 0 | F LD | S QD | PI 3 | 2 | 1 | 0 |
| | DATA | DATA | 15 | 14 | 13 | 12 | 11 | 10 | 9 | 8 | 7 | 6 | 5 | 4 | 3 | 2 | 1 | 0 |

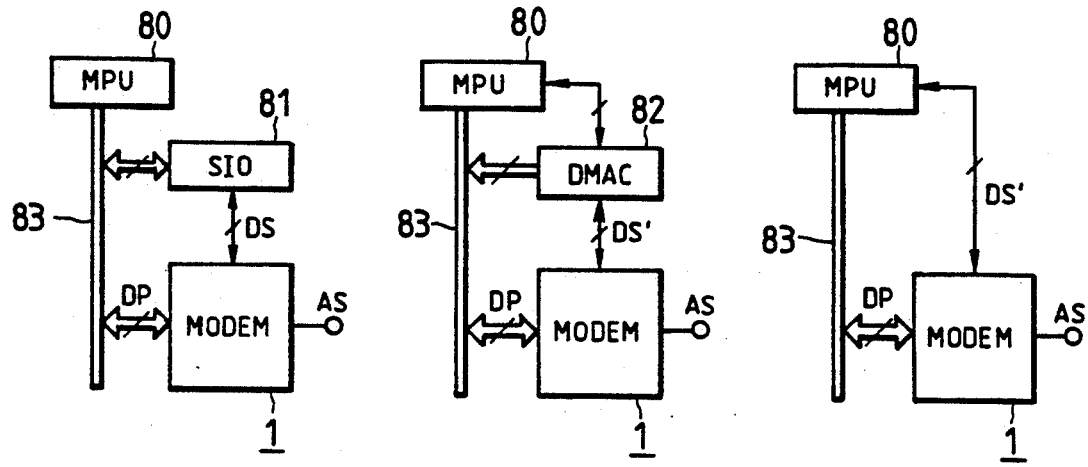
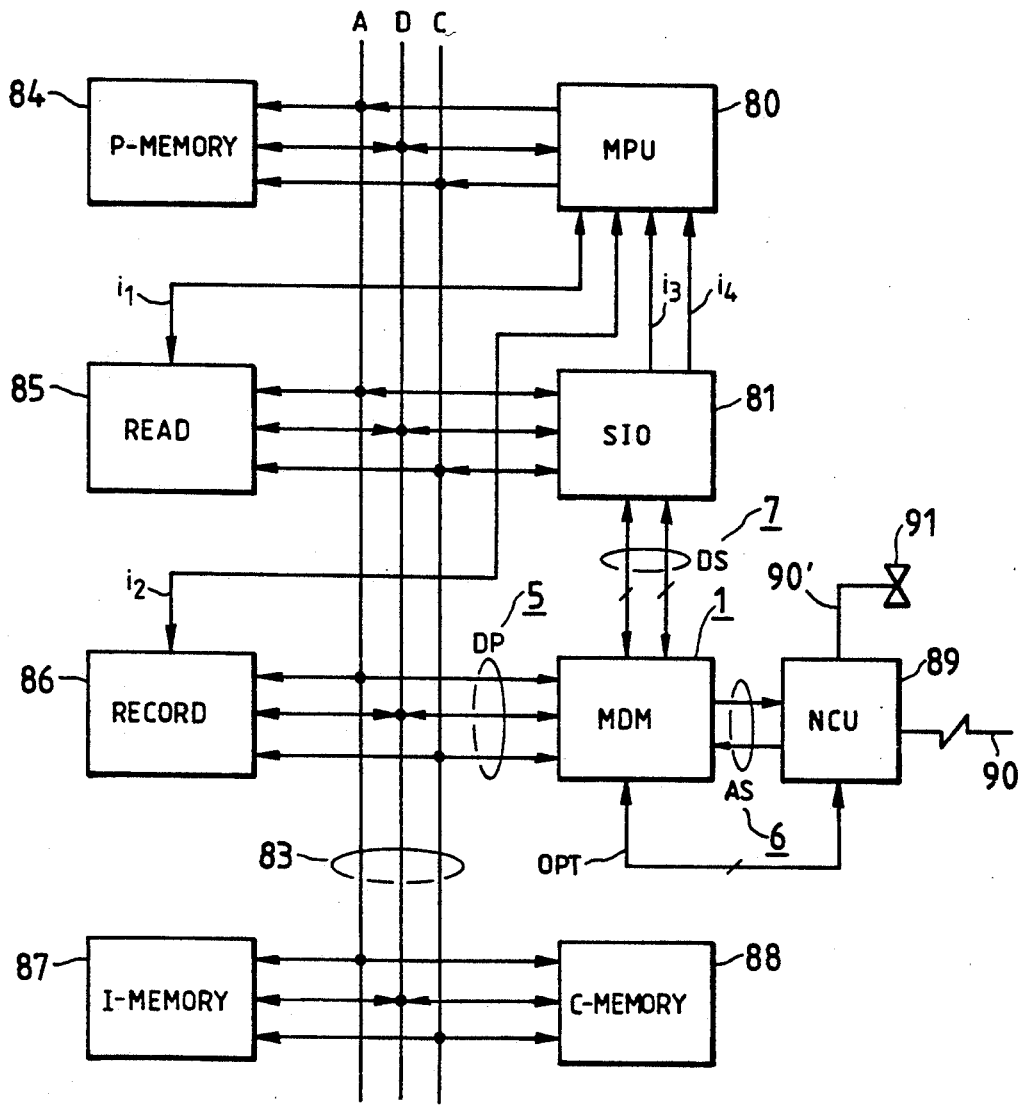

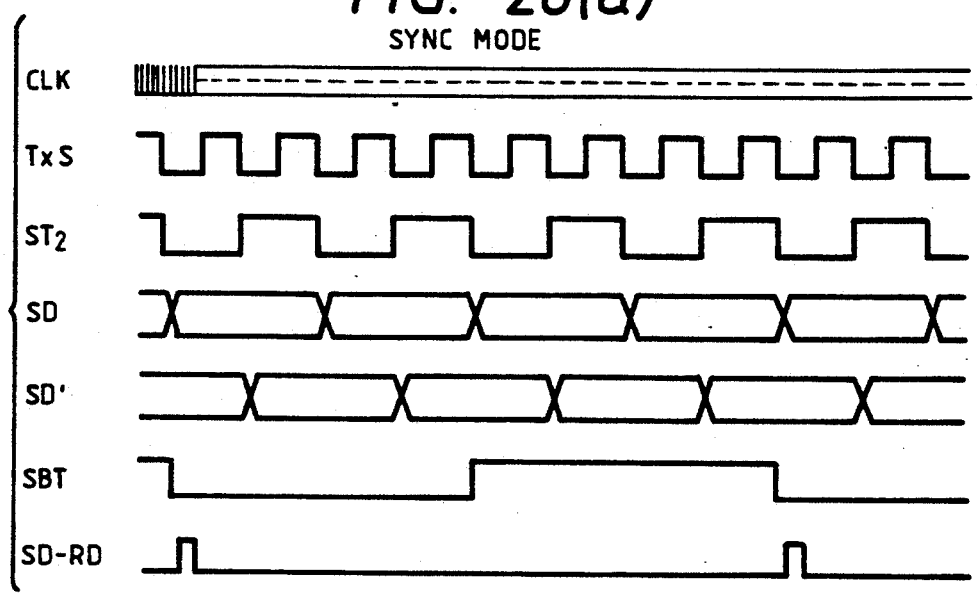
FIG. 28(a) SYNC MODE
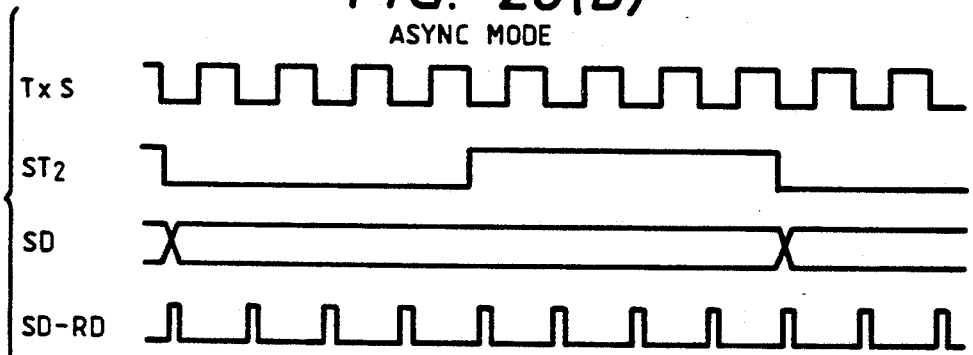
FIG. 28(b) ASYNC MODE
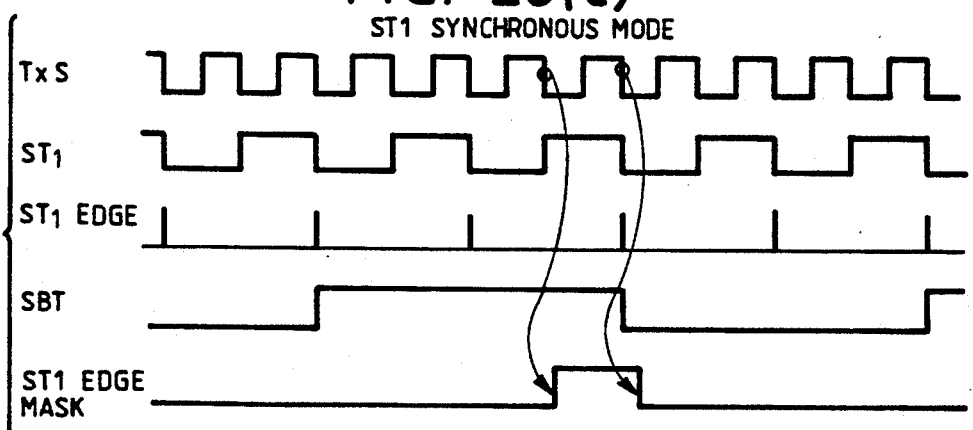
FIG. 28(c) ST1 SYNCHRONOUS MODE
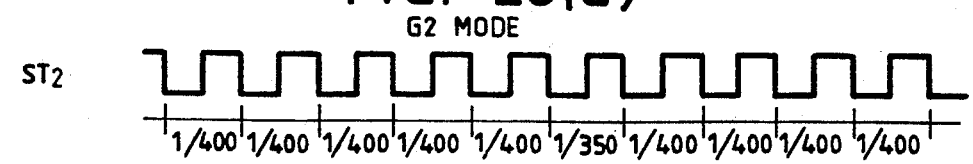
FIG. 28(d) G2 MODE

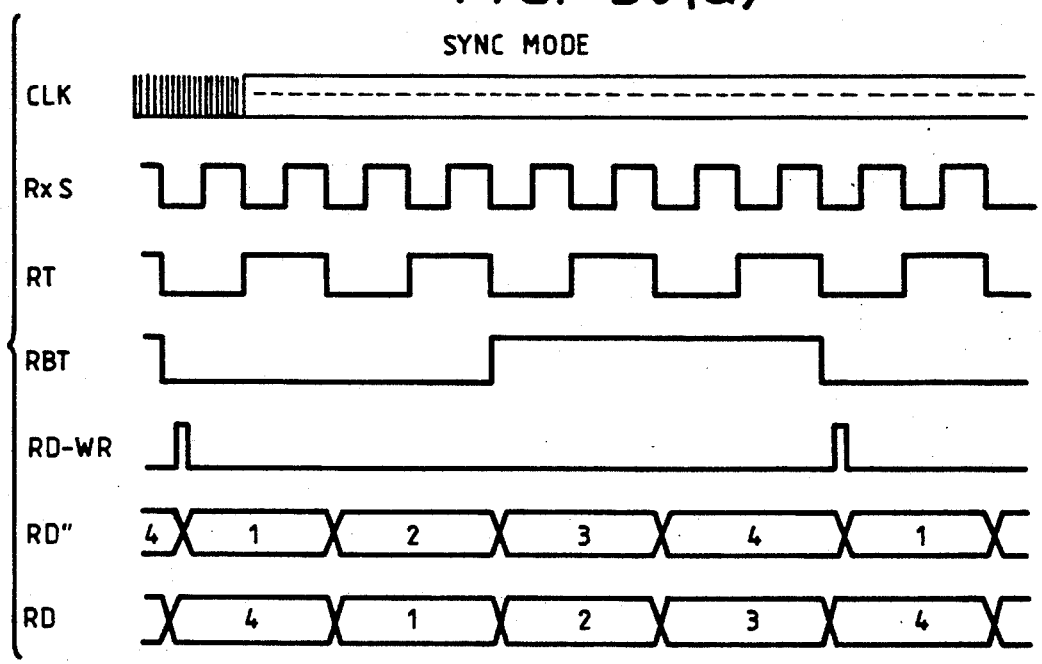
FIG. 30(a) SYNC MODE
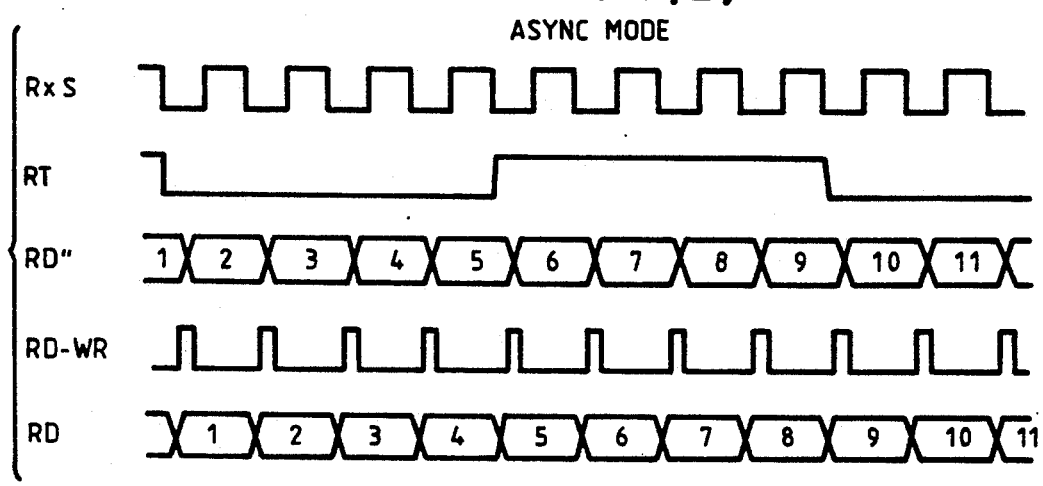
FIG. 30(b) ASYNC MODE
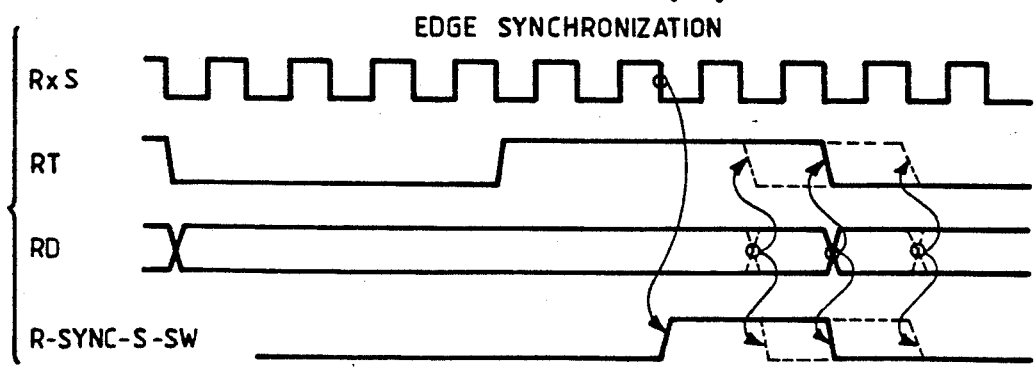
FIG. 30(c) EDGE SYNCHRONIZATION

MODULATOR-DEMODULATOR APPARATUS AND SYSTEM

BACKGROUND OF THE INVENTION

The present invention relates to a modulator-demodulator (i.e., MODEM) and, more particularly, to a simple, economical modulator-demodulator apparatus and system.

A MODEM according to a first technique of the prior art has its operations controlled by writing data in a number of registers built therein, as disclosed in "R96FAX 9600BPS FACSIMILE MODEM" on pp. 7-7 to 7-19 of ROCKWELL 1985 DATA BOOK.

A MODEM is a device for transmitting digital data over analog lines such as telephone lines and is divided into various types of communications and modulations/demodulations, most of which are individually determined as the V-serial counsels under the international standards by the Consultative Committee, International Telegraph and Telephone (CCITT).

An actual apparatus frequently has a plurality of standards stored therein. A facsimile usually stores a plurality of facsimile standards such as G3 (one-minute standards), G2 (three-minutes standards) or G1 (six-minutes standards). Thus, especially the MODEM for facsimiles has to store accordingly plural standards. Moreover, the facsimile must have functions to transmit tone signals for transmission control procedures and to control the network for connections with common lines, and its operations must be simultaneous in plural modes. The MODEM stores those functions so that its functions necessary for facsimile transmission are diversified. This makes it necessary to use a number of commands for controlling the operations of such MODEM. The aforementioned MODEM is interfaced with an external device through a Dual Port RAM, as described on pp. 91.

In the case of transmissions, for example (1) discriminate the send or receive; (2) designate the operation standards and rates; (3) turn ON the send demand; (4) detect the ON state of the sending indication from the MODEM; and (5) send data to the MODEM. In the case of ending the transmissions, (6) turn OFF the send demand. In the case of receptions, on the other hand: (1) discriminate the send or receive; (2) designate the operation standards and rates; (3) control the automatic gain control; (4) know whether or not the receive signal has been received in view of the carrier detection display; (5) monitor the signal quality; and (6) receive the data. The end of receive occurs when the carrier detection display is turned OFF. Sixteen control register bits are used.

The large-scale integration of the MODEM is disclosed as a second technique of the prior art on pp. 51 to 55 of Japanese Magazine "Electronics", October, 1984. As the MODEM is required to have higher performances and more efficient performances, scale reduction, i.e., large-scale integration is indispensable. In order to utilize the digital signal processing technique which has its using technique developed especially in recent years, a digital signal processor (i.e., DSP) is used in a high-speed MODEM having a transmission rate of 4,800 bps or 9,600 bps. In this DSP, there are built a RAM for temporarily storing data, a data ROM for saving constants necessary for arithmetic operations, a high-speed parallel multiplier, an adder/subtractor, and arithmetic logic unit (i.e., ALU), an input/output function (i.e., I/O port), and an instruction ROM for writing in signal processing procedures. In order to execute the arithmetic operations highly efficiently, the DSP is usually equipped with two data bus lines and RAMs. Other devices for effecting the high performance and high-speed arithmetic operations are address pointers, interrupt controls, automatic instruction repeating functions and so on.

For modulations and demodulations with digital signal processings, on the other hand, an analog circuit is required as an interface with lines. This interface uses an analog front-end LSI. This analog front-end LSI is composed mainly of A/D and D/A converters and may be further composed of an attenuator (i.e., ATT) for setting a transmission level, an automatic gain control for covering the change in the input level, a cable equalizer for equalizing the frequency characteristics of subscriber's lines, a delay equalizer for equalizing the group delay strain of a carrier link, a carrier detector, a zero-cross detector and so on.

In case such LSI is fabricated, the same digital IC process as that of a microprocessor is used for the DSP, and an analog process is used like the A/D converter or the like for the analog front-end LSI.

In a low-speed MODEM having a transmission rate of 1,200 bps, an FSK or PSK modulation method is used, which is realized by a one-chip MODEM having its digital and analog portions integrated in one chip, because it can be realized by a simple circuit structure and because it is little influenced by circuit strain and needs no automatic equalizer. A third example of the prior art is disclosed in "A Single-Chip Frequency-Shift Keyed Modem Implemented Using Digital Signal Processing" on pp. 869 to 977 of Journal of Solid State Circuit of IEEE Vol. SC-19, No. 6 (in December, 1984). This MODEM is a low-speed type having an FSK modulation system only but shows one trend for the large-scale integration. All the necessary functions for the modulations, demodulations and filters are realized by the digital signal processing to two DSPs integrated into one chip with the A/D converters. That MODEM further stores the serial interface and loop back test functions, which are determined by the RS232 C or V.24 standards. The two DSPs have data RAMs, coefficient ROMs and instruction ROMs, respectively, so that they operate independently of each other. On the other hand, the A/D and D/A converters select a high sampling rate based upon the sampling law of Nyquist. In order to eliminate the folded noises due to the sampling, however, a far higher sampling rate is selected. On the other hand, an extra sigma-delta type is used as the A/D converter so that digital circuits such as decimeters or interpolators are used together by reducing the pure analog circuits to produce the A/D converted signals at necessary sampling rates. Thus, the third example is featured as having little dispersion of characteristics and is stable as a semiconductor device even if those circuit elements are integrated into one chip around the digital circuit; its characteristics are reproducible even if it is mass-produced; and a number of operation modes and complicated functions can be realized by the software control without any substantial increase in the chip size.

A fourth technique of the prior art known as a MODEM to be connected with a transmission terminal equipment (i.e., DTE) is disclosed in "CMOSLSI for MODEM of 1,200 Bits/Sec Having Built-in Interface with Microprocessor or Telephone Lines", on pp. 227 to 237 of "Nikkei Electronics", Aug. 25, 1986.

The MODEM according to the fourth technique of the prior art will be described in the following with reference to the accompanying drawings.

FIG. 1 is a block diagram showing the structure of a MODEM according to the fourth technique of the prior art, and FIG. 2 is a block diagram showing the usage of the MODEM according to the fourth technique of the prior art. In FIGS. 1 and 2: reference numeral 601 designates the MODEM; numeral 602 control means; numeral 603 modulating means; numeral 604 demodulating means; numeral 610 a DTE; numeral 611 a microcomputer (which will be shortly referred to as "MPU"); numeral 612 a serial interface (which will be shortly referred to as "S-I/F").

The MODEM 601 according to the prior art is constructed, as shown in FIG. 1, the control means 602, including the modulating means 603 and the demodulating means 604 and is equipped with a microcomputer bus interface (which will be shortly referred to as "MPU-I/F"), a serial interface (which will be shortly referred to as "V.24-I/F") and an analog interface (which will be shortly referred to as "A-I/F") such that it can transfer parallel and serial data. FIG. 2 shows the entire structure in case the MODEM thus constructed is used in connection with the DTE 610. Specifically, the DTE 610 is constructed of the MPU 611 and the S-I/F 612 and is connected with the MODEM 601 through the MPU-I/F and the V.24-I/F.

In case, with this structure, data is to be transferred in series between the DTE 610 and the MODEM 601, the MPU 611 gives the operating conditions such as the transmission rate or the training type to the MODEM 601 through the MPU-I/F, prior to the start of the operations of the MODEM 601, to accomplish the actual data transfer in series through the V.24-I/F.

In case, on the other hand, the data are to be transferred in parallel between the DTE 610 and the MODEM 601, not the V.24 I/F but the interrupt function (i.e., the INT terminal in FIG. 1) of the MPU-I/F is used to effect synchronization so that the MPU 611 accomplishes the data transfer in parallel according to its software. Incidentally, the A-I/F of the MODEM 601 is an interface with the communication lines.

The aforementioned first technique of the prior art is provided with numerous hardware registers for controlling the operations of, the MODEM functions, but it takes no consideration of the MODEM control for controlling the operations in response to a software command by minimizing the number of these registers. In case the various MODEMs are to be realized by a generalized hardware as is different from the case in which the MODEM is specialized for the facsimiles as in the prior art, it is naturally necessary to prepare the registers in a number equal to that of the MODEMs having the maximum functions if the MODEMs are to be controlled in response to a command by the hardware registers. A certain MODEM for facsimiles is equipped with a register having 32 bytes and 192 bits. This requires about 7,000 transistors if it is realized by CMOS circuits, for example.

In recent years, a MODEM of medium- and low-speeds is realized by a one-chip LSI. In case, however, the aforementioned multi-function high-speed MODEM of the prior art is to be constructed of a one-chip LSI, this integration is not economical because of the aforementioned large number of transistors.

In case the functions are to be extended, on the other hand, the control by the hardware registers would make it necessary to add the registers, thus limiting the extension.

According to the control method by the hardware registers, more specifically, the operations of any control bits are logically free and have no limit to the order, because the control bits are independent. However, the MODEM functions require the aforementioned procedures, and numerous registers have to be handled so as to follow these procedures for the operations. This provides problems for the register referring procedures following the operating procedures.

Moreover, the operations and control functions of the MODEM are too complicated to understand.

The aforementioned second and third techniques described above are accompanied by the following defects.

Even the high-speed MODEM of the most developed type according to the prior art is a multi-chip device using a plurality of DSPs and analog front-end LSIs so that it has a large number of parts and is limited in its size reduction. This raises a defect that the system becomes expensive.

Moreover, the high-speed MODEM of the prior art has its analog front-end LSI occupying a high rate of the entire structure of a pure analog circuit. This raises a defect that the product characteristics are highly dispersed. This makes it necessary to use the laser trimming technique or the like so that the LSI itself is defectively reluctant to become inexpensive.

Moreover, since the high-speed MODEM of the prior art is constructed of a multi-processor and cannot avoid mutual association, it has to consume spare processing time and use twice the hardware. Thus, the high-speed MODEM is accompanied by a defect that it deteriorates the operating efficiency of the resources.

Moreover, the high-speed MODEM of the prior art divides its internal software processing into sample processing and baud processing. Since the basic timing is controlled by the baud processing, the high-speed MODEM requires a baud rate timer in addition to the sampling timer and the bit-rate timer so that it is accompanied by a disadvantage of requiring a large amount of hardware.

Moreover, the aforementioned sampling process is the modulating and demodulating functions of a filter required to have synchronism with the timing of the A/D and D/A conversions, and the baud processing is a signal point assigning process, an automatic equalizing process, a differential coding, and scrambler which have to be processed in synchronism with the timing of the generation or judgement of a signal point to be modulated. For processings with the timings of those two kinds, the two DSPs to be used are specialized for the sampling and baud processings. Alternatively, a microcomputer has to be provided as a third processor for arranging the timing. A defect is that the setting of the processing timing is complicated.

On the other hand, the single chip seems to have been able to be realized because of the technically simple transmission system called the low-speed MODEM. The application of the single chip to a high-speed MODEM has the following problems.

The DSP has an arithmetic executing performance ten to one hundred times as high as the ordinary general-purpose microprocessor. In the example of the prior art, the low-speed MODEM of 300 bps is processed by the two built-in DSPs. If this is applied as it is to a high-speed MODEM, there arise problems of a low arithmetic performance, a low program capacity, a small number of bits for A/D and D/A conversions, the non-linear characteristics of the A/D conversions, and no reproduction of the timing signals from the received signals. Thus, the single chip cannot be applied to the high-speed MODEM.

Moreover, the single-chip MODEM of the prior art is realized by the signal processing of the DSP including an interpolator or a decimeter, for example, by drastically processing the A/D conversions or the D/A conversions into digital signals. In order to attain the conversion characteristics equivalent to those of the analog signal processing of the prior art, however, an arithmetic accuracy far higher than that for the modulations or demodulations is required for the arithmetic processings of the A/D or D/A converters. Thus, another defect is that the DSP has to bear a heavy burden.

Incidentally, the DSP used in the high-speed MODEM of the prior art and the analog front-end LSI cannot be integrated into one chip in the circuit structure of the prior art because of different fabrication processes. Specifically, the DSP is constructed of a digital circuit so that a plurality of DSPs of high performance can be integrated into one chip because the degree of integration rises to the higher level as the semiconductor fabrication step (or process) becomes finer. On the contrary, the analog front-end LSI of the prior art uses a switched capacitor filter technique, in which the area for capacitors necessary for realizing the required capacity on the semiconductor surface is not dependent upon the semiconductor process but is constant so that the wiring rule is several times as large as that of the digital circuit. Thus, another defect is that a desired size reduction cannot be achieved. Moreover, this switched capacitor system is liable to be influenced by noise because its characteristics are realized by charge transfer and storage. A problem is that normal operations cannot be accomplished due to the noise which is generated by the digital circuit of the one-chip DSP. Thus, the application of the high-speed MODEM requiring a high S/N ratio is difficult in connection with the analog portion.

The aforementioned, fourth technique of the prior art has a low operating efficiency of terminals because the interrupt terminals for parallel data transfer are not used during the serial transfer of the data whereas the terminals for serial data transfer are not used during the parallel data transfer. In case the MODEM shown in FIG. 1 is formed as a one-chip semiconductor device, the chip is an IC chip having a large number of terminals, or a large-sized package having a large number of terminals has to be used. Thus, the fourth technique of the prior art has a problem that, it is not economical. Since the software processing by the MPU is used for the parallel data transfer, moreover, the technique of the prior art has another problem that the processing throughput to the terminals of the DTE will drop in case the speed of the MODEM is high.

SUMMARY OF THE INVENTION

An object of the present invention is to provide an economical MODEM control system of high performance, which is suitable for a one-chip device for a general-purpose MODEM.

Another object of the present invention is to provide a function which enables an external device to know the internal state of a MODEM and to alter the content of the memory or register in the MODEM if it is so intended.

Still another object of the present invention is to provide a function which makes it possible to alter the signal processing parameters or the like in the MODEM before the start of the signal processing of the MODEM.

A further object of the present invention is to provide a function which makes it impossible to alter the modes or parameters with ease with ordinary commands after the signal processing state.

A further object of the present invention is to provide a function which can initialize the processing only with the modes or parameters to be altered.

A further object of the present invention is to provide both a MODEM VLSI capable of being applied to a high-speed MODEM and the MODEM.

A further object of the present invention is to provide a MODEM which is equipped with highly efficient hard and soft means.

The object of the present invention is achieved by providing a MODEM which comprises: modulating and de-modulating means; and means for controlling the first-named means, wherein the improvement comprises: means made receptive of a macro-instruction; means for interpreting and executing said macro-instruction; and means for outputting a response to said macro-instruction, whereby said MODEM is controlled by the macro-instruction received from the outside.

Moreover, another object of the present invention is achieved by setting a direct memory access (i.e., DMA) instruction, which can refer to or alter the memories or registers in the MODEM, as the macro-instruction.

Moreover, still another object of the present invention is achieved by setting a set up (i.e., STP) instruction, on which the operation modes or processing parameters of the MODEM are initialized in the memories or registers, before the start of the operations of the MODEM.

Moreover, a further object of the present invention can be achieved by enabling the operation state of the MODEM to take at least an idle state before the modulations and demodulations and a processing state during the modulations and de-modulations and by controlling the kinds of the instructions received in the individual states.

Moreover, a further object of the present invention is achieved by preparing two sets of memories for temporarily storing the operand portion of an instruction, when the instruction is received, and for referring when the modulations and demodulations are to be executed, and by initializing, at a set up, only the content of a memory which is different from that of a previous set up.

Moreover, a further object of the present invention is achieved by using two kinds of execution control instruction and a mode setting instruction as the macro-instruction and a plurality of commands.

The MODEM of the present invention is controlled by issuing a macro-instruction to the macro-instruction receiving means built in the MODEM from an external device for controlling the MODEM. In response to the macro-instruction, the MODEM interprets it internally and performs executions in accordance with the instruction to control its operations. A response is outputted through the response means in case it is demanded by the instruction. The instruction may be a mode setting instruction for designating the operation modes or parameters, or execution control instructions for an initialization (STP), start and stop (CTL) or direct memory access (DMA). As the internal state of the MODEM, moreover, both the idle state for receiving all the instructions but not starting the modulations and demodulations and the signal processing state during the modulations and demodulation are set so that the MODEM and the external device can advance the operations while communicating with each other.

Specifically, the operation modes such as the modulating and demodulating functions, the fixed equalizing functions of circuit characteristics or the level adjustments of the analog inputs and outputs, and the parameters are designated in advance by the macro-instruction. This designation is expanded into the memories and registers by the STP instruction, and the contents of the memories and registers are confirmed or corrected, if necessary, in accordance with the DMA instruction. After this, communications can be accomplished by issuing the CTL instruction. In addition, there are naturally the general-purpose I/O control instruction, the reset instruction and the internal state indicating instruction so that not only the modulations and demodulations but also the MODEM apparatus can be controlled widely and finely.

A further object of the present invention can be achieved: by adding a digital linear CODEC having a relatively high S/N ratio of 15 bits or more, a programmable sampling timer, a serial interface, one general-purpose digital signal processor and a timing PLL between the digital linear CODEC and the sampling timer and integrating them into a one-chip VLSI; and by accomplishing the software processing in the DSP with reference to the sampling timing interrupt by using that one-chip VLSI.

In this case, the digital linear CODEC includes digitized A/D and D/A converters, a smoothing filter, and a transmission filter using a test circuit and a digital circuit.

On the other hand, the VLSI of the present invention is equipped with a serial interface, a sampling timer, and registers for constructing and controlling the individual components of the linear CODEC.

The VLSI of the present invention has further built therein a DSP I/O for monitoring the internal signals and the timing signals.

In the present invention, the VLSI has built therein a digital linear CODEC having a relatively high S/N ratio of 15 bits or more. The digital linear CODEC used in the present invention acquires a high conversion accuracy through the digital signal processing by accomplishing coarse quantizations at a high sampling rate greater than 1 mega samples per sec so that it can lesser the requirement for the fabrication accuracy of the analog circuit portion. Thus, the fabrication can be accomplished by the process suited for the digital circuit so that the analog circuit and the digital circuit can be effectively integrated.

In the present invention, moreover, the band pass filter characteristics of the CODEC coincide with the transmission filter. This raises an advantage that the amount and accuracy of the signal processing in the general-purpose DSP can be lessened.

In the present invention, moreover, since the programmable sampling timer is built in the VLSI, the sampling timing can be so advantageously adjusted in response to the instruction of the DSP for an I-pattern of the signal obtained by demodulating the received signal as to accomplish the A/D conversions at the optimum timing. Furthermore, the present invention has a function to synchronize the sending and receiving sampling timing with that of a hardware operation so that the A/D and D/A conversion timings can be made common.

A further object of the present invention is achieved by equipping the MODEM with control means, modulation means, A-I/F, a serial data interface and a parallel data referring timing interface (V.24-I/F/P-I/F-T), serial/parallel conversion means connected with the MPU-I/F and modulating and demodulating means, and means for controlling the common use of the interface. Moreover, a half-dual high-speed MODEM is achieved by providing means for effecting a common use between the serial/parallel conversion means intrinsically belonging to the modulating and demodulating portions of the MODEM and the serial/parallel conversion means for the parallel data transfer with the aforementioned DTE.

It is quite natural that the half-dual MODEM may have a structure similar to that of a fully dual MODEM if the economy allows.

The serial/parallel converter receives the parallel data from the DTE through a microcomputer bus intrinsically owned by the MODEM, converts that data into serial data, inputs the serial data into a modulating portion intrinsically owned by the MODEM, receives the received data in the form of a serial signal from a demodulating portion, and gives the received data as parallel data from the microcomputer bus to the DTE. At this time, the transfer timing of the parallel data is inputted or outputted from the serial data transferring terminals intrinsically owned by the MODEM. As a result, the MODEM can have the serial data transferring terminals and the parallel data tranferring timing signal terminals acting as common terminals. In the case of the half/dual high-speed MODEM, moreover, the serial/parallel conversion means intrinsically owned by the modulating/demodulating portion of the MODEM can be commonly used as the data transfer means with the DTE. In the present invention, moreover, the data transfer demanding signal can be controlled by the data transfer preparation completion signal.

The other objects and features of the present invention will become apparent from the following description to be made in connection with the embodiments thereof.

BRIEF DESCRIPTION OF THE DRAWINGS

FIGS. 8 and 9 are flow charts showing the embodiment of the present invention by taking up a G3 facsimile as an example;

FIG. 10 is a diagram showing the macro-instruction format of the embodiment;

FIGS. 13(a) through 13(c), 14 and 15 show a terminal unit making use of the MODEM of the embodiment of the present invention;

FIGS. 28(a) through 28(d) are timing diagrams of the same;

FIGS. 30(a) through 30(c) are timing diagrams of the same;

DETAILED DESCRIPTION OF THE PREFERRED EMBODIMENTS

Figure 3:
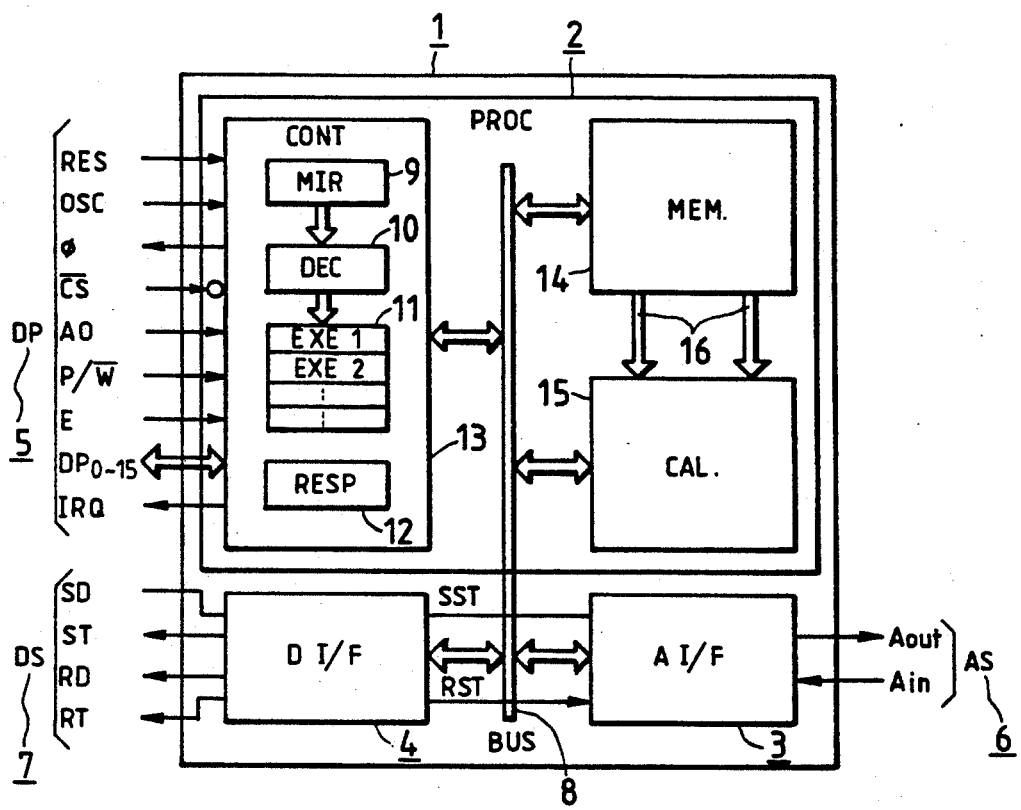
FIG. 3 is a block diagram showing the functions of a MODEM according to one embodiment of the present invention.

The present invention will be described in the following in connection with the embodiments thereof with reference to the accompanying drawings. FIG. 3 is a functional block diagram of the MODEM of the embodiment. Reference numeral 1 designates a MODEM which is preferably formed over a single semiconductor substrate. Numeral 2 designates processor portion (Proc). Numeral 3 designates an analog serial interface portion (AI/F). Numeral 4 designates a digital serial interface portion (DI/F). The MODEM 1 is connected with external devices through a digital parallel interface (DP) 5, an analog serial interface inside through a data bus (DBUS) 8. In the Proc 2, (AS) 6 and a digital serial interface (DS) 7 and internally through a data bus (DBUS) 8. In the Proc 2, there are: a control portion 13 composed of a register (MIR) 9 made receptive of a macro-instruction, a decoder (DEC) 10 for interpreting the macro-instruction, a number of means (EXEi, i=1, ---) for executing the macro-instruction, and a response register 12; a memory 14; arithmetic means 15; and special purpose buses.

The macro-instruction is stored or generated in a central processing unit MPU of a (not-shown) communication terminal unit or an external memory and is controlled through the PP0 to 15 of the DP 5 by another signal line of the DP 5 and inputted to the MIR 9. This macro-instruction is interpreted by the DEC 10 to select the EXEi. The instruction is executed, and the response is outputted to the RESP and is informed again to the external devices through the DP 5. The modulations and demodulations are realized by the arithmetic operations of the MEM 14 and the CAL 15 of the processor portion Proc 2. The digital signal is inputted and outputted through the DI/F 4 and DS 2, and the analog signal is inputted and outputted through the AI/F 3 and the AS 6.

Figure 4:
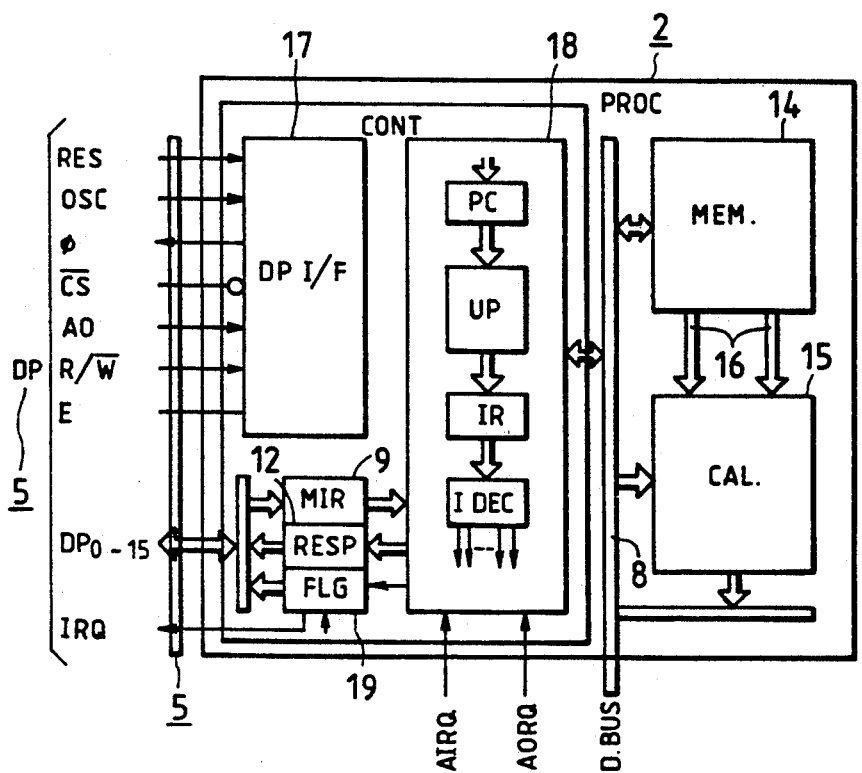
FIGS. 4, 5 and 6 are circuit block diagrams showing processor, analog interface and digital interface portions of the hardware of FIG. 3, respectively.

FIG. 4 is a detailed block diagram showing the hardware of the processor portion Proc 2. Reference numerals 16 or less appearing in FIG. 4 designate the same portions as those of FIG. 3. Numeral 17 designates an interface circuit (DP I/f) necessary in case data is to be transferred between the Proc 2 and the external devices in response to the DP 5. Numeral 18 designates a microprogram sequencer (CONT) of the Proc 2. Numeral 19 designates a flag register. The cont 18 is the control portion of the Proc 2 itself and has built therein a program counter (PC), a micro-program memory (μP), an instruction register (IR), and an instruction decoder (IDEC) to control the internal elements of the Proc 2 by executing the micro-program stored in the μP in advance. The FLG 19 indicates the processing situation of the Proc, the execution situation of the MIR 9 and the state of the RESP. Moreover, the data generated by the CONT itself can be transferred through the bus 8 or can be used for controlling the advance of the program. Moreover, the CONT 18 is made receptive of two signals, i.e., a data output request AORQ and a data input request AIRQ from the AI/F 3. Thus the program can perform the processing through detection of an interrupt and a flag sense. The data is applied to the output register AOR in the AI/F in response to the AORQ, and the AIR in the AI/F is read out in response to the AIRQ. This data is transferred from the memory 14 through the bus 8. The two data of the memory 14 can be read out simultaneously from different addresses through the buses 16. The arithmetic portion has a pipe line structure capable of computing the multiplication and summation, i.e., $A=B\times C+A$. Thus, the two data B and C can be multiplied, and the summation to the content of the accumulator A can be executed at a subsequent step. The output of the accumulator in the arithmetic portion can be distributed through the bus 8, and the data can be inputted directly to the arithmetic portion from the individual portions through the bus 8. In the host interface portion 11, on the other hand, there are: the register (MIR) for receiving the macro-instruction; the register (RESP) for outputting the control response and the internal data; and the register (FLG) for outputting the states of the interface, i.e., whether or not the MIR is awaiting the input, whether or not the RESP is awaiting the read, whether or not the interrupt of the external devices is flagged, or another flag information to be directly delivered.

In case the data is to be sent, on the other hand, the ASP 3 is operated at the timing generated by the later-described DI/F 4, and the modulated result of the sent data inputted from the DI/F 4 is outputted in response to the output request AORQ of the AI/F 3. In case the data is to be received, the AI/F 3 is operated at the timing generated by the DI/F 4, and the received signal fetched by the AI/F 3 is read in response of the data input request AIRQ of the AI/F 3. This received signal is demodulated by the memory 14 and the arithmetic portion 15 and is discriminated at the data until it is outputted through the DI/F 4.

Figure 5:
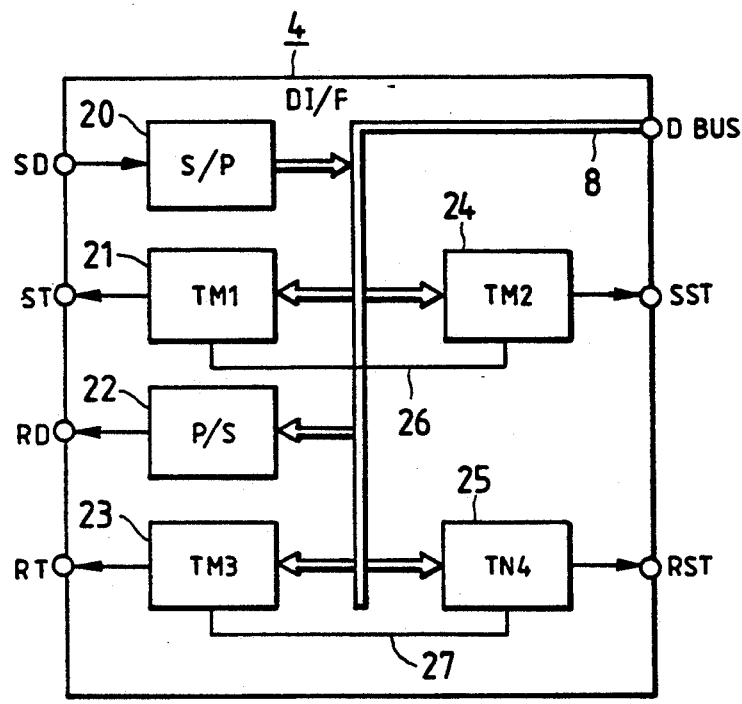

FIG. 5 shows the detailed block structure of the DI/F 4. Reference numeral 20 designates a serial-to-parallel outshift register (S/P). Numeral 21 designates a timer for generating a timing signal ST in accordance with the serial data transfer rate. Numeral 22 designates a parallel-to-serial shift register (P/S) for outputting the parallel received data as serial data RD. Numeral 23 designates a timer for generating a timing signal RT in accordance with the serial data transfer rate. Numeral 24 designates a timer for generating a timing signal SST for the analog output of the AI/F 3. Numeral 25 designates a timer for generating a timing signal RST for the analog input of the AI/F 3. The timers 21 and 24 are connected through a signal line 26 whereas the timers 23 and 25 are connected through a signal line 27 so that they can be synchronously operated. The send data SD is inputted from the S/P 20 and read out by the Proc 2 through a DBUS. On the contrary, the received data demodulated and reproduced by the Proc 2 is written in the P/S 22 through the DBUS and outputted. Incidentally, all the timers 21, 23, 24 and 25 can have their total frequency ratio altered by the program of the Proc 2.

Figure 6:
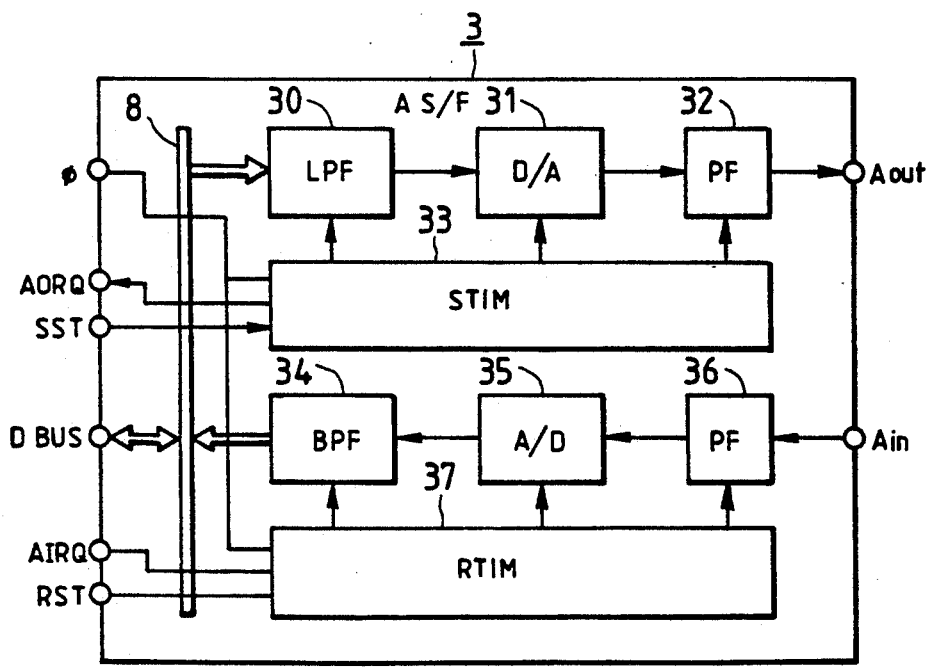

FIG. 6 shows the detailed block structure of the AI/F 3. Numeral 30 designates a low-pass filter (LPF). Numeral 31 designates a digital-to-analog converter (DA) for converting digital data to analog data. Numeral 32 designates an LPF (PF) for eliminating the quantized noises. Numeral 33 designates a circuit (STIM) for generating a timing for operating the above-recited components. Numeral 34 designates a band pass filter (BPF); numeral 35 designates a converter (AD) for converting an analog signal into a digital signal; numeral 36 designates an LPF (PF) for eliminating the folded noises in advance; and numeral 37 designates a circuit (RTIM) for generating a timing for operating the above-recited components. The sending portion is composed of the components 30 to 33 and responds to the input of the SST signal generated by the MLOGIC 4 to read out the output data in response to the AOR of the DSP, to request the subsequent data in response to the AORQ, and to realize the digital signal processing (that is, the sound range noises are eliminated by the PF 30 and outputted as analog signal Aout through the DA 31 and PF 32). On the other hand, the receiving portion is composed of the components 34 to 37 and responds to the input of the RST signal generated by the DI/F 4 to convert an analog input signal Ain to a digital signal through the A/D 35, to eliminate the out-band unnecessary noises through the BPF 34, to write them in the AIR of the Proc 2 and to request the Proc 2 for the input processing by the AIRQ. Incidentally, letter $\phi$ designates the fundamental timing generated by the Proc 2.

Figure 7A:
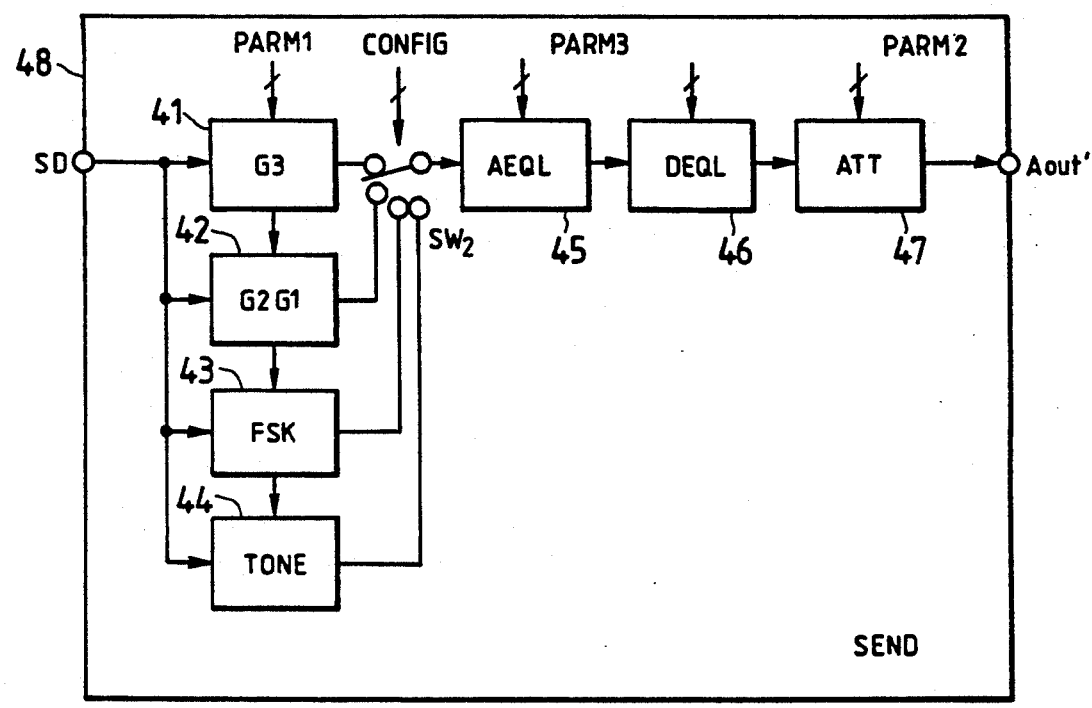
FIGS. 7(a) and 7(b) are diagrams showing the functions of the MODEM of the embodiment.
Figure 7B:
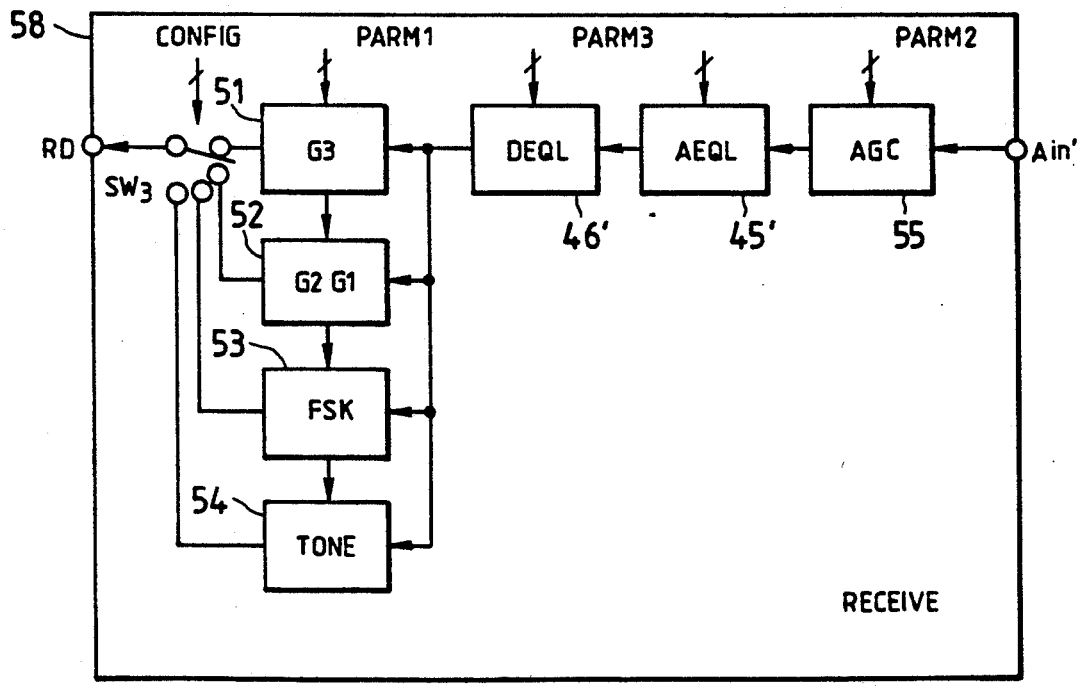

FIG. 7 is a block diagram showing the modulating and demodulating functions of the MODEM 1 according to the present embodiment, which are to be mainly controlled. FIGS. 7(a) and 7(b) show the functions in the sending and receiving operations, respectively.

In FIG. 7(a), reference numeral 41 designates the modulating portion (G3) of the MODEM for a G3 facsimile based upon the aforementioned international standards of the MODEM, as will be described hereinafter. Numeral 42 designates a modulating portion (G2 and G1) of the facsimile special-purpose MODEM for the G2 and G1 facsimiles. Numeral 43 designates a modulating portion (FSK) of the frequency transition MODEM for G3 facsimile controlling procedures. Numeral 44 designates a tone signal generating portion (TONE) for G2 and G1 facsimile controlling procedures. Numeral 45 designates a fixed equalizer (AEQL) for compensating the amplitude-frequency characteristics of subscriber's lines. Numeral 46 designates a fixed equalizer (DEQL) for compensating the delay-frequency characteristics of carrier lines. Numeral 47 a level adjuster (ATT) for adjusting the amplitude of an output signal. These components constitute a sending portion 48.

In FIG. 7(b): reference numeral 51 designates a demodulating portion (G3) for the G3 facsimile MODEM; numeral 52 designates a demodulating portion (G2G1) for G2 and G1 facsimile MODEMs; numeral 53 a demodulating portion (FSK) of a frequency transition MODEM; numeral 54 a tone signal detecting portion (TONE); and numeral 55 designates an automatic gain control amplifier (AGC), all of which constitute together a receiving portion 58.

The send data inputted from the SD terminal of the DI/F are modulated by the operations of the modulating portion selected by the switch (SW2). The output is equalized by the AEQL 45 and the DEQL 46 having designated characteristics and is adjusted to the designated level by the ATT 47. The output thus equalized and adjusted is outputted to the output register AOR in the LPF 30 and is converted into an analog signal by the AI/F 3 until it is sent out. In the sending case, the input signal is inputted to the AI/F 3 and is amplified at the AGC 55 having the designated level. The line characteristics are compensated by an AEQL 45' having designated characteristics and a DEQL 46' having designated characteristics and are inputted to the demodulator. The output of the demodulating portion selected by the SW3 is outputted through the RD terminal of the DI/F. The transfer rates of the SD and RD may have a plurality of speeds not only in the kinds of the MODEM functions but also in common standards and should be designated from the outside.

Next, the detailed sending and receiving operations will be described in more detail in connection with a MODEM for the G3 facsimile.

FIG. 8 is a signal processing flow chart of the sending portion of the G3 facsimile MODEM. This processing is started at each AORQ, i.e., send sample timing. This sampling timing is a basic timing for digital signal processing and has a period of one 9,600th sec in the present embodiment. The sending operation is started by turning ON the $\overline{\text{RTS}}$ (i.e., request of sending) of the DI/F. At this start, the present flow is started with the above-specified period. Immediately after this start (at 3000), it is judged (at 3010) whether or not the timing is baud. This can be judged by counting the sample number (by making use of a sample counter on the memory). Here, the baud timing is expressed by summing up a plurality of signal points as one modulation point, as indicated under the standards V.29 or V.27 of the present MODEM. In the case of the V.29, the baud timing is one 2,400th period. If, at this time, the inputting rate of the send data SD is set at 9,600 bps, it is determined by the standards that the send data of 4 bits are sent out altogether as one modulation point. In the digital signal processing, however, the digital signals are processed at a sampling timing of four-times speed so that the signal point (=modulation point) is inputted at a baud timing (at 3020). This value was produced at the previous baud timing and has been stored in the internal memory. This signal point is subjected to a send filtration (at 3030) so that it can easily pass through the transmission line through the Nyquist filter. This filtration also refers to the filter coefficients on the memory and the past signal point data. Next, the filter output is superposed by the carrier so that it is modulated (at 3040). In this case, too, the memory is used for latching the carrier phase. The signal point is expressed two-dimensionally (X, Y), and the carrier uses two sine waves having a phase shift of 90 degrees. The X and Y values are multiplied by coswt and sinwt, respectively, so that this modulation is generally called "orthogonal modulation". Next, the AEQL and EDQL are fixedly equalized at 3050. This output is multiplied (at 3060) by the level coefficient on the memory, and the output is fed (at 3070) to the AOR register of the AI/F. Incidentally, the quadrant higher harmonics produced by the modulations are removed by the LPF of the AI/F. Next, a baud processing is accomplished to attain the signal point. If at the baud timing (at 3080), data of plural bits are inputted (at 3090) in response to the send input S/P 20 of the DI/F. If during the training period of the MODEM sequence (at 3100), a replacement is made (at 3110) by an internally prepared training signal. These grouped data signals are subjected, while referring to the previous results, to a scrambling (at 3120) and a coding (at 3130). The signal point data corresponding to those grouped data are outputted (at 3140) to the memory. At this instant, the two-dimensional signal points are selected. The send processing is finally ended by a send sequence (at 3150) according to the MODEM sequence.

As described above, the sending portion designated at 48 in FIG. 7(a) is realized as the program of the DSP.

Figure 9:
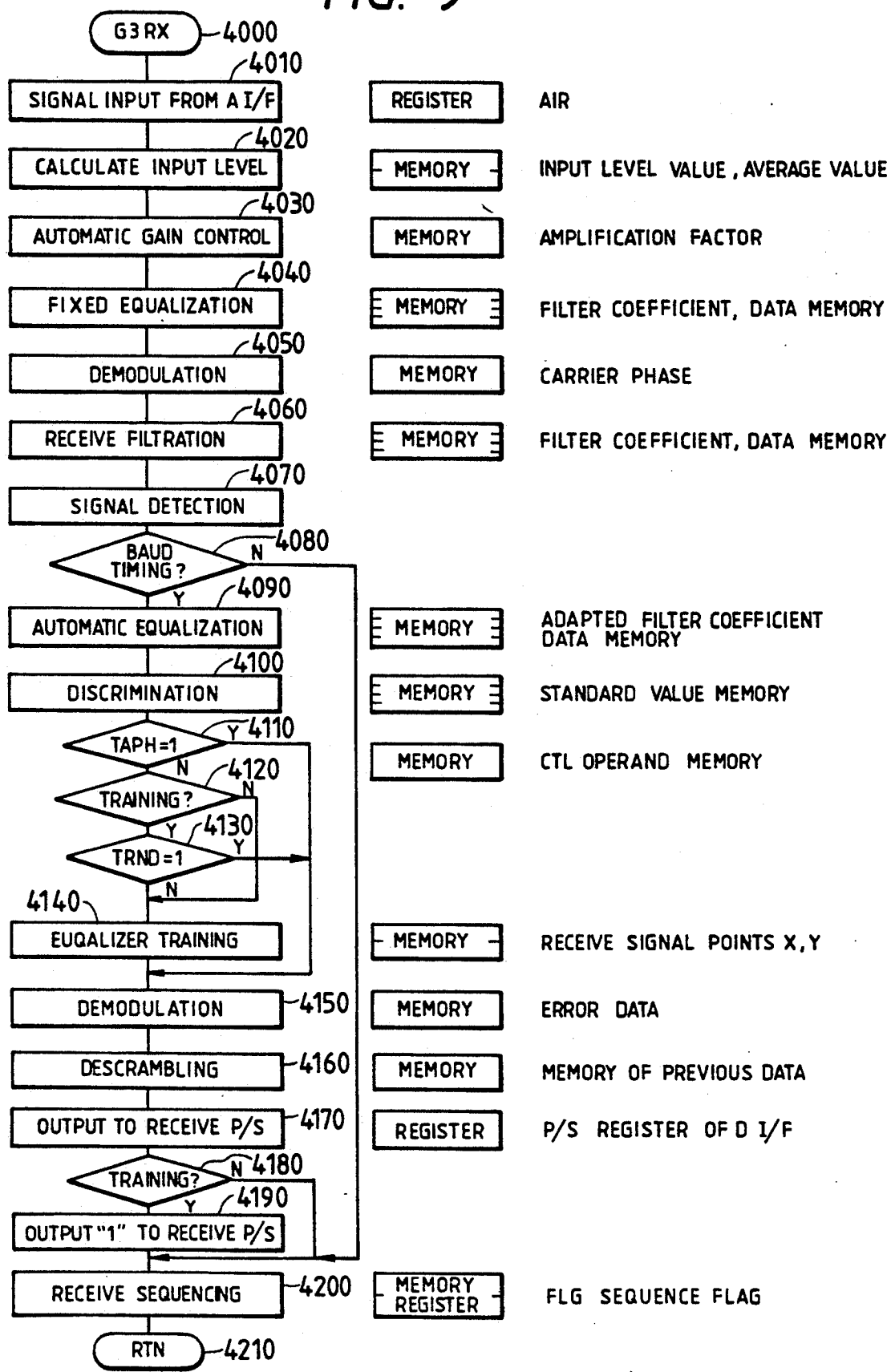

Next, the signal processing flow of the receiving portion of the G3 facsimile MODEM is shown in FIG. 9. If the processing at the receiving portion is permitted, the signal processing of the receiving portion immediately flows from the input to the output. The analog signal, which is also inputted (at 4010) with the sampling timing period (by the AIR register) from the AI/F 3, is attenuated due to the characteristics of the transmission lines. Therefore, the average value of the input levels is calculated (at 4020), and this result is used to obtain a ratio to the target value. The input signal is divided by that ratio to accomplish an automatic gain control (at 4030). Next, the strains of the transmission lines are eliminated (at 40404) by the fixed equalizer ADEQL or EDQL for demodulations (at 4050). These demodulations are accomplished by multiplying the carriers, which are reproduced from the received waves, by the received waves. The quadrant higher harmonics generated by the multiplications are eliminated (at 4060) by a receiving filter. Thus, demodulated signals are obtained by the mechanical operations. However, these signals still have many strains which cannot be eliminated by the fixed equalizations. It is also necessary to detect signals for advancing the carrier timing reproduction and further the MODEM sequence. (At 4070, the timing signal and the initial training signal are detected from the demodulated waves.) These demodulated waves must be reflected, if they are at the baud timing (at 4080), by the signal point transmitted. At this point, an automatic equalization is accomplished (at 4090) to eliminate the waveform strains. This processing is an adapted filtration, in which filter coefficients prepared in a later-described equalizer training portion are used to minimize the difference between a signal estimated to be correct and the received signal. If correctly equalized or if the signal received is within the equalizable range, a digital signal can be reproduced by a discrimination (at 4100). Now, if the control bit TAPH is OFF and if the control bit TRND is OFF while an initial training signal is being received, the receive signal point and the judging value are used to calculate error data so that the filter coefficients are updated (at 4140) to reduce the error data. Here, the coefficient updating is not accomplished if the TAPH control bit is ON. Nor is this updating accomplished if during the training and the control bit TRND is ON even if the TAPH is OFF. These control bits are used to prevent themselves (e.g., TAPH) from becoming worse once they were well equalized and to the signals modulated by the data from being mistaken the signals are temporarily (for 1 millisec to 1 sec) cut because of the line situations and are received again (as called "instantaneous cut"). The data thus reproduced as the digital values are demodulated (at 4150) and descrambled (at 4160) so that they are reproduced as the received data until they are outputted (at 4170) to the P/S register of the DI/F. During a training (at 4180), the output is replaced (at 4190) by a mark signal "1". The receive sequence is a portion for determining the processing content at a next timing from the input signal level, the signal detection output or the error of the equalizer.

In addition, the MODEM for G2 or G1 facsimile is far simpler than that described above but will accomplish similar processings.

In any event, in order to control those MODEM functions, it is necessary not only to control the hardwares but also to set, refer to and alter the content of the memory of the DSP, as the case may be. Moreover, these processing specifications have to be designated from the output of the MODEM.

It is preferably a macro-instruction, which is externally generated or stored and inputted to the one-chip MODEM 1, that accomplishes those mode, parameter, start, stop and SW controls.

FIG. 10 shows the detail of the macro-instruction. This macro-instruction has a format of totally 16 bits, which is divided into an operation code field of 4 bits and an operand field of 12 bits, and is divided into an execution control instruction and a mode setting instruction. Moreover, letters STR and DATA designate data operands which have passed through the RESP and the MIR but have no meaning on the format.

Figure 11A:
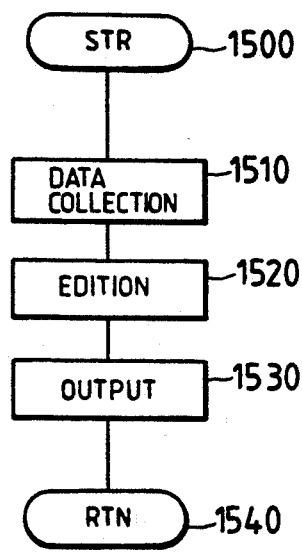
FIGS. 11(a) through 11(d), 11(2) and 11(3) are flow charts showing the execution of the macro-instruction.
Figure 11B:
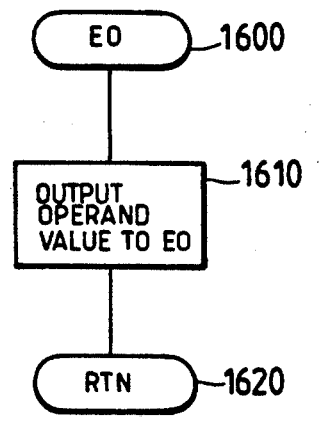
Figure 11C:
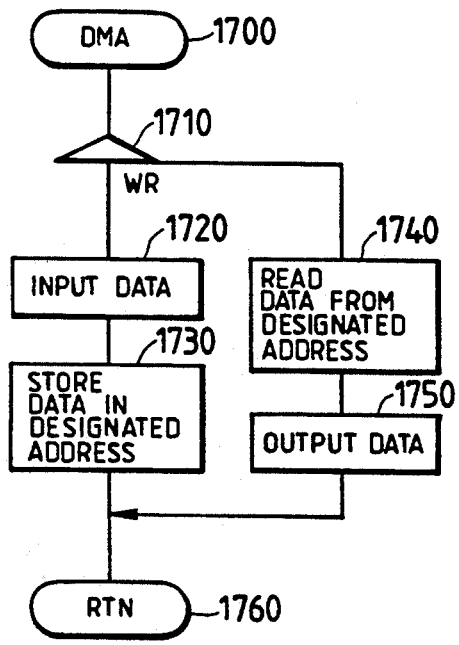
Figure 11D:
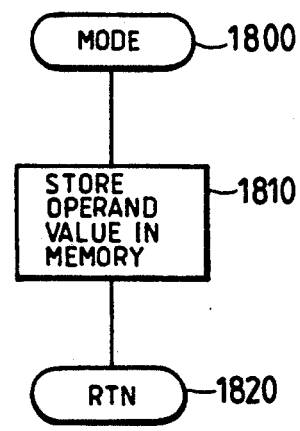
Figure 11:
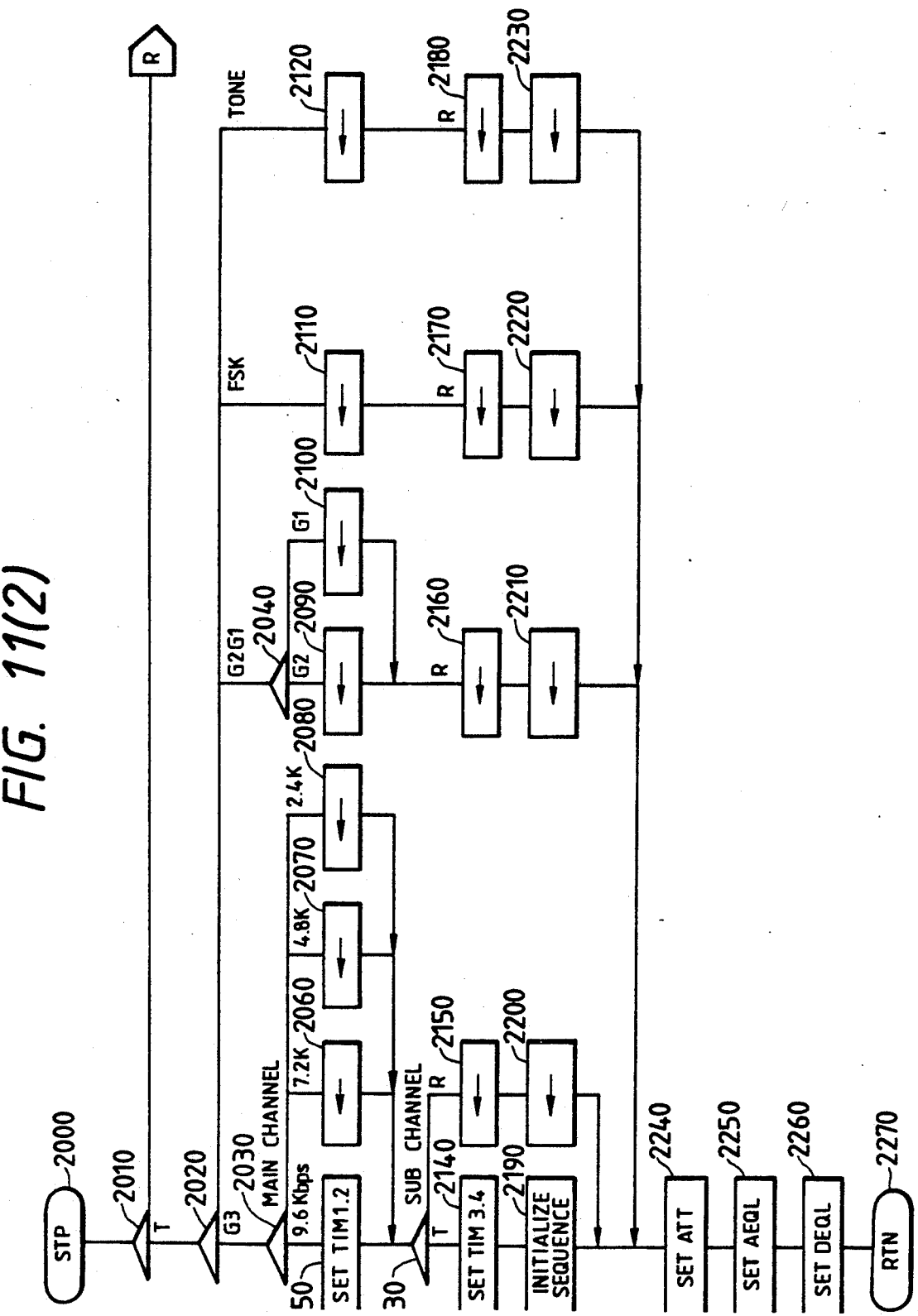
Figure 11:
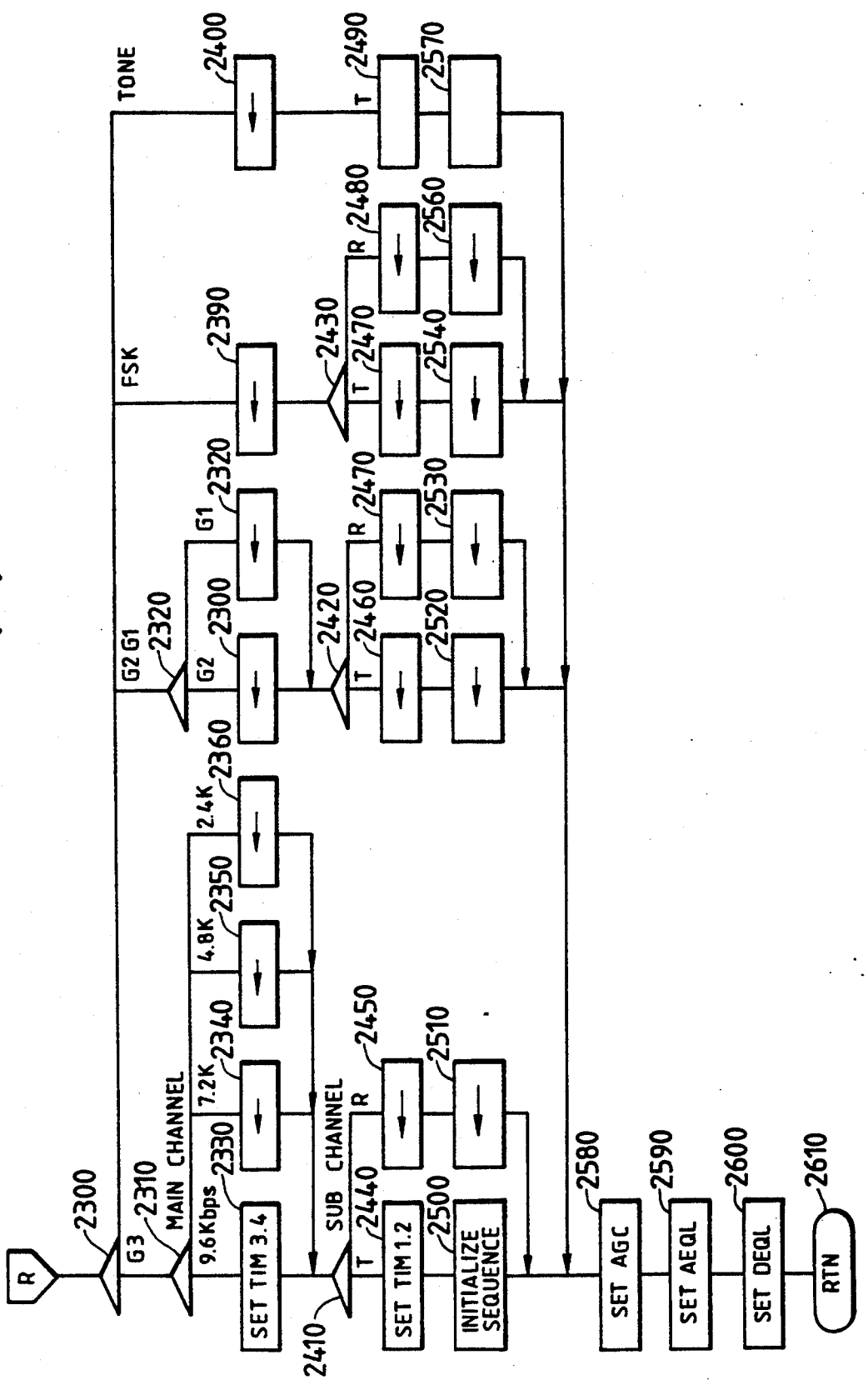

The STRQ instruction requests the processing response STR and executes the flow of FIG. 11(1) (a). In order to generate the response data STR, data is collected, and edited into the format of the STR until it is outputted to the RESP 12.

The CTL instruction controls the start and stop of the modulations and demodulations with the RTS bit for transmissions and with the RXE bit for receptions. Incidentally, the TAPH bit and the TRD, bit are the internally processing control bits used during the reception, as will be described later.

The STP instruction initializes the operation modes or the processing parameters in the memory 14 or the register, as instructed by a later-described mode setting instruction, as shown in FIGS. 11(2) and 11(3). With the judgements of the send and receive 2010, the demodulation modes 2020 and 2300, the operating rates 2030 and 2040, the sub-channel controls 2180, 1410, 2420 and 2430, the timers 1, 2, 3 and 4 of the DI/F 4 and the timing sequence, filter constant and level sensitivity of the MODEM are initialized.

On the other hand, the EO instruction is a control instruction of a general-purpose output port so that the values of the operands are outputted as they are to the outputs P) 0 to 3.

On the other hand, the DMA instruction writes or reads the data, which is designated by the DATA operand, in or from the memory designated by the instruction operand or the address of the register (as shown in FIG. 11(1) (c)).

On the other hand, the RST instruction initializes the MODEM and holds it in a standby status in any case.

The mode input is a mere input processing, as shown in FIG. 11(1) (d).

The CONFIG instruction appearing in FIG. 10 is a command for designating the MODEM standards and the speed parameters, and the two bits in the MMD field roughly divide the types of the MODEM to control the SW2 and SW3 of FIG. 7. The four bits of the MCS field designate the send and receive operations of the main channel of the MODEM, the MODEM standards and the transmission rate. The P/S field is a bit for designating whether the specified frequency or the externally designated frequency is to be handled when the tone is to be sent or received. PARM1 designates a command for designating whether or not the externally designated frequency is to be handled. EPT indicates whether or not an echo protection tone is incorporated into a send sequence. PE is a bit for designating whether or not the digital data is to be transferred by the DS or whether or not TXD and RXD are to be transferred in parallel. The two bits of the HD field are for designating the time period of a squelch necessary for half-double communications. LOOP designates a folded test mode. F# is a bit for designating the number of the tone frequency which is preset in advance in the tone sending case.

PARM2 designates a command which is divided into a sending TXLEVEL field and a receiving RXLEVEL field to make possible a fine level adjustment at each 1 dB.

On the other hand, PARM3 is a command for controlling a fixed amplification equalizer (for subscriber's lines) and a fixed equalizer (for carrier links) independently of the send and receive.

Incidentally, STR designates response data for instructing the internal status of the MODEM. The four bits of the PI field have transferred thereto the input signal of a general-purpose input terminal. On the other hand, FLD operates to display the flag "7E" pattern of the HDLC in case this pattern is detected by the receiving portion of the FSK MODEM. SQD operates to display the quality of the received signal. The two bits of the TD field display the proceeding situation of the training sequence of the high-speed MODEM. The eight bits of the FDET field display the tone detecting situation in case the tone detecting function is operated.

Figure 12:
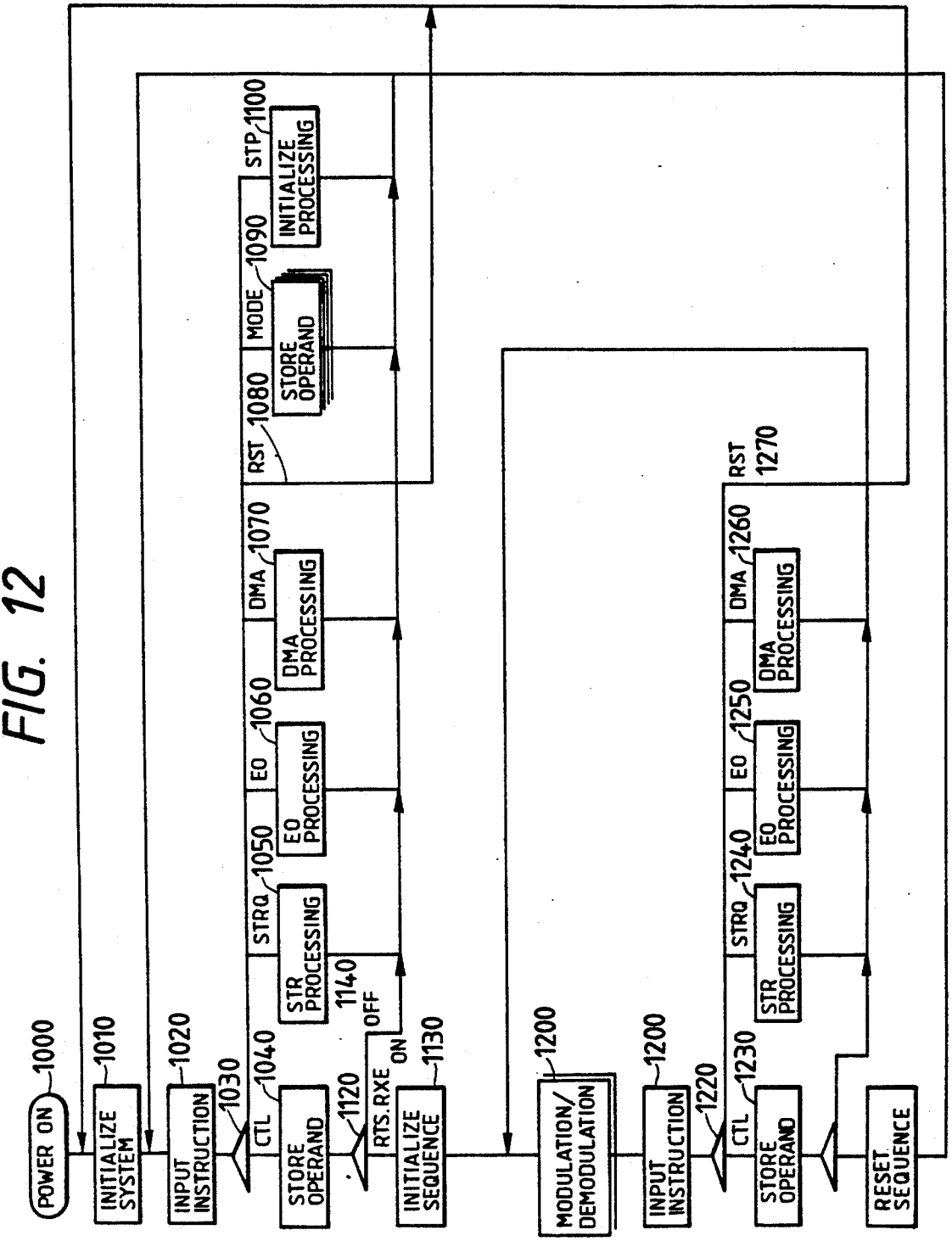
FIG. 12 is a flow chart showing the transition of the states inside of the MODEM.

FIG. 12 shows one example of the internal status transmission of the MODEM of the present embodiment. When the MODEM is powered, the system is initialized at 10101, and an instruction is inputted at 1020. This instruction is interpreted at 1030. In the present embodiment, all the instructions of FIG. 7 can be accepted. This stage is in the idle status, in which commands are accepted whereas memories or registers are initialized but with neither modulation nor demodulation. Here, RTS or RXE is turned ON at 1120 in response to the CTL instruction, and the sequence is initialized at 1130 to enter the processing status. The instruction input is accepted at 1200 while processing the signals. In this case, neither the MODE instruction nor the STP instruction is accepted. This status is continued until the OFF condition of RTS and RXE is indicated in response to the CTL.

The modulating and demodulating portion (1200) of this flow corresponds to 41 to 44 of FIG. 7(a) and 51 to 54 of FIG. 7(b), as included in FIGS. 8 and 9, and the remaining command processing portions (1040 to 1100 and 1230 to 1270) correspond to the flows of FIGS. 11(1), 11(2) and 11(3).

FIG. 13 shows an example of using the MODEM of the present embodiment. In FIG. 13, reference numerals 80, 81, 82 and 83 designate a microprocessor MPU, a serial interface (SIO), a DMAC and a microcomputer bus, respectively.

In a standard application example of FIG. 13(a), the digital data for connecting and transmitting the DP of the MODEM with the microcomputer bus 83 connects the SIO 81 with the microcomputer bus to transfer the transfer data with the DS of the MODEM 1.

FIG. 13(b) shows an example for transferring transfer data in parallel and at a high rate by the DMAC 82. This example is advantageous in that is involves little overhead for the transfer of data between the microcomputer 80 and the MODEM 1. On the other hand, FIG. 13(c) shows an example, from which the DMAC 82 is removed and in which the transmission data is handled by the software of the microprocessor 80.

FIG. 14 is a circuit block diagram in case the flow of FIG. 11(a) is applied to a facsimile apparatus. In FIG. 14, the reference numerals 5 to 83 designate the components shared with FIG. 3 or 13. Numeral 84 designates a memory (i.e., P-memory) for saving the program which is used by the MPU for controlling the facsimile apparatus in its entirety. Numeral 85 designates a reading portion for receiving the image of an original document sent. Numeral 86 designates a recording portion for recording and outputting the image received. Numeral 87 designates a memory (i.e., I-memory) for recording image signals. Numeral 88 designates a memory (i.e., C-memory) for storing code signals. Numeral 89 designates a net control unit (NCU) for connecting the MODEM 1 and a telephone line 90. Numeral 91 designates a telephone set. Letters $i_1$ to $i_4$ designate interrupt signal lines requesting the transfer of the data from the reading portion 85, the recording portion 86 and the serial I/O to the MPU 80. Letters OPT designate general-purpose input/output signals which are actuated in response to the instruction EO and STATUS.

In the transmitting case using the facsimile, the image data of the document is read out by the reading portion 85 and is first stored in the I-memory. This data is either left as it is or compressed into code signals by the MPU 80 or another means and is stored in the C-memory. The code signals stored are sent out through the MODEM 1 and the NCU 89 to the telephone line 90. In the receiving case, on the other hand, the image data sent through the telephone line 90 is reproduced into image signals through the NCU 89 and the MODEM 1. The received signals are stored in the C-memory 88, if they are code data, and converted into the image signals by the MPU 80 or another means until they are stored in the I-memory 87. The image signals in the I-memory 87 are outputted and recorded in accordance with the action of the recording portion 86.

In order that the facsimile apparatus at a remote place may correctly transfer the image signals, a flow of control signals is required in addition to the flow of the aforementioned image signals. The control signals cause the sending device and the receiving device to perform a hand-shake to realize the correct transfer.

The control data includes a variety of data such as the facsimile standards (G1, G2 or G3), the size of the document, the line density, the scanning rate, the transmission rate, the page number or the transmission administration. This data can be acquired if the MPU monitors a not-shown control panel. The necessity for reliable transmission to a remote apparatus invites the use of tone signals of less transmission error and the low-speed MODEM.

For actual transmission, there is required means for selecting the partner to be connected with many facsimile apparatus connected with the public telephone network for detecting the connection from the facsimile apparatus to connect the MODEM with the telephone lines. This means is exemplified by the NCU 89. In many cases, the remote apparatus is selected by the telephone set 91 so that the facsimile is switched in response from the remote apparatus or the switching device connected with the remote apparatus. This connection detection or switching control is accomplished in response to the signal OPT.

Figure 15:
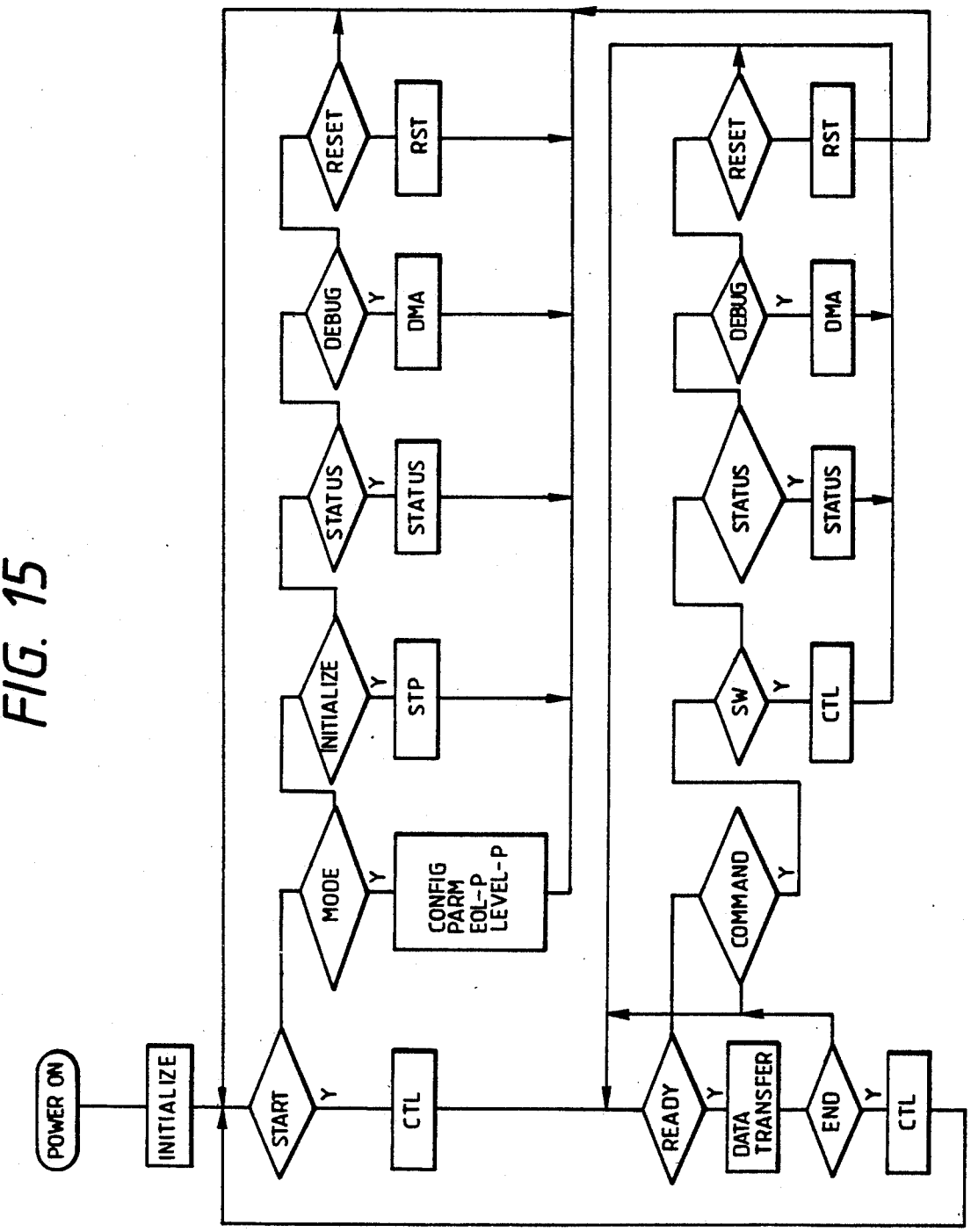

FIG. 15 shows the program of the microprocessor MPU 80 of FIG. 13(a). When the microprocessor MPU is powered and started, its own processing is initialized, and the MODEM comes into the idle status. Here, the operation mode is designated by the mode setting instruction, and the MODEM processing is initialized in response to the STP instruction. Here, in case the parameters or the like having been initialized are to be confirmed or altered, the DMA instruction is issued for debugging. In case the MODEM 1 is to be initialized, the RST instruction is issued. After predetermined preparations for the operations are completed, the CTL instruction is issued. In the sending operations, the RTS bit is turned ON, and the MODEM advances the initial training. When the data transfer preparations are completed, the CS (capable of sending) indication is transmitted by the FLG register to the microprocessor MPU. As a result, this microprocessor 80 continues the data transfer while turning ON the RST. It is natural that the DCMD can be issued even during the signal processing. In case, for example, the line status is bad at the receiving side, the AGC or TAPH bit is turned ON immediately when the OFF condition of the received energy indication (FCD) displayed on the FLG is detected, if a short signal OFF of several hundreds millisec or more occurs. Alternatively, the internal status can be known in response to the DMA instruction.

Figure 19:
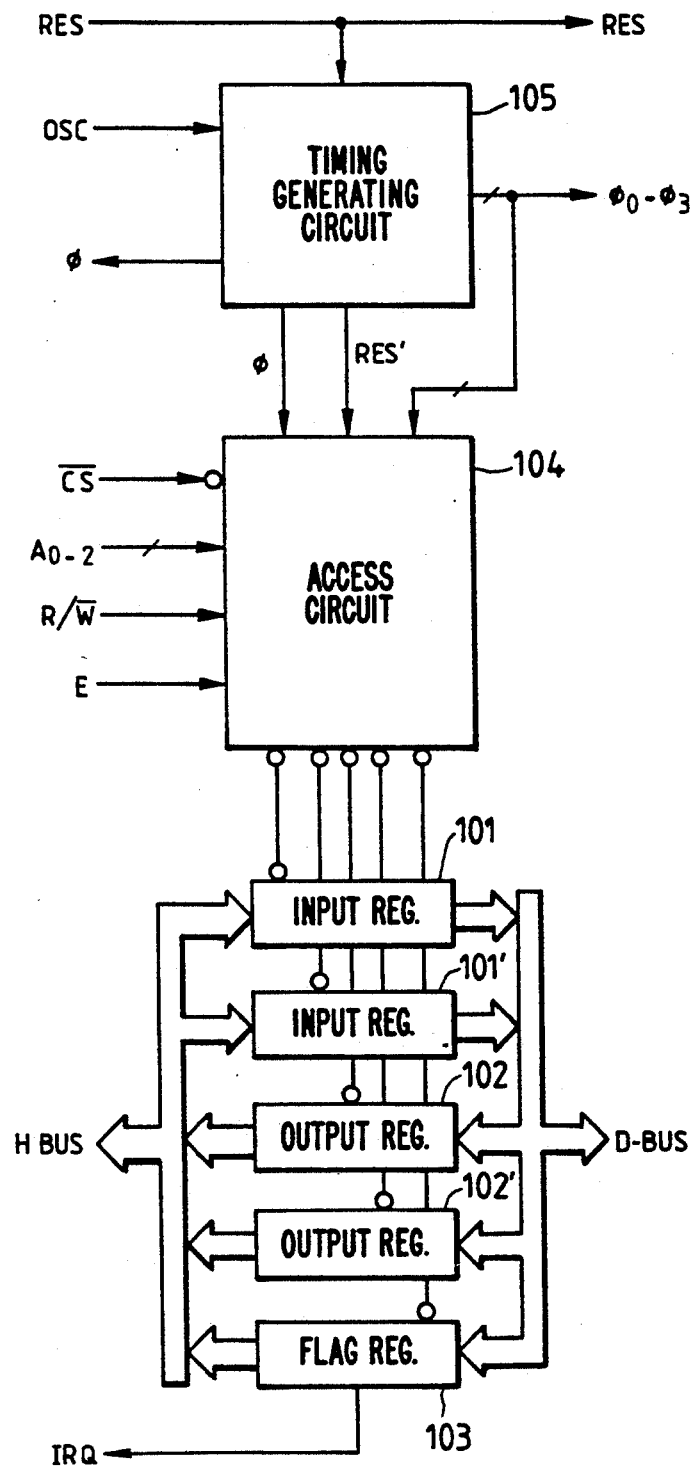
FIG. 19 is a circuit diagram showing the host interface of the DSP of FIG. 18.

In case the MPU 80 gives the MODEM 1 an instruction, it is necessary to know whether or not the MODEM 1 has executed the previous instructions and can accept a new instruction. In the MODEM of the present invention, that knowledge is confirmed (at the "Ready" portion of FIG. 15) from the content of FIG. 19. In FIG. 19, CD, CS and FCD signals are in addition to the input/non-input bits, the output/non-output bits and the response interrupt bits. In addition to FIG. 19, an interrupt IRQ signal can be connected with the MPU 80. This IRQ performs the same action as that of the response interrupt bit of FIG. 19. Thus, while the MODEM 1 is processing in response to the instruction, the MPU 80 need not continue monitoring FIG. 19 whether or not a next instruciton can be written in.

This function is effective for the MPU for controlling a terminal device such as the facsimile, because its load distribution is feasible.

Figure 16A:
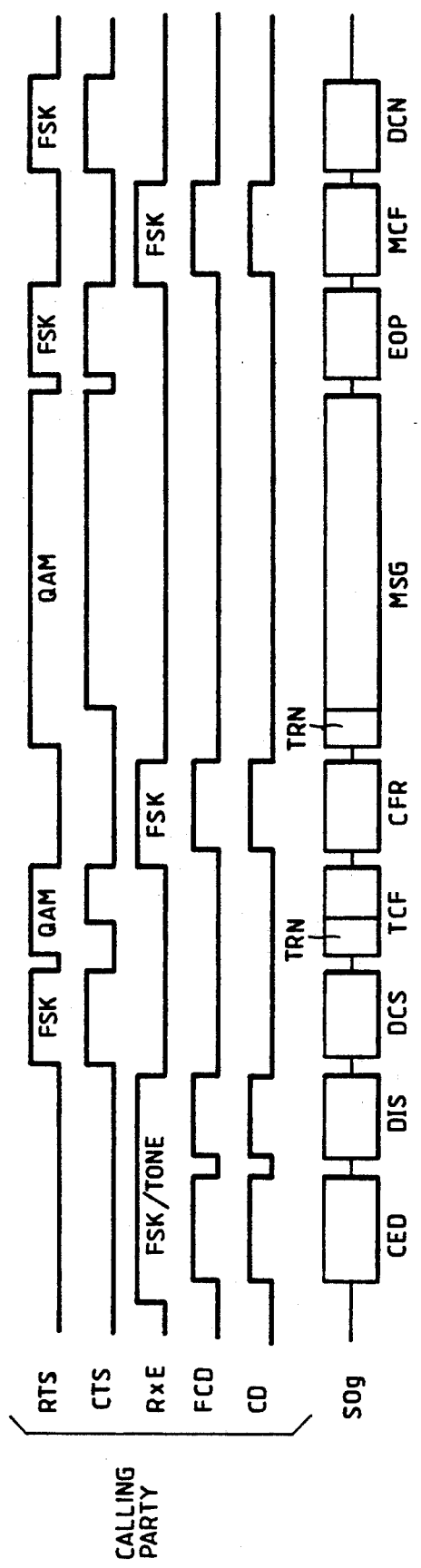
FIGS. 16(a) and 16(b) are timing charts for a calling party and a called party, respectfully, in case the MODEM according to the embodiment of the present invention is applied to a facsimile.
Figure 16B:
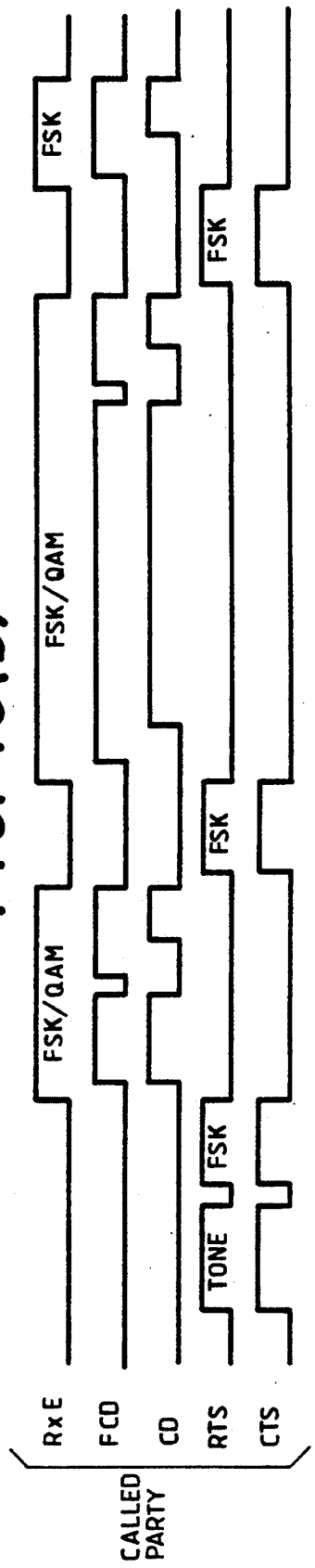

FIG. 16 shows an example of the timing chart in case the MODEM of the embodiment described above is applied to a facsimile. As shown, the MODEM is disposed at both the sending and receiving sides, and the timing chart indicates the waveforms of the signals CTL and FLG, the set modes and the names of the transmission signals.

In the facsimile, the timing chart is generally started at an instant when a calling sound from a telephoning (calling) side to a (called) side is detected through the public lines. The communication procedures after the start are grouped and standardized as the communication protocol of the facsimile like the MODEM standards. In the MODEM of the present embodiment, the CONFIG and the CTL make the receptions through the sub-channels possible, while the main channels are occupied for transmission, and vice versa while the main channels are receiving. It is also possible to accomplish the simultaneous receptions between the FSK and the tone, between the FAX MODEM and the tone, and between the FSK and the QAM. As a result, at the initial portion of the procedures of FIG. 16, the calling side can receive the FSK received output even in case the operations are delayed to lose the tone signal. Since, moreover, the next portion enables the called side to receive both the FSK and the G3, there can be attained an effect that the communications can be continued if any of the signals can be received, even in case one side erroneously misses the procedures.

In the present MODEM, as shown in FIG. 13, the low-speed channel is operating while the high-speed channel is operating for the facsimile. The MODEM facilitates the separation because it has a function to detect the flag pattern "7E" from the signals of the low-speed channel so as to know which signal is actually received.

As has been described hereinbefore, in the MODEM 1 of the present embodiment, the Proc 2 is connected with the AI/F 3 and DI/F 4 through the DBUS, and the Proc 2 uses the macro-instruction register 9, the macro-instruction decoder 10, the macro-instruction executing software 11, the response register RESP 12, the flag register 19, the execution control instruction and the mode setting instruction and is operated separately in the idle and processing statuses. Thus, it is effectively possible to realize the economical hardware and the simple operations. In other words, the number of the bits of the registers required is small, and the commands can be easily used. Since, moreover, the interpretations and executions of the instructions and the processing functions as the MODEM are realized by the software of the Proc, the system structure has a high flexibility, and the MODEM and its control system are suitable for the general-purpose one-chip MODEM.

The mode setting can enjoy a simultaneousness because it is not effective after passing through the STP instruction.

Since, moreover, the STP instruction is not accepted while the MODEM is processing, any erroneous operation is not caused by an easy mode alteration.

Since, furthermore, the memories and registers in the MODEM can be referred to or updated in response to the DMA instruction, it is effectively easy to adjust the operation modes and parameters of the MODEM and to accomplish the debugging.

Furthermore, the initial value can be changed by making use of the DMA instruction before the start of the modulations and demodulations (CTL), so that the changes in the specifications can be easily coped with.

Figure 17:
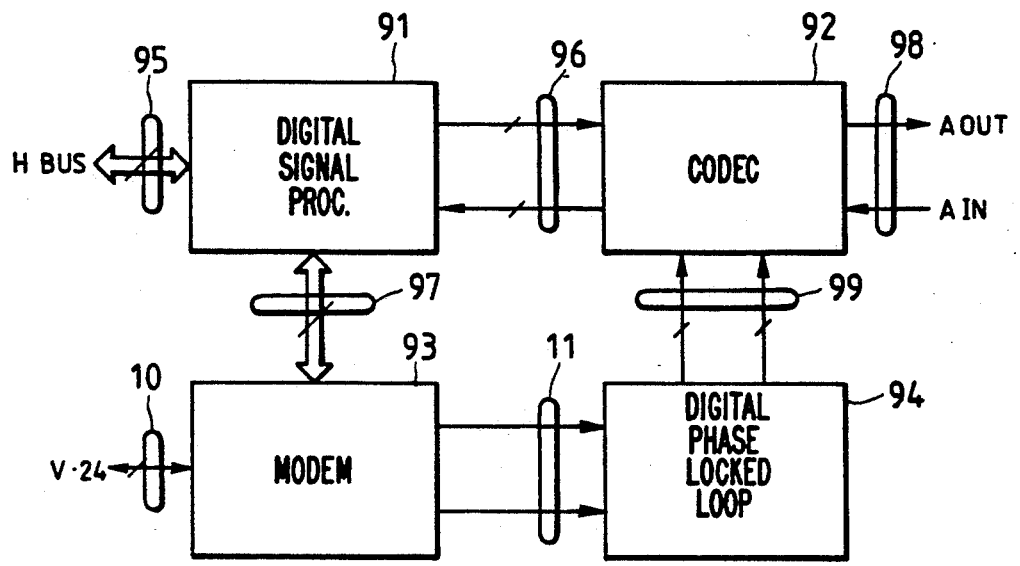
FIG. 17 is a block diagram showing the inside of the circuit according to another embodiment of the present invention.

FIGS. 17 to 38 are explanatory views showing the hardware of the VLSI one-chip MODEM to which the present invention is applied. FIG. 17 is a block diagram showing the entire structure of the hardware. Incidentally, the entire structure of FIG. 17 is preferably integrated over a common semiconductor substrate like that of FIG. 3.

As the modulation and demodulation system to which the present invention can be applied, there can be enumerated a relatively high-speed orthogonal amplitude modulation and demodulation system such as the PSK (i.e., Phase Shift Keying) system for modulations and demodulations by switching the carrier phase in accordance with the value 1 or 0 of the data signals or a QAM (Quadrature Amplitude Modulation) system for modulations and demodulations by changing not only the carrier phase but also the amplitude in accordance with the value 1 or 0 of the data signals.

In FIG. 17, reference numeral 91 designates a digital signal processor (which will be shortly referred to as "DSP"). Numeral 92 designates a digitized linear codec (which will be shortly referred to as "CODEC"). Numeral 93 designates a special-purpose MODEM circuit (which will be shortly referred to as "MLOGIC") composed of a serial interface or a sampling timer. Numeral 94 designates a digital phase lock loop (which will be shortly referred to as "DPLL") having two sets of circuit. The DSP 91 is equipped with: an interface (which will be called "H-BUSI/F") 95 with a terminal device; an interface (which will be called "CODEC-I/F") 96 for transferring the send and receive data with the CODEC 92; and a peripheral bus (which will be called "I/O-BUS") 97 for transferring the digital data with the MLOGIC 93. The CODEC 92 is equipped with not only the interface 96 (which will be called the "CODEC-I/F") but also: an interface (which will be called "PLLT-I/F") 99 for the CODEC fundamental timing signal from the DPLL 94; and an analog interface (which will be called "A-I/F") 98. Moreover, the MLOGIC 93 is equipped with not only the I/O-BUS 97 from the DSP 91 but also: the serial interface terminal (which will be called "S-I/F") 11 with the terminal; and the interface (which will be called "SMPLT") 10 with the sampling timing signal. On the other hand, the DPLL 94 is connected with the CODEC 92 and the MOLOGIC 93 through the serial interface terminal 11 and the PLLT 97. The data SD (i.e., SEND, DATA) from the terminal are inputted at a predetermined speed through the S-I/F 10 of the MLOGIC 93 and are modulated by the DSP 91. The data thus modulated is inputted through the CODEC-I/F 96 to the CODEC 92 in which it is passed through the digital low pass filter (LPF). After this, the filtered data is D/A-converted and outputted to the A-I/F 98 so that it is transmitted. On the other hand, the received signals are inputted through the A-I/F 98 and are A/D-converted by the CODEC 92 to digital signals. These digital signals are passed through the low pass filter LPF to eliminate the noises outside the necessary range. These filtered signals are transferred to the DSP 91, in which they are demodulated to the original data by the digitizing signal processing so that they are outputted as the received data RD (RECEIVE DATA) from the S-I/F of the MLOGIC 93. Moreover, the DPLL 94 has an action to match the sample timing designated by the MLOGIC 93 and the actual sampling timing of the CODEC 92. On the other hand, the H-I/F of the DSP 91 either is used to receive the signals necessary for the operations of the MODEM such as a start signal, a mode signal, a parameter signal or send data from the terminal, to return the received data and to inform the terminal of the internal status.

Figure 18:
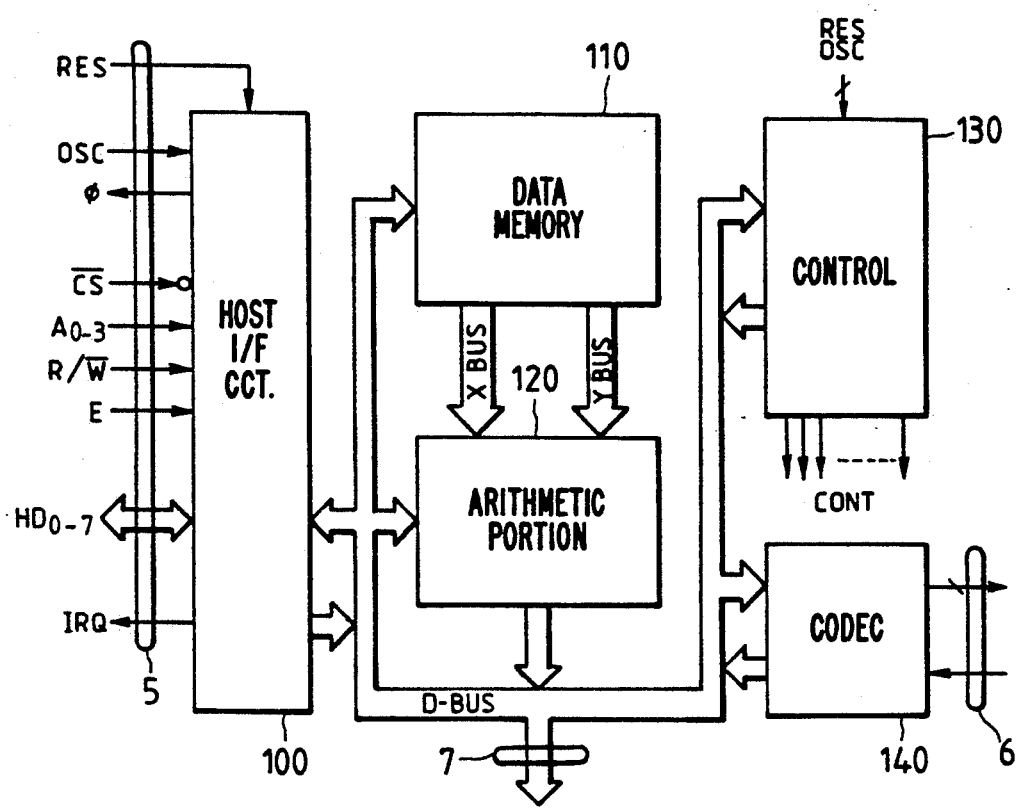
FIG. 18 is a block diagram showing the internal circuit of a DSP 91 of FIG. 17.

The DSP 91 has a structure, as shown in FIG. 18. In FIG. 18, reference numerals 100, 110, 120, 130 and 140 designate a HOST-I/F circuit, a data memory, an arithmetic portion, a control portion (CONT) and a CO-DEC-I/F circuit, respectively, all of which are connected with one another through three data buses X-BUS, Y-BUS and D-BUS. Moreover, those blocks have their data transfers and internal functions controlled by not-shown control signals (generated by the CONT 130).

The HOST-I/F circuit 100 is constructed, as shown in FIG. 19, of input register 101 and output register 102 for transferring data with the terminals, a flag register 103 for indicating the situation of the interface, a circuit 104 for accessing to those registers from the terminal side, and a fundamental operation timing generating circuit 105 for generating the timings of the fundamental operations of the DSPI. The HOST-I/F circuit 100 is connected with the terminals through the data buses ($D_0$ to $D_7$) and access signals (R/W, IE, $A_0$ to $A_3$, $\overline{CS}$ and so on) and with the inside of the DSP through the D-BUS to transfer the aforementioned various data.

Figure 20:
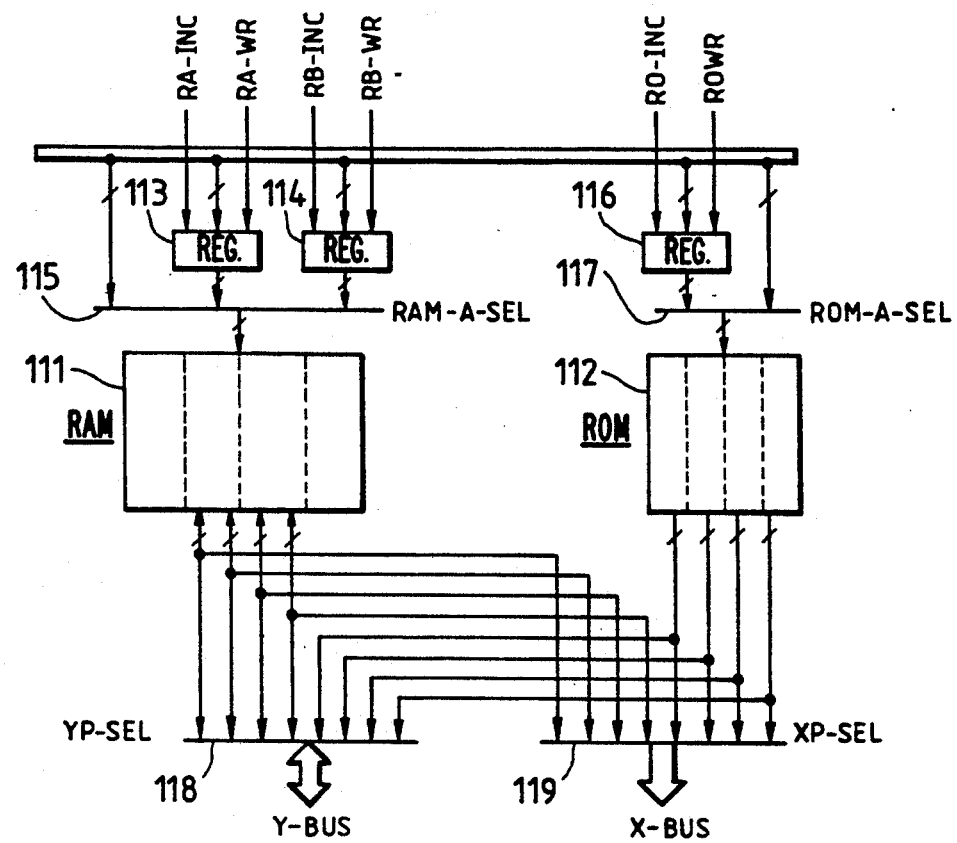
FIG. 20 is a circuit diagram showing the data memory portion of the same.

The data memory 110 is constructed, as shown in FIG. 20, such that there are disposed around a RAM 111 and a ROM 112 address pointers RA 113 and RB 114 and a selector 115 of the RAM 111 and an address pointer 116 and a selector 117 of the ROM 112 and such that there are disposed at the data bus side RAM selectors 118 and 119 for the X-BUS and Y-BUS. The RAM 111 is composed of four pages and a readable/writable memory to which is designated an address selected by the address selector 115. The address to be selected includes three addresses, i.e., the address designated directly by a software instruction and the output addresses of the pointers RA 113 and RB 114. The selected address is inputted to the address of the memory. The four pages are simultaneously accessed at the data bus side of the memory, where two sets of selectors 118 and 119 one of which can be independently selected and outputted to the Y-BUS and the X-BUS. Thus, it is possible to exhibit the dual port RAM functions. The address pointers RA 113, RB 114 and RO 116 are counters which can be read or written directly or indirectly through the accumulator by the software and can have their values updated automatically subsequent to the reference to the memory. The ROM 112 has functions similar to those of the RAM 111 except that it is a read only memory. The reading and writing operations of the selectors and pointers can be designated wholly by the one-instruction software. As a result, these data memories can not only make a direct reference to the designated address designated by the instruction but also accomplish various memory accesses by the address pointer, the multi-page simultaneous reading, the multi-input switching selector and the two read buses.

Figure 21:
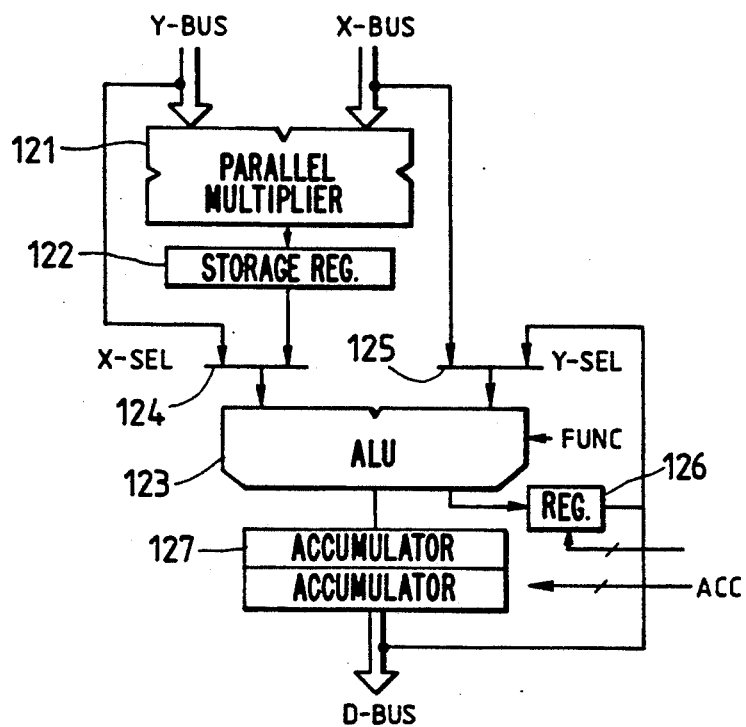
FIG. 21 is a circuit diagram showing the arithmetic portion of the same.

The arithmetic portion 120 is constructed as shown in FIG. 21. In FIG. 21, reference numeral 121 designates a parallel multiplier (MULT), and numeral 122 designates a temporary storage register (MOUT) for latching the multiplied result and always multiplies the values of the Y-BUS and X-BUS at each operation clock of the DSP1. Numeral 123 designates an addition/subtraction-logical arithmetic circuit (ALU). Numerals 124 and 125 designate one and other input selectors so that the (FUNC) arithmetic results designated by an instruction and their statuses are latched in accumulators (ACC) 127 and a status register (CCR). One of the ACC 127 is selectively used in accordance with the instruction. As is apparent from FIG. 21, the arithmetic portion 120 has its MULT 121 and ALU 123 connected with the known pipe lines so that it can execute the multiplication and summation of $A = A + B \times C$, for example, apparently at each operation clock of the DSP. On the other hand, the inputs to the ALU 123 can be switched in various manners in accordance with the instruction of the software by the selectors 124 and 125. This switching is suitable for the MODEM signal processing having many arithmetic operations that can be expressed by the above-specified equation. Since, moreover, the present arithmetic unit supports a floating point expression type, it is featured by its wide dynamic range of the signals and by its feasible bit operation processing such as the scrambler or differential coding intrinsic to the high-speed MODEM. Other features are that the bit shifting operations can be facilitated by the floating point arithmetic and that those instruction formats can be easily prepared.

Figure 22:
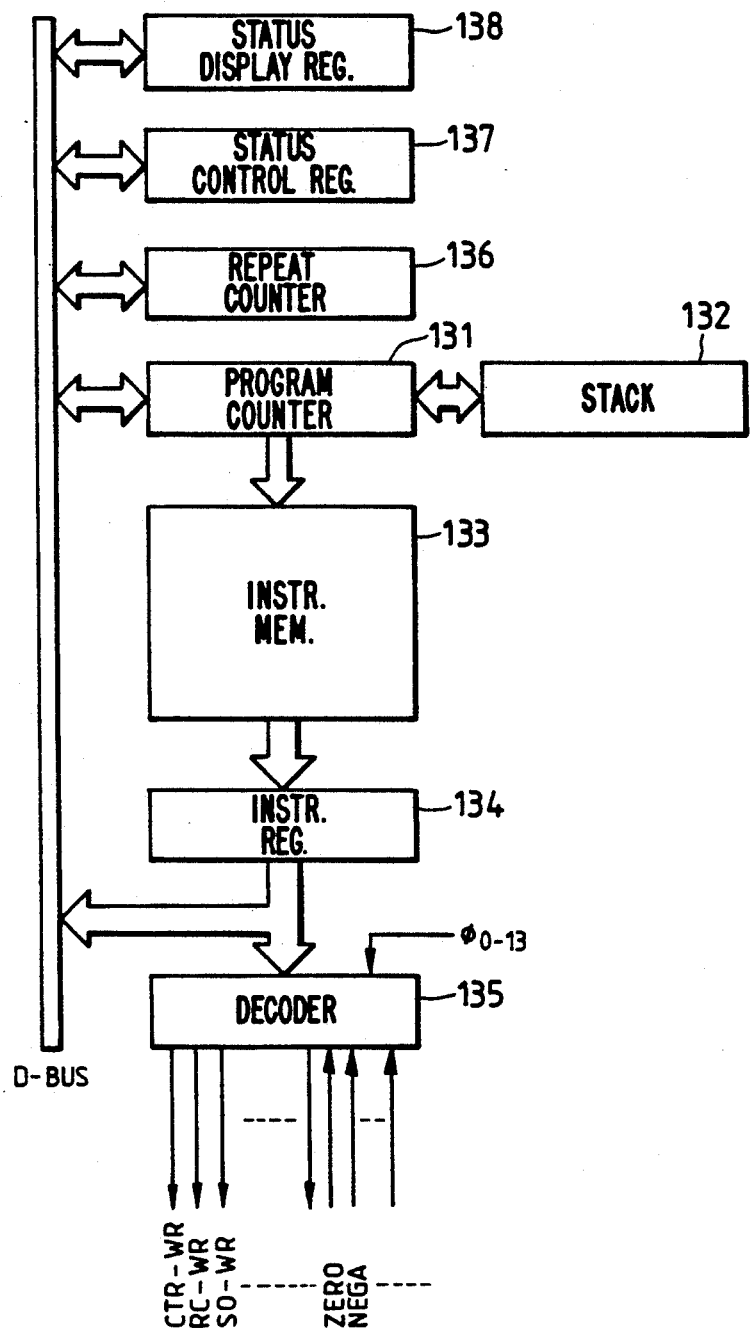
FIG. 22 is a circuit diagram showing the control portion of the same.

The control portion 130 is constructed, as shown in FIG. 22. In FIG. 22: reference numeral 131 designates a program counter (PC); numeral 132 a stack (STACK); numeral 133 an instruction latching memory (I-ROM); numeral 134 an instruction register (I-Reg); numeral 135 an instruction decoder (I-Dec); numeral 136 a repeat counter (RC); numeral 137 a status control register (CTR); and numeral 138 a status display register (CR), all of which are connected with the D-BUS, as shown. The PC 131 generates an address for designating an instruction in the I-ROM 133 and usually updates the values of the instructions one by one each time it executes the instructions. In case a jump instruction is executed, the jump target address in the instruction is inputted through the I-REG 134 and D-BUS to the PC so that its content is interchanged. In the case of the subroutine referring instruction, too, the reference address in the instruction is likewise interchanged. In this case, the previous PC address is temporarily latched in the stack 132 until the end of the subroutine. The plural stacks enable the subroutine to be referred to even during the execution of the subroutine. At the end of this subroutine, the processing can be reopened by returning the latest address from the stack 132. Another manner of using the stack is by an interruption. This interruption forcibly interrupts the flow of the processing being executed to effect an interrupt prepared in advance. This interrupt uses the stack like the case of the subroutine and temporarily latches the previous value of the PC for the reopening. Since the interrupt is executed by the circuit, the processing sequence to be interrupted cannot know the interrupt timing correctly. As a result, the data or status flags being processed may be broken. At the interrupt processing side, therefore, it is necessary to latch the situation of the processor, if necessary, at the time of interrupt. In case a numerical value designated by an instruction is to be latched directly in the above-specified ACC 127 or another register, the instruction format temporarily latched in the I-REG 134 is partially transmitted through the D-BUS. The instruction decoder 135 interprets the instruction format to generate a control signal so as to control the entire operations of the DSP 1 including the CONT portion. On the other hand, the RC 136 is a register for controlling the repetitions of the instruction. The number of repetitions set in the RC 136 is controlled by the RC control instruction so that the the execution of the same instruction or a series of processing instructions repeatedly at a designated number may be controlled by the circuit. According to this function, there can be obtained an advantage that the execution efficiency of the instruction is good for repeating the arithmetic processing without any interruption. The status control register CTR 137 controls the macro-operations of the CONT 130 and can permit or prohibit the interruption. The status display register CR 138 is one for reflecting the input situation of interruption, the operating situation of an external interface and the arithmetic situation and can read and write in response to an instruction. These functions of the CONT 130 are basically known as the microcomputer technique.

Figure 23:
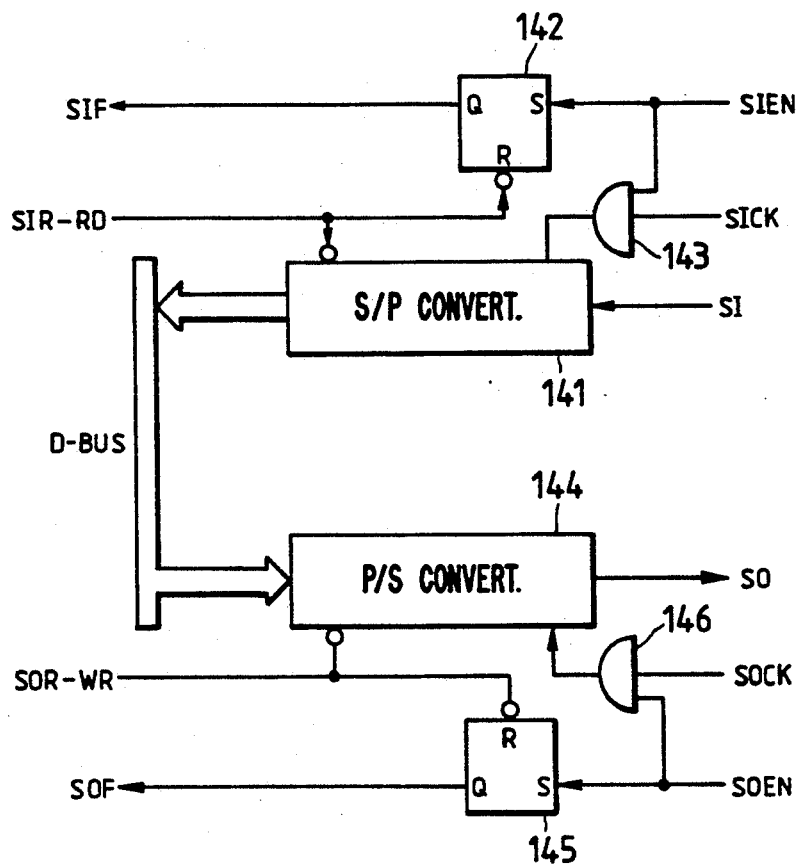
FIG. 23 is a circuit diagram showing the CODEC interface portion of the same.

The CODEC-I/F 140 is a serial interface circuit, as shown in FIG. 23. In FIG. 23, numeral 141 designates a register (SIR) for converting serial data (SI) inputted to parallel data of 16 bits and for reading and inputting them to the D-BUS in response to an instruction. The SI is inputted to the SIR in response to a transfer clock SICK. Numeral 142 designates a status register for knowing a transfer end in response to an external signal SIEN to inform the CONT 130 of it. The signal SIEN controls the data input to the STR 141 through a gate 143. Numeral 144 designates a register (SOR) for converting the parallel data of 16 bits, which are written through the D-BUS, to serial output data (SO) in response to an instruction and for outputting the serial output data (SO). The data SO is outputted to the outside from the SOR in response to the transfer clock SOCK. Numeral 145 designates a status register for indicating the transfer end in response to an external signal SOEN and to inform the CONT 130 of it. Moreover, the signal SOEN also controls the data output from the SOR 144 through a gate 146. The SIF and the SOF are used as the interruption signals in the CONT 130. These interruptions can be independently masked by the CTR 137. On the other hand, the CR 138 can directly see the SIF and the SOF so that the data input/output can be accomplished without any interruption.

Figure 24:
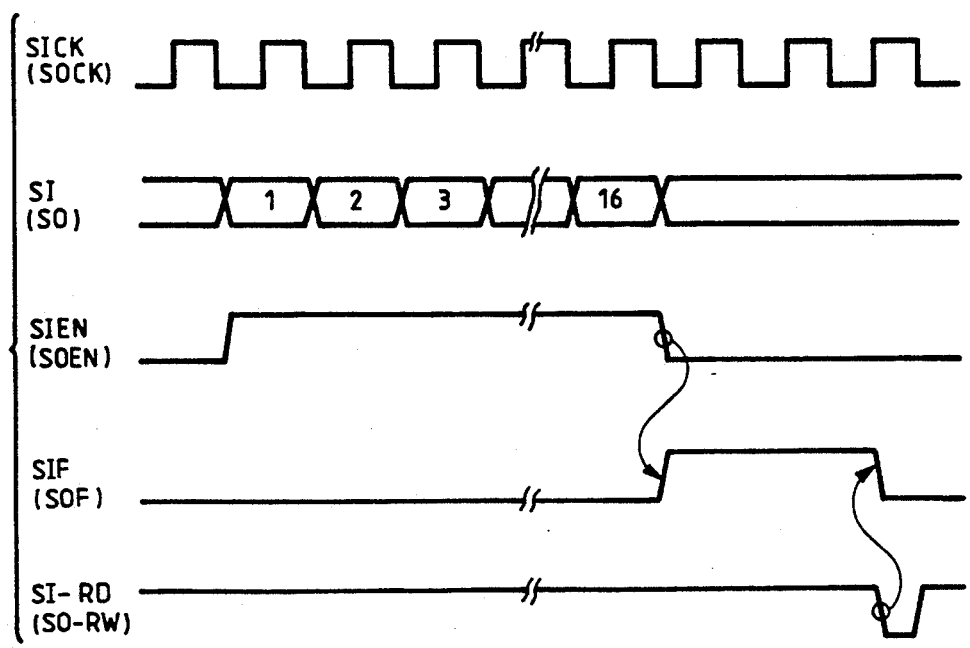
FIG. 24 is a timing chart of the same.

FIG. 24 is a timing chart of these transfer operations. The names of the signals appearing in FIG. 24 are shared with those of FIG. 23, and the STR 141 and the SOR 144 similarly operate. The input of the data is operated in response to the SI and SICK generated by a not-shown circuit. Usually, the SIEN instructs the effective section of the data BI at the "H" for the sixteen clock sections of the SICK. The fall of the SIEN gives the transfer end timing, at which the transfer end flag SIF is raised (to "H"). The program of the DSP knows the transfer end in view of the SIF, and the data can be fetched from the STR 141 into the D-BUS in response to an internal introduction instruction (SIR-RD). By executing this instruction, the SIF is returned to the "L" level. The SOR 144 has the same meaning except that the SIF is an instruction permitting flag by the DSP 91 whereas the SOF is a write permitting flag by the DSP 91.

Figure 25:
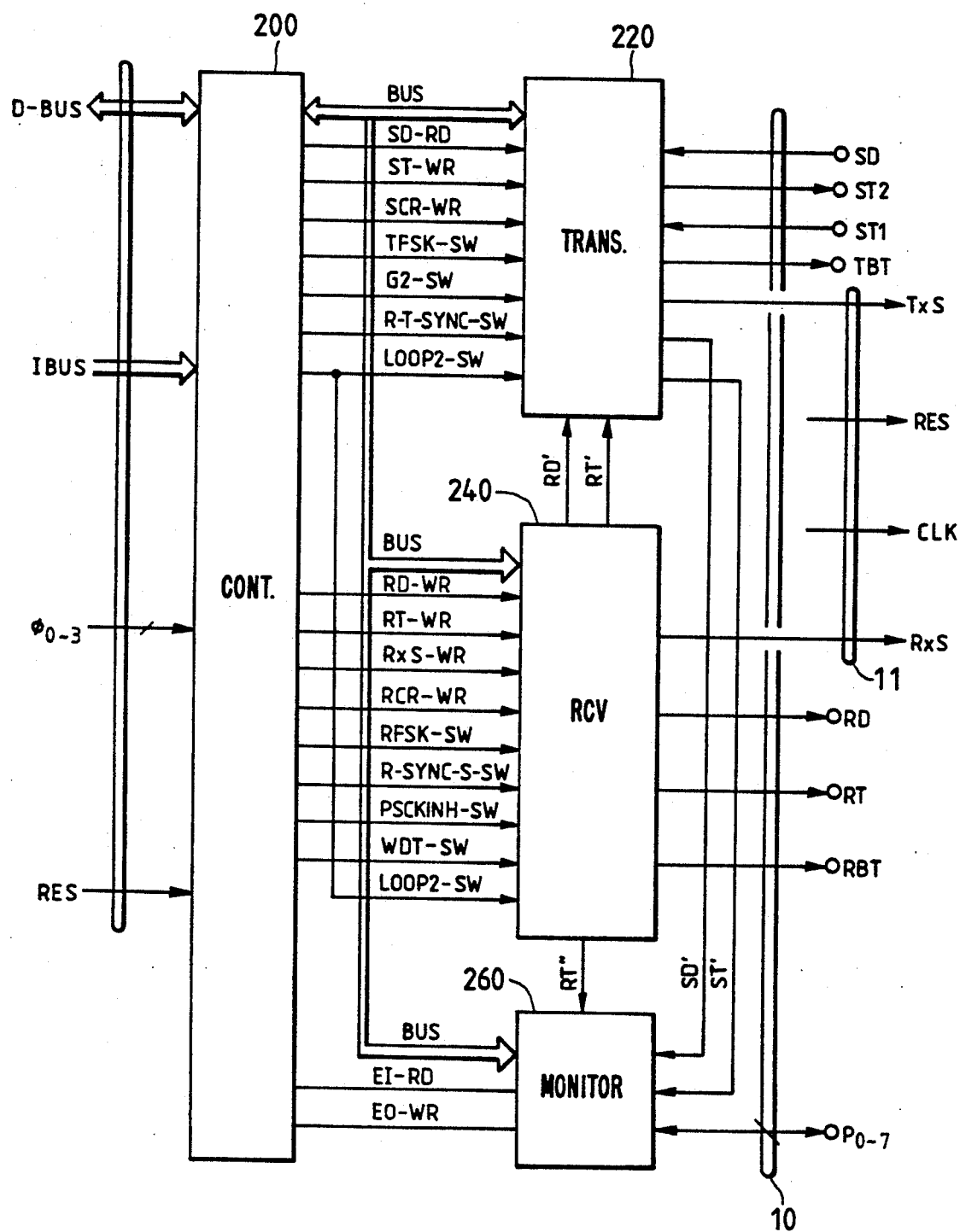
FIG. 25 is a block diagram showing the internal circuit of a MLOGIC 93 of FIG. 17.

The MLOGIC 3 is constructed, as shown in FIG. 25. In FIG. 25, reference numerals 200, 220, 240 and 260 designate a control portion, a transmitting portion, a receiving portion and a common portion, respectively. With the control portion 200, there is connected the I/O-BUS 7 from the DSP 1, which includes the output signal I-BUS of the instruction I-Reg 134 of the DSP 91, the D-BUS or the timing signal. By these signals, the MLOGIC 3 is controlled in its entirety. The control portion 200 generates timings necessary for operating the transmitting portion 220, the receiving portion 240 and the common portion 260 and is connected with the DSP 91 through the BUS. Of the output signals of the control portion 200, the signals followed by -WP or -RD are those decoded from the signals of the I-BUS to control the data transfer with the data input/output circuit in each block. On the other hand, the signal followed by -SW are switching signals for switching the elements in each block in accordance with the operation mode. The transmitting portion 220 is connected with the outside through the S-I/F 10 to receive the send data SD in response to the timing signal ST1 or ST2 or the TBT signal and to generate the send sample timing T×S through the SMPLT interface 11. Moreover, the transmitting portion 220 receives the loop signals RD' and RT' from the receiving portion 240 and sends the monitor signal SD' and ST' to the common portion 260. The receiving portion 240 is connected with the outside through the S-I/F 10 to output the receive data RD in response to the timing signals RT and RBT and to generate the receive sampling timing R×S through the SMPLT interface 11. Letters RT" designates a monitor signal. The common portion 260 has a function to monitor not only the general-purpose input/output circuits $p_0$ to $P_7$ but also the internal signals SD', ST1' and RT". The feature of this structure is that it interprets the instruction by extracting the instruction signal of the DSP1. This raises an advantage that a new instruction can be added without influencing the instructions intrinsically belonging to the DSP 91.

Figure 26:
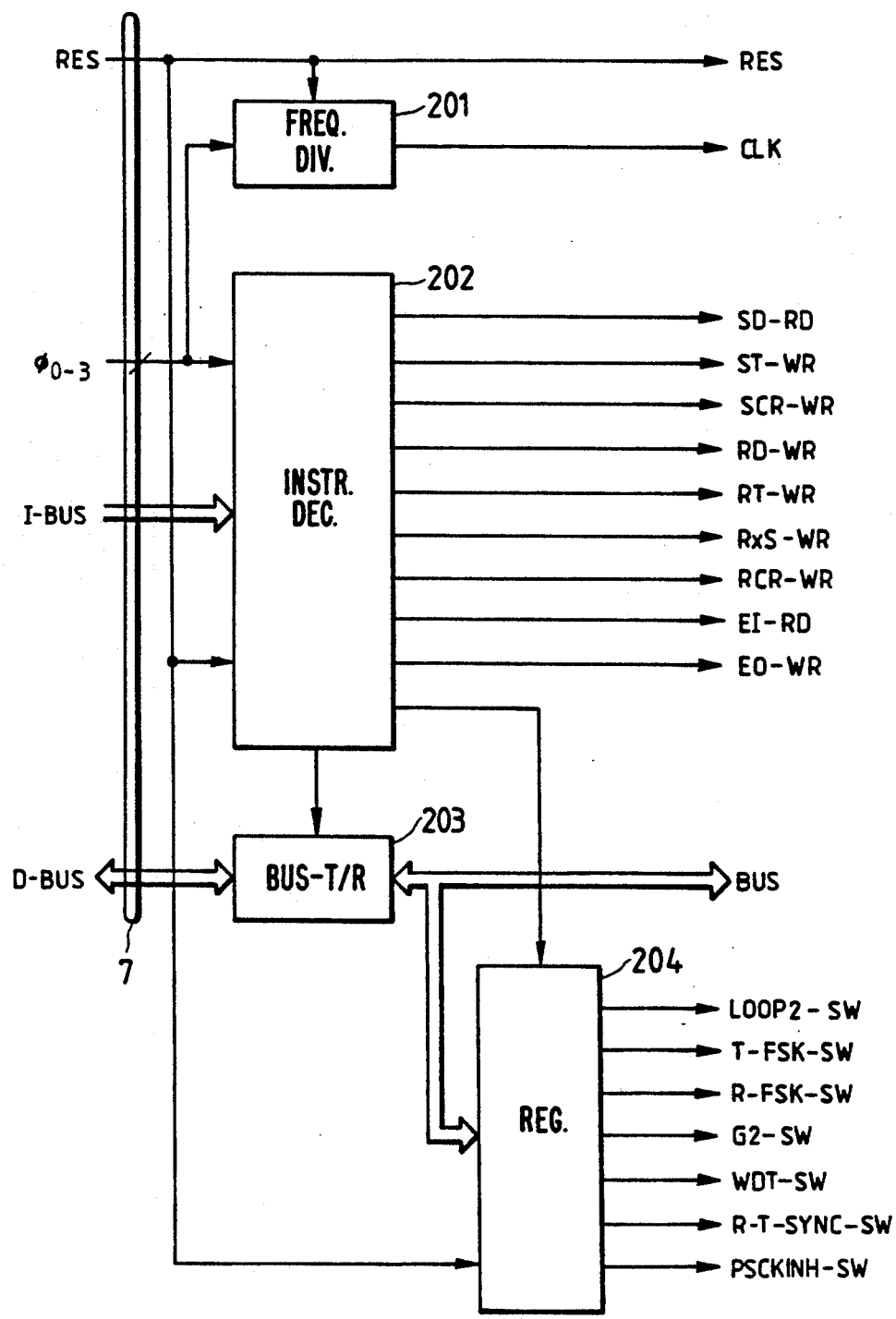
FIG. 26 is a circuit diagram showing the control portion of the same.

The control portion 200 is constructed, as shown in FIG. 26, of: a frequency divider 201; an instruction decoder 202; a bus transceiver (BUS-T/R) for connecting the D-Bus leading from the DSP 1 and the BUS in the MLOGIC 3; and a structure control register (SW) for controlling the connections of the individual elements in the MLOGIC 3. The frequency divider 201 divides the basic clock $\phi_0$ of the DSP 1 into the signal CLK having a half frequency. The instruction decoder 202 uses the the instruction signals I-BUS from the DSP 91 and the fundamental timing signals $\phi_0$ to $\phi_3$ to generate the read and write signals (-RD: read; and -WR: write) in the registers of the MLOGIC 3. The BUS-T/R 203 responds to the output T/R-SW of the instruction decoder 202 to operate the signal receiver and the bus driver in the flow direction of the signals. The SW 204 is a special-purpose register for writing and controlling the content of the ACC 127 of the DSP 91 in response to the instruction (SW-WR).

Figure 27:
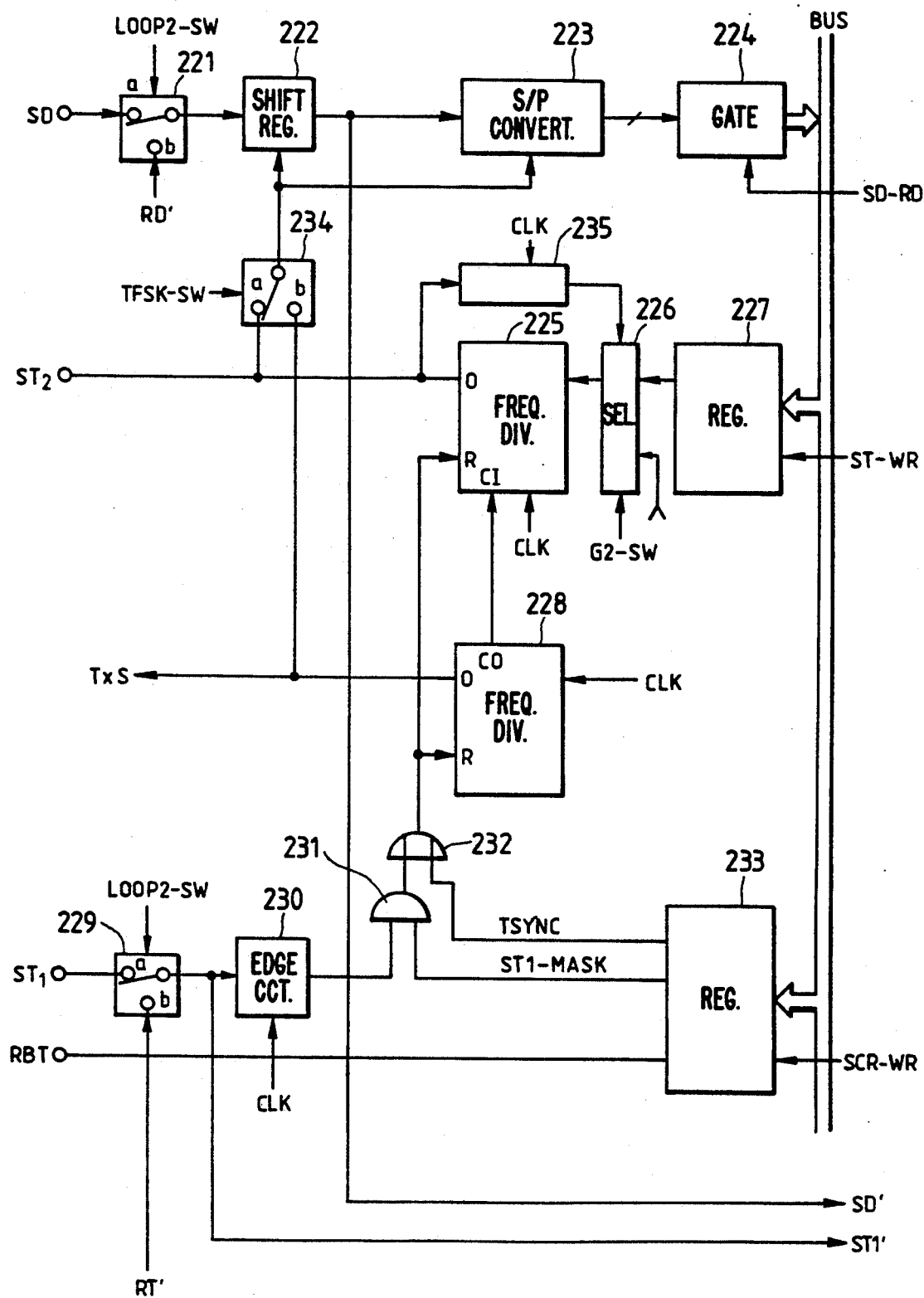
FIG. 27 is a circuit diagram showing the transmitting portion of the same.

The transmitting portion 220 is constructed, as shown in FIG. 27, a timing frequency divider for generating a sample timing for transmissions, a serial/parallel converter for receiving the send data, a transfer rate generator, a timing control circuit and so on. Numeral 221 designates a change-over switch. Numeral 222 designates a one-bit shift register (DFF) for temporarily latching the SD. Numeral 223 designates a shift register (S/P) for receiving the output of the DFF 222 to convert the serial signal to a parallel signal. Numeral 224 designates a gate for inputting the output of the S/P 223 to the BUS in response to the instruction (SD-RD). Numeral 225 designates a frequency divider (ST) for generating the transfer timings for those SD. Numeral 226 designates a selector (SEL) for switching the inputs of the frequency dividing ratio to the ST 2. Numeral 227 designates a register (ST) for setting the frequency dividing ratio in response to the instruction (ST-WR). Numeral 228 designates a frequency divider (TXS) for dividing the frequency of the CLK to generate the sampling timing. Numeral 229 designates an edge gate circuit for generating narrow edge pulses by catching the fall of the input signal of the ST1, Numeral 231 designates an AND gate circuit for prohibiting the edge pulses. Numeral 232 designates an OR gate circuit for giving the edge pulses and the send timing synchronizing signals (TSYNC) having passed through the gate circuit to the ST 225 and the TXS 228. Numeral 233 designates a send timing control register.

In the transmission case, the timing chart of FIG. 28(a) is obtained by the internal timing operations of the synchronous MODEM. In the cases of the synchronous type and the ordinary transmissions, the switch number is set at the a side or in the OFF status. The TXS 228 divides the frequency of the output CLK generated by the control portion 200 to generate the TXS signal. The output CO of the TXS generates such a clock for the ST frequency divider 225 as is synchronized with the fall of the TXS. If the frequency division ratio is written in the ST register 227, the SEL 226 performs no action upon the synchronous MODEM but generates the signal ST2 in accordance with the frequency division ratio of the ST register 227. This signal ST2 is fed to an external terminal device so that it may be used as the feed timing of the send data SD, and is given to the internal DFF 111 and S/P 223 to receive the send data SD. In this case, the output TSYNC of the SCR register 233 initially reset the ST frequency divider 225 and the TXS frequency divider 228 to take the timing synchronization. At this time, the DFF 222 latches the data at the rise of the ST2 so that the S/P 223 inputs the output at the falling edge of the ST2. Since, moreover, the aforementioned SOF rises at a timing substantially synchronized with the TXS signal, the DSP 1 can operate in synchronism with those timings. As a result, the modulation timing can be determined by exceeding the number of times of SOF interruptions so that the send baud timing signals (SBT) can be generated.

In the case of the synchronous MODEM such as the QAM or PSK system, the operations are shown in FIG. 28(b) if the transmissions (in the ST1 mode) are synchronized with the external send timing ST1. Since the ST1 (ST1') can monitor the signal through the aforementioned general-purpose input circuit Ei, the output of the Edge circuit 230 can be passed through the gate 231 and therethrough to synchronously reset the ST frequency divider 225 and the TXS frequency divider 228 if the ST1 is inputted and if the ST1 mask signal is released (at "H"). Therefore, the ST1 mask ("L") is set, if the fall of the ST1 is detected by the ST1 monitor input of the EI register. Thereafter, the mask is released at each baud timing at the TXS timing preceding the baud timing and is set at the TXS timing of the baud timing. Then the ST1 and the internal timing can be synchronized. Incidentally, the discrepancy in the timing between the ST1 and the internal ST2 is intrinsically 1/10,000 or less according to the standards. The mask is not set before the synchronization because of the delay in the soft processing even in case the ST1 has a longer timing than that of the TXS timing.

In the case of an asynchronous MODEM such as an FM or FSK type MODEM, as shown in FIG. 28(c), a pre-determined ST2 is generated (as exemplified by 1,200 bps) for the conveniences of data inputs. However, the modulations are accomplished at the TXS timing, and the TFSK-SW is fallen down to the b side so that the SD is fetched and processed at each TXS timing. Thus, in the case of the synchronous MODEM, the SD of plural bits is stored in the S/P 223 and inputted. In this case, however, the S/P 223 is used for a mere latching function.

In the case of the G2 MODEM, there no data transfer rate to be designated. In this case, the internal processing is accomplished at 9.6 Kbps, and a timing is conveniently generated and fed to the external terminal device. In the case of the present embodiment, two frequency division ratios are prepared and switched at each suitable ST2 by the selector 226. In this case, the data transfer rate is 10,368 bps, and the modulations are asynhronous. The internal processing is accomplished in synchronism with the TXS. The input of the ST frequency divider switches the frequency divider at each of the nine signals ST2 of 56.2 Khz. In case the band of the send data are to be limited, the upper bit of the ST frequency divider 225 may be set.

The LOOP 2 mode is the remote digital loop test mode, in which the received data are again modulated and transmitted. In this case, the SEL 221 and 229 are used to input the received data RD' and the received timing RT as the SD and ST1. If all the heavy operations are accomplished in the ST1 mode, the remote digital loop can be realized merely by instructing the mode but without any external switching circuit. Incidentally, the circuit according to this embodiment has an advantage that the RD signals can be used for sorting the troubles.

Figure 29:
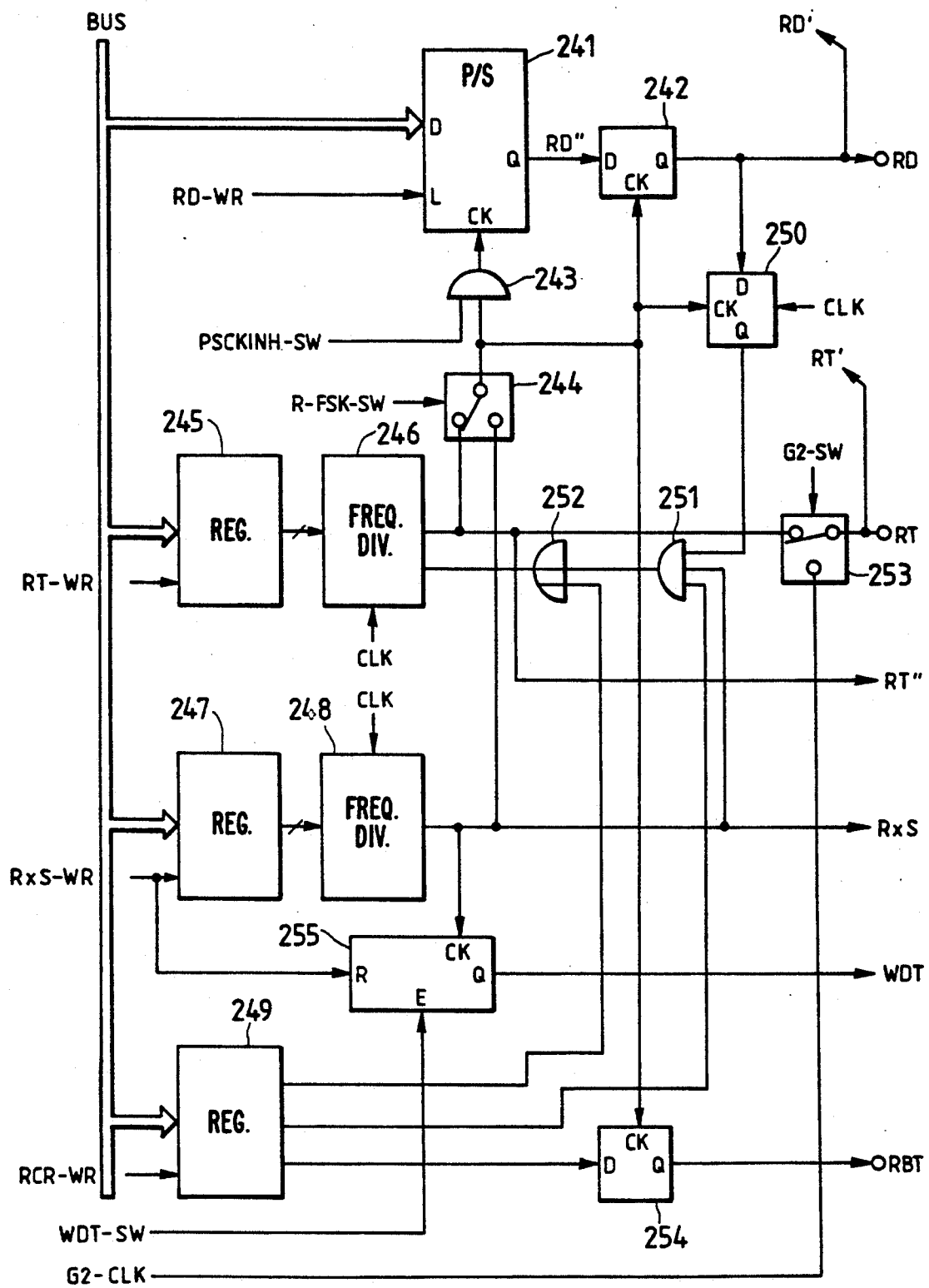
FIG. 29 is a circuit diagram showing the receiving portion of the same.

The receiving portion 240 is composed, as shown in FIG. 29, of a receiving sampling timer, a transfer rate generator, a parallel/serial converter for outputting the receive data, a timing control circuit and so on. Reference numeral 241 designates a shift register (P/S) for writing the data, which are demodulated in response to the instruction (RD-WR) of the DSP 1, through the BUS of the control portion 200 and for converting the parallel signal, which are to be outputted as the receive data (RD) through a one-bit shift register (OFF) 242, into a serial signal. Numeral 243 designates a gate for prohibiting the transfer clock input of the P/S 241. Numeral 244 designates a switching circuit (SEL) for switching that transfer clock. Numeral 245 designates an RT register for setting the frequency division ratio of a transfer rate (RT) frequency divider 246 in response to the instruction (RT-WR) of the DSP 91. Numeral 247 designates an RX register for setting the frequency division ratio of an RXS frequency divider 248, which is operative to generate the receive sample timing RXS, in response to the instruction (RXS-WR) of the DSP 91. Numeral 249 designates a timing control register (RCR) at the receive side. Numeral 250 designates an edge detecting circuit (Edge) for generating pulses synchronized with the CLK by catching the rising and falling changes of the receive data RD. Numeral 251 designates a circuit for synchronizing that edge signal with the RXS signal and for gating it through the change-over signal R-SYNC-SW. Numeral 252 designates an OR gate for giving the output of that gate 251 and the RSYNC signal generated by the program of the DSP 91 to the RT frequency divider. Numeral 253 designates a switching circuit (SEL) for outputting the data transfer timing signal, which is generated by the ST frequency divider at the transmission side when in the G2 mode, as the RT signal. Numeral 254 designates a one-bit shift register (OFF).

In the case of the synchronous MODEM, the RCR is reset, and the SEL 244 and 253 are fallen down to the a side. When the RXS frequency divider 248 generates the receive sample timing signal RXS with the specified frequency division ratio set in the RXS register 247, the A/D converter in the CODEC 92 quantizes the MODEM input signal with that timing, and the quantized signal is received by the SRT 141 of the DSP 91 to accomplish the receive processing according to the program of the DSP 91. If the optimum timing is obtained by the receive processing, the sampling timing is adjusted by adjusting the frequency division ratio which is set in the RXS register 247. Simultaneously as it is confirmed that the RXS timing has been synchronized with the timing of the demodulation signal by that adjustment, the transfer timing RT of the receive data is timed with the RXS timing in response to the RSYNC signal. At the timing synchronized with the RXS, the DSP 91 is interrupted, and the signal is processed at each interruption unit. At first, the receive processing is accomplished at an arbitrary timing so that an arbitrary demodulation timing is prepared for the internal processing. Then, the timing discrepancy is corrected by adjusting the RXS frequency ratio to adjust the RXS at first. The timing of the RT frequency divider 246 is adjusted by the use of the RSYNC signal to the demodulation timing synchronized with that corrected RXS timing. In other words, the RSYNC is generated from the DSP 91 at the SIF interruption timing when at the baud timing of the timing adjustment. Thus, the original RRT frequency divider 246 operates in response to the output CO of the RXS frequency divider so that their timing synchronization continues. After the end of the synchronization described above, as shown in FIG. 30(a), the demodulation data is written in the P/S 241 in response to the instruction (RD-WR) of the DSP 91 during the interrupt processing corresponding to the SIF synchronized with the fall of the receive demodulation timing RBT. Then, the data transfer is accomplished while delaying that output RD" one bit by the DFF 242. This DFF 242 has an effect to eliminate the mismatching of the RD-WR timing due to the software processing.

In the case of the asynchronous MODEM such as the FM or FSK system, as shown in FIG. 30(b), the convenient clock RT is generated. The SEL 244 is fallen down to the b side to output the receive data, which are demodulated with the timing of the RXS signal, with the timing of the RXS signal. In this case, a change can be theoretically made for each RXS signal like the parenthesized RD" signal, but in vain because the send signal is transmitted at a sufficiently low rate. However, a complete synchronization with the RT cannot be attained under the influences of the transmission lines.

FIG. 30(c) shows the actions of the synchronizing circuit (Edge 250). Even in case the changing portion of the receive data is deviated back and forth, the RT frequency divider can be synchronized with the changing point of the RD by setting the RSYNC-SEL signal at "H". In this case, during the demodulations of the DSP 91, the R-SYNC-SEL-SW signal can be gated and finely controlled, as shown in FIG. 30(c). Likewise, the receive data itself can be filtered by the processing of the DSP 91 to suppress the mismatching of the timing reset.

Incidentally, the RBT signal is outputted together with the RD signal through the one-bit shift register 254.

Figure 31:
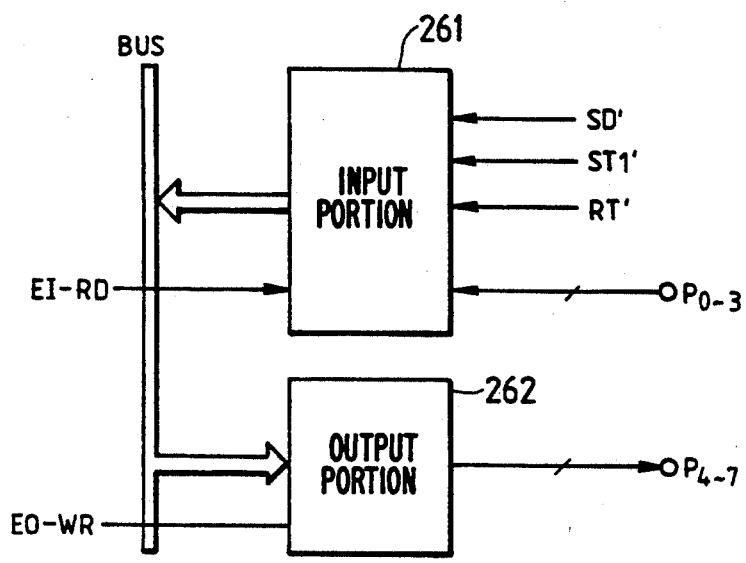
FIG. 31 is a circuit diagram showing the common portion of the same.

The common portion 260 is composed of a general-purpose input/output register, as shown in FIG. 31. In FIG. 31, reference numeral 261 designates a general-purpose input portion which is made receptive of not only the inputs $P_0$ to $P_4$ outside of the LSI but also the aforementioned signals SD', ST1' and RT' to be monitored and can input them to the ACC 127 in response to the instruction (EI-RD) of the DSP 91. On the other hand, numeral 262 designates a general-purpose output portion which can output the value of the ACC 127 in response to the instruction (EO-WR). The terminals $P_0$ to $P_{12}$ can be used for the simple interface signals of the MODEM such as the RS input and CD/CS output terminals under the V.24 standards, for example.

Thus, the MLOGIC can cope with the various MODEM modes.

Figure 32:
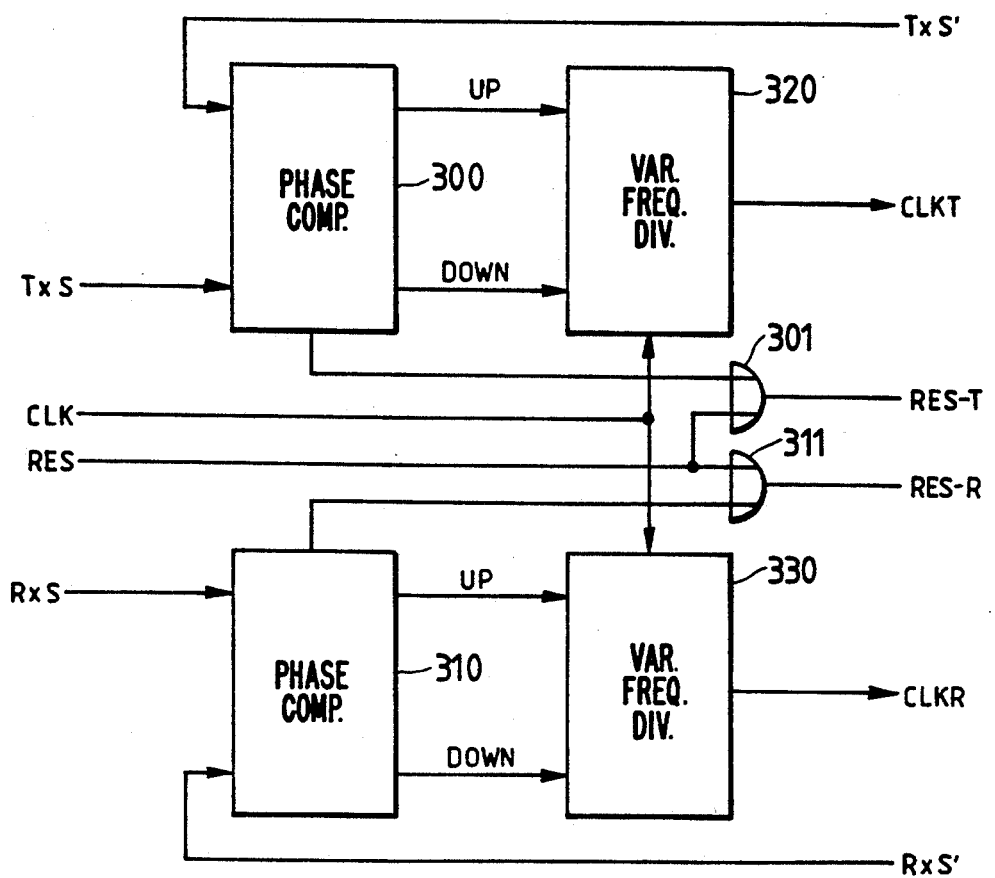
FIG. 32 is a block diagram showing the internal circuit of a DPL 94 of FIG. 17.

The digital OLL 94 is constructed, as shown in FIG. 32. In FIG. 32: reference numerals 300 and 310 designate phase comparators; numerals 320 and 330 variable frequency dividers; and numerals 301 and 311 OR gates.

The sampling timing RXS' in the CODEC 92 and the phase of the RXS' are compared in response to the input signals TXS, RXS and CLKRES from the MLOGIC 93 to generate the reset signals RES-T and RES-R for the CODEC 92. By correcting the periods of the CLK-T and CLK-R, moreover, the number of the CLK-T (or CLK-R) entering one period of the sample timing is not changed even in the course of the corrections of the sample timing. By dispersing the period of the CLK-T (or CLK-R) so that it may not abruptly fluctuate, still moreover, the phase is adjusted so that the CODEC 92 may operate with the funpull timing designated by the DSP 91 without deteriorating the characteristics of the CODEC 92.

Figure 33:
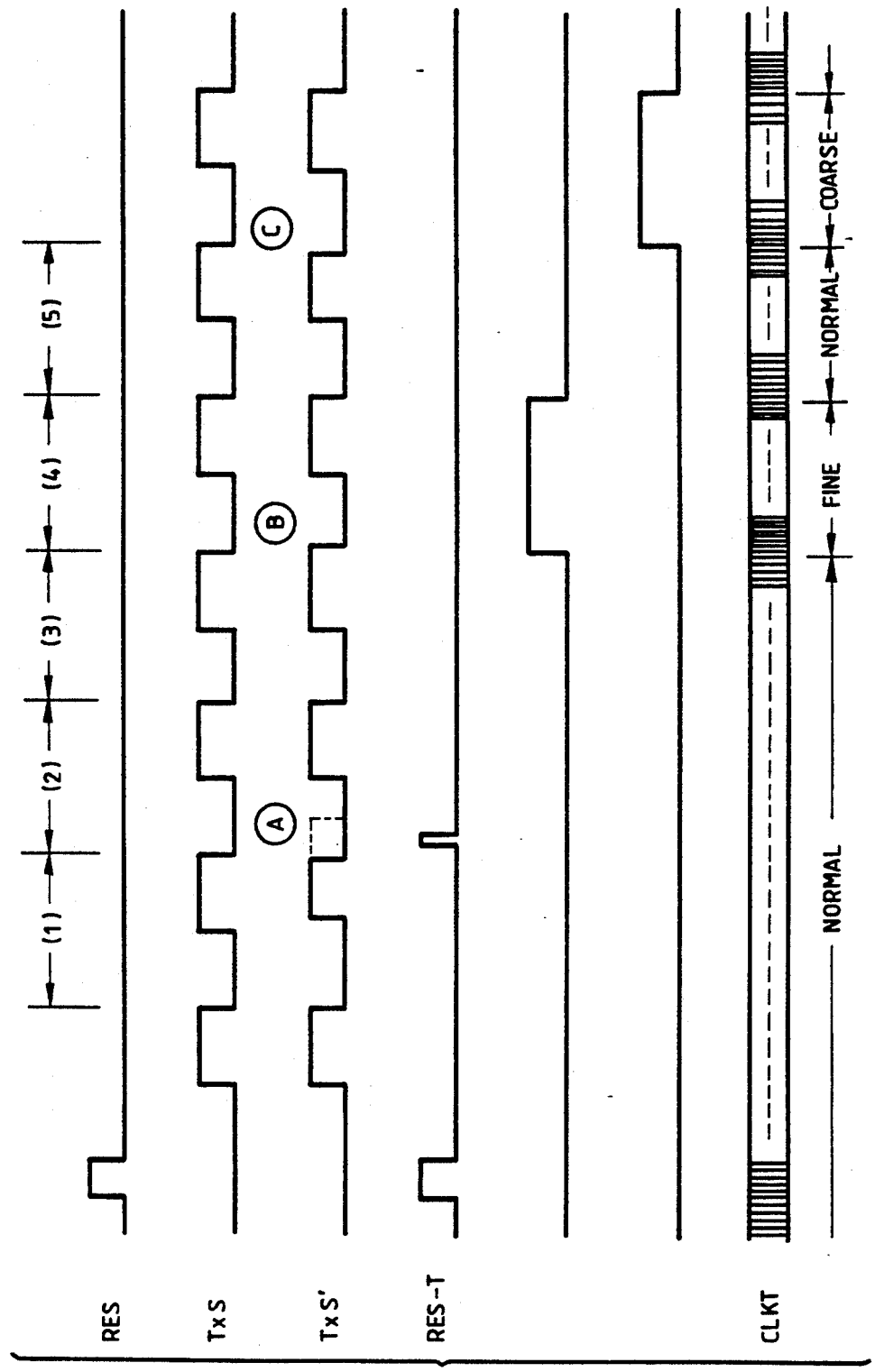
FIG. 33 is a timing chart of the same.

FIG. 33 is a timing chart for explaining the operations of the digital PLL 94. FIG. 33 shows the timings of the TXS only, but the timings of the RXS are absolutely similar. Immediately after the MODEM is powered, the reset signal (RES) is introduced from the external circuit to reset the sequence circuit such as a flip-flop or counter. In case (during the positive period of (1)) the operation is started from that status so that the internal TXS (=TXS') highly deviates from the RXS, the pulses (RES-T) are generated at the ending time of the TXS are generated to reset the sending portion of the CODEC 92 around the DA conversions. After the TXS and the TXS' are synchronized (2) by that resetting, the TXS has its period intentionally shortened slightly (3) by the signal processing of the DSP 91. Then, the period of the CLKT generated by the variable frequency divider is shortened for the period (4), and the ending timing of the internal TXS' is delayed to effect the synchronization. It is determined by the characteristics of the phase comparator 300 whether this comparator 300 generates the reset signal (RES-T) or change the width of the CLK-T. In the case of the present embodiment, a window of ± about 1.5 microsec is provided for the CLK of 7.3728 MHz and for a sample period of 1/9,600 sec so that a fine adjustment is accomplished inside of the window whereas the resetting is accomplished outside of the same. In this case, the sample period is a 768 clock period, but the operation clocks of the CODEC 92 are 128. For six CLK per one clock period, the variable frequency divider 320 is ordered to increase the frequency, in case the sample period is to be corrected, i.e., in case the period is shortened by about 1 microsec (4). As a result, the variable frequency divider 320 narrows the width of one CLJ for every sixteen operation clocks (CLK-T) so that the sample timing is corrected by slightly compressing the clocks. In case, on the contrary, the sample period TXS is slightly elongated (5) (by about 1 microsec, for example), the phase comparator 300 orders the variable frequency divider 320 to decrease the frequency. As a result, the variable frequency divider 320 narrows the width of one CLK for every sixteen CLK-T to make the clock CLK-T slightly coarser so that the sample timing is corrected. The RXS side is absolutely similar. Incidentally, under the MODEM standards, the modulation frequency and accuracy are determined within a range of ±0.01%. With the maximum deviation, therefore, the necessary correction is as small as the above-specified value of 1 microsec after passage of several pulses through the TXS and RXS. Thus, the RES-T or RES-R is not usually generated except one caused by the initial phase alignment.

Figure 34:
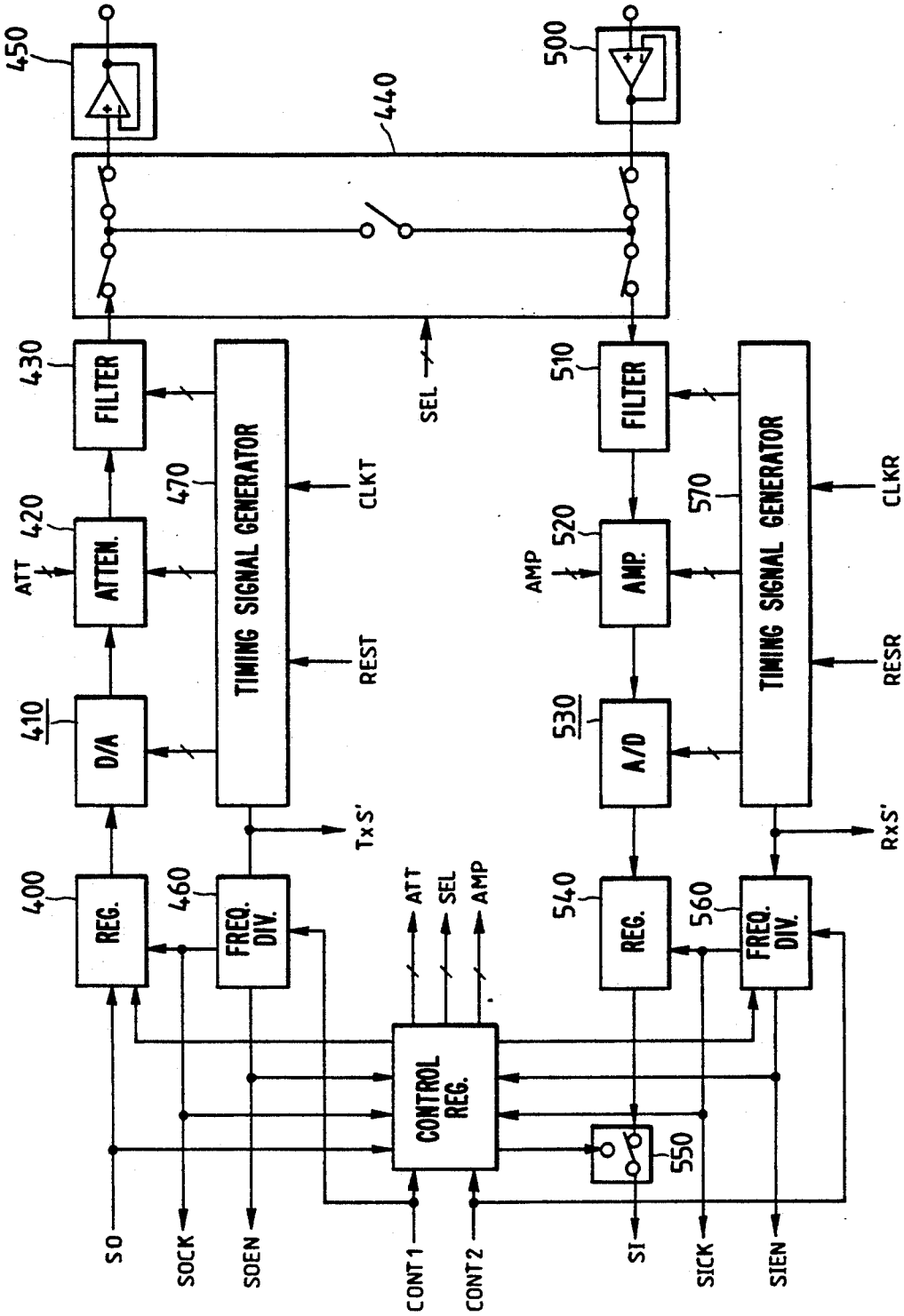
FIG. 34 is a block diagram showing the internal circuit of a CODEC 92 of FIG. 17.

The CODEC 92 is composed, as shown in FIG. 34, of: a D/A portion for converting a digital signal into an analog signal; an A/D portion for converting an analog signal into a digital signal; an interface with an external circuit; a control circuit, a timing circuit and so on. Reference numeral 400 designates a send buffer register (T-BUF); numeral 410 a D/A converter (DA); numeral 420 an attenuator (AT); numeral 430 a smoothing filter (PF); numeral 440 a switch (SW) for switching the flow of a signal for testing; numeral 450 an analog output buffer; numeral 460 a 1/16 frequency divider; numeral 470 a send side timing signal generator (TTMG); numeral 500 a digital output buffer; numeral 510 an outband signal processing filter (PF); numeral 520 an amplifier (AMP); numeral 530 an A/D converter (AD); numeral 540 a receive buffer register (R-BUF); numeral 550 a change-over switch (SEL); numeral 560 a 1/16 frequency divider; numeral 570 a receive side timing signal generator (RTMG); and numeral 580 an entire system control register (CONT) of the CODEC 92.

The signals at the lefthand side of FIG. 34 are the CODEC-I/F signal 6 of the DSP 91. The digital signal having a width of 16 bits is inputted at the timing shown in FIG. 24.

Figure 35:
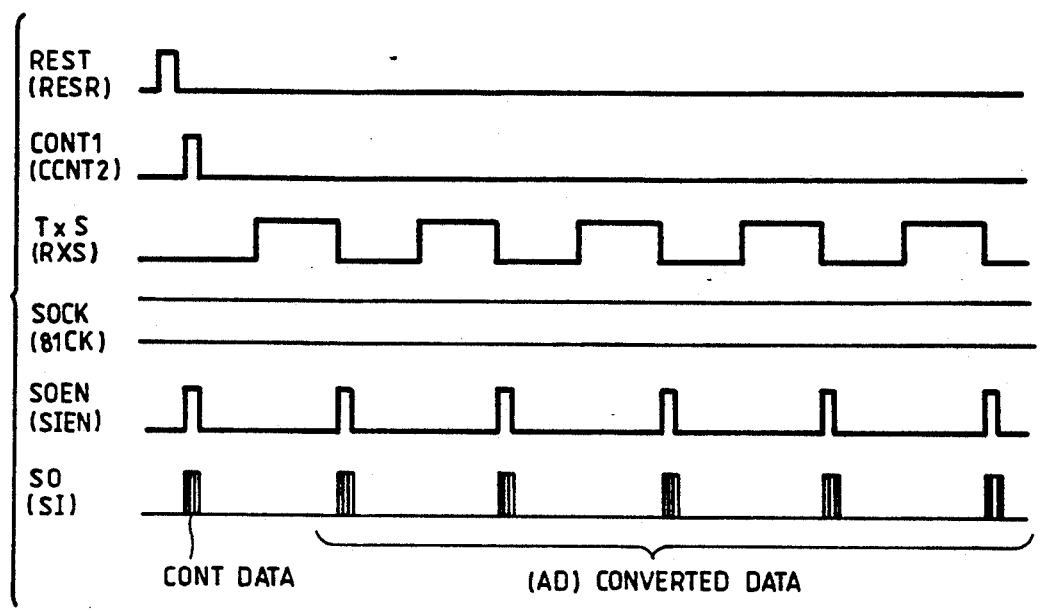
FIG. 35 is a timing chart of the same.
Figure 36A:
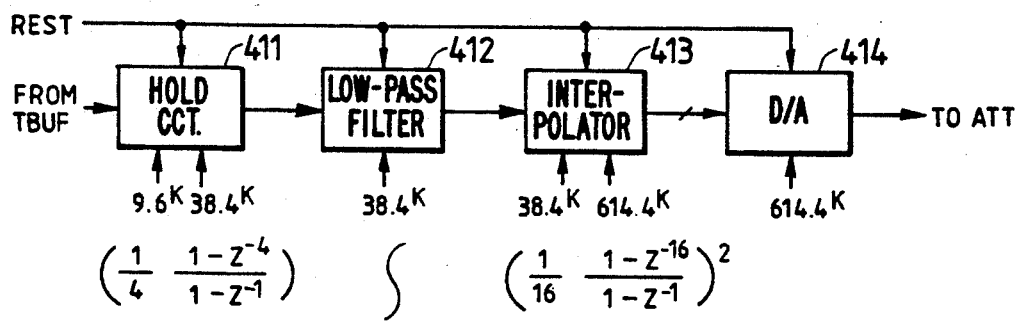
FIGS. 36(a) and 36(b) are detailed block diagrams showing a DA portion 410 and an AD portion 530, respectively, of FIG. 34.
Figure 36B:
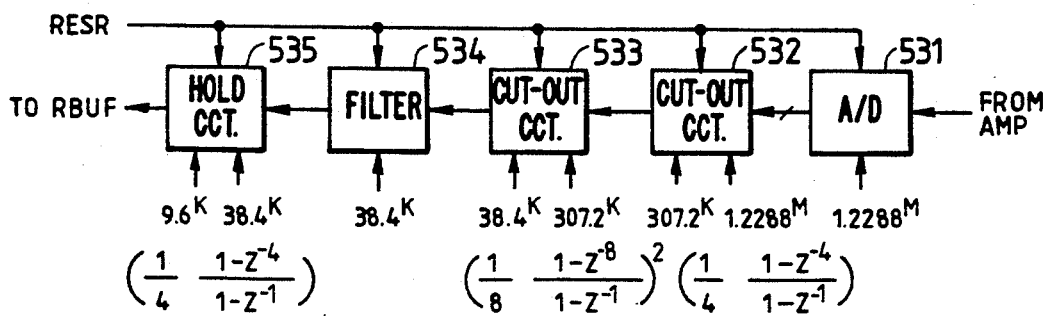

FIG. 35 is a timing chart showing the operations of the CODEC 92 of FIG. 34 by inputting/outputting the CODEC-I/F signal 6. Immediately after the MODEM LSI is powered, the system resetting signal is generated and passed through the DSP 91, the MLOGIC 93 and DPLL 94 so that it is inputted as the RES-T signal. In this case, it is assumed that the CLK-T be continuously inputted and that the TXS' be synchronized by the DPL 94 with the TXS generated by the MOLOGIC 93. When the RES signal returns to "L", the program of the DSP 91 operates to initialize the individual portions. The initialization of the CODEC 92 is started from the CONT 580. This CONT 580 has functions to switch and control the attenuation SW 440 of the ATT 420, to control the amplification factor of the AMP 520, and to display the internal situation, and exchanges the control signals through the CODEC-I/F 6. Specifically, the CONT1 is a sign signal for inputting the control signal from the SO to the CONT 580, and the CONT2 is a sign signal for reading the control signal from the CONT 580 through the SI. In response to these sign signals, the shift register in the CONT 580 comes into a fetchable status, and the TBUF 400 comes into the fetch prohibited status. Moreover, the frequency divider 460 generates a SOEN signal (indicating the data transfer effectiveness of "H", i.e., the 16 pulse section of the clock CLK-T of 3.6864 MHz). In response to this signal, the control signal, which is written in the SOR 143 of the DSP 91 in response to the instruction of the DSP 91, is latched in the shift register in the CONT 580. The latched state is reset at the timing of the falling change of the SOEN, and the input data to the DA 410 are latched in the TBUF 400 in response to the later sample timing TXS. The TBUF 400 is constructed like the CONT 580 of shift registers and receives the send signal of 16 bits from the SO at each falling timing of the TXS, as shown in FIG. 24 and 35. The send data received are converted by the DA 410 into an analog signal, which has its magnitude by the ATT 420 and its out-range signal filtrated by the PF 430. After this, this signal causes the send buffer 450 to drive the Aout terminal through the SW 440. These signals are produced in response to the timing signal generated by the TTMG 470. The TTMG is composed of: a counter for dividing the frequency of the CLK-T input to generate the TXS'; and a combination circuit for composing the frequency-divided pulses at the individual stages of the counter. The TTMG thus composed is initialized by the timing of the REST to generate the timings such as the TXS' necesssary for the send side at every 768 CLK-T and at a substantially uniformly dispersed timing. Thus, the entirety is assigned to the timing having one period of 768 CLK-T signals so long as the REST does not restore the "H".

At the receive side, the analog receive waveform Ain is received, when given by the receive buffer 500 and passed through the switching circuit 440 to the filter PF 510. This PF 510 is a low pass filter for eliminating the signals outside of the range prior to the AD conversion and has its output amplified by the AMP 520 and converted by the AD 530 into a digital signal, which is latched in the RBU 540 acting as a shift register. This digital signal is outputted as the signal SI through the SEL 550 and intputted through the SIR 141 to the DSP 91. The receive side described above is also operated, like the send portion, as parenthesized in FIG. 35, by the timing signal which is generated by a timing generator (RTMG) composed of the counter and the combination circuit. The initialization is also accomplished by the RESR, and the timing such as the RXS' necessary for the operations of the receive side is also generated like the send side at the timing which is substantially uniformly dispersed at every 768 CLKR. Thus, the entirety is assigned to the timing having one period of 768 CLK-R signals so long as the RESR does not restores the "H". The reason why the individual timings are uniformly dispersed is to attain an effect to prevent the noises of the digital circuit from growing large to adversely affect the analog circuit. For this reason, the DA 410 and AD 530 are of the over-sample type in which it is constructed of a serial arithmetic circuit and operates at a timing of the ratio of the power of 2. Specifically, the DA 410 is composed, as shown in the upper portion of FIG. 36, of: a hold circuit (HOLD) 411 for holding the digital signal of 16 bits, which is outputted at a sample timing of TXS', i.e., 9.6 K samples/sec, while the same being resampled at a simple timing at a sampling rate as high as four times (i.e., 38.4 K samples/sec); a low-pass filter (LPF) 412 for processing the output of the hold circuit 411 to eliminate an unnecessary higher-range component; an interpolator (INTP) 413 for further sampling the output of the LPF 412, which is outputted at 38.4 K samples/sec, with a finer period of 614.4 K samples/sec; and a high-speed 8 bit D/A converter (D/A) 414 of for converting the output of the interpolator 413 to an analog signal. The DA 410 thus composed feeds the output of the TBUF 400 to the ATT 420. The transmission function of each block is expressed by the equation appearing below each block and is calculated by the serial arithmetic circuit. The analog circuit forms part of the D/A 414 and is limited. Moreover, the whole circuit is operated at a susbstantially uniformly dispersed timing of the power of 2 synchronized with the CLK-T. The analog signal outputted at 614.4 K samples/sec has no substantial noise except the quantization noises and the switching noises so that a high S/N ratio can be attained. Since, moreover, the final sample timing is as high as 614 K samples/sec and since the signal band is about 3 KHz, it is possible to use the filter 430 having a low accuracy required. In the case of the MODEM, on the other hand, the LPF 412 is required to have a far more severe accuracy than the characteristics of the transmission lines but is realized in the digital circuit by the 32-bit arithmetic operations so that excellent characteristics can be realized. The AD 530 operates to send out the analog signal, which is AD-converted to the SIR 141 of the DSP91 with the sampling period of 9.6 K samples/sec. First of all, the analog signal inputted from the AMP 520 is converted into a digital signal of 8 bits with the sample period of 1.2288 MHz by the 8-bit A/D converter (A/D) 531. Next, this output digital signal is introduced into a first cut-out circuit (DECM1) 532 for conversions to a signal of 307.2 K samples/sec, and this digital signal having a sample period of 307.2 KHz is introduced into a second cut-out circuit (DECM2) 533 so that it is converted to a digital signal having a sampling period of 38.4 KHz. This digital signal is introduced into a low-pass filter (LPF) 534 to filtrate the signal component higher than 3.4 KHz unnecessary for the MODEM and further inputted to a cut-out circuit (DUMP) to produce a digital signal having a period of 9.6 K samples/sec. The transmission functions of these individual blocks are expressed by the equations appearing below the corresponding blocks.

These circuits are generally called the A/D and D/A conversion systems of over-sample type, because the AD and DA converters on the circuits are operated with a sampling frequency far higher than that of the period of the AD and DA conversions required by the system. If the transmission functions, sample frequencies, and AD and DA converters 531 and 414 like those of the present embodiment are used and if the arithmetic accuracy of those transmission functions is made sufficiently high, no noise but the quatization noises and the noises generated in the analog circuits of the AD and DA portions exerts influences upon the conversion accuracy.

In the AD conversion, for example, an accuracy of 8 bits is obtained by the AD 531 and can be cut out to reduce the amount of noises. In this case, an improvement in the accuracy as high as 7 bits can be theoretically estimated by the cut-out of 1/128 so that an accuracy of 15 bits can be obtained as a whole. Moreover, the noises can also be eliminated to about 3 dB, in the case of the present embodiment, by the LPF 534. If these are summed up, a conversion accuracy of about 95 dB can be theoretically attained. As a matter of fact, the arithmetic operations have a finite length so that generation of noises is unavoidable, as is the introduction of noises from the analog circuit Thus, the conversion accuracy is 90 dB or lower.

Figure 37:
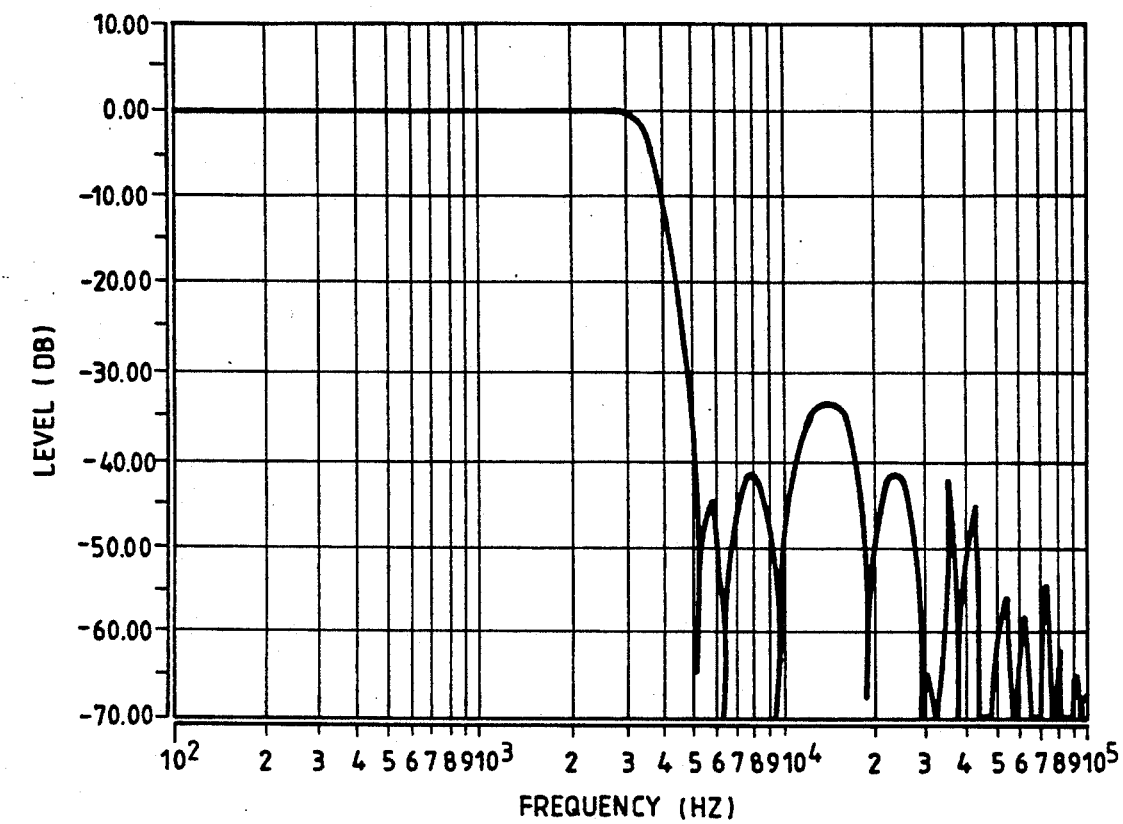
FIG. 37 is a diagram showing the frequency characteristics of the A/D portion of the CODEC 92.

FIG. 37 shows the frequency characteristics of the AD 530. Over the band of 3.4 KHz, as seen, the level has a peak of about −33 dB in the band of 10 KHz, and this characteristics is sufficient for the band pass filter of the MODEM. The total characteristics include that characteristic and the characteristics of the cut-out circuit.

Figure 38:
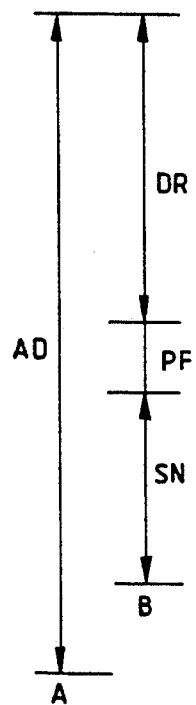
FIG. 38 is a diagram showing the comparison between a signal level and a dynamic range.

FIG. 38 shows that the above-specified AD accuracy can be sufficiently used in the high-speed MODEM. There arises no problem if the sum (B) of the reception level range DR of the MODEM, the peak factor PF of the signal and the S/N ratio of the minimum signal necessary for the specified reception quality is sufficiently small for the accuracy AD of the AD conversion (A) and if the S/N ratio will hardly deteriorate. In the case of the present embodiment, the deterioration of the S/N ratio is 0.3 dB or lower and raises no problem, if DR=43, PF=15 and SN 22.

FIGS. 39 to 42 are flow charts to be stored in the DSP 91 of the VLSI MODEM of the present embodiment.

Figure 39C:
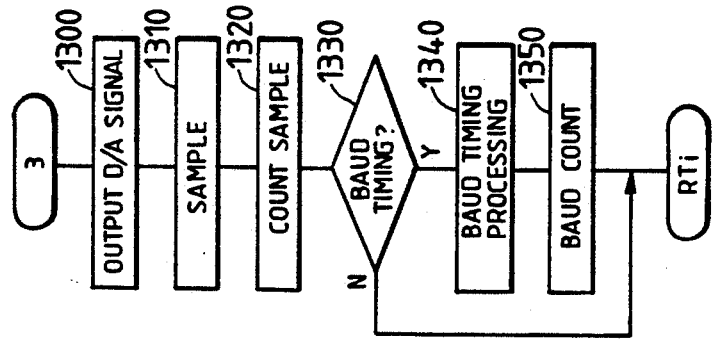
FIGS. 39(a), 39(b) and 39(c) are flow charts showing one embodiment of the program stored in the VLSI of the present invention.
Figure 39B:
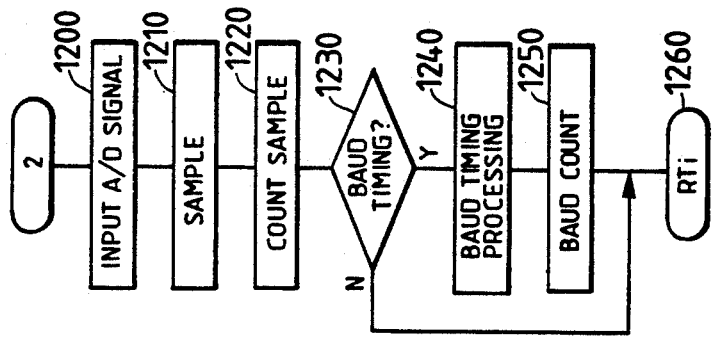
Figure 39A:
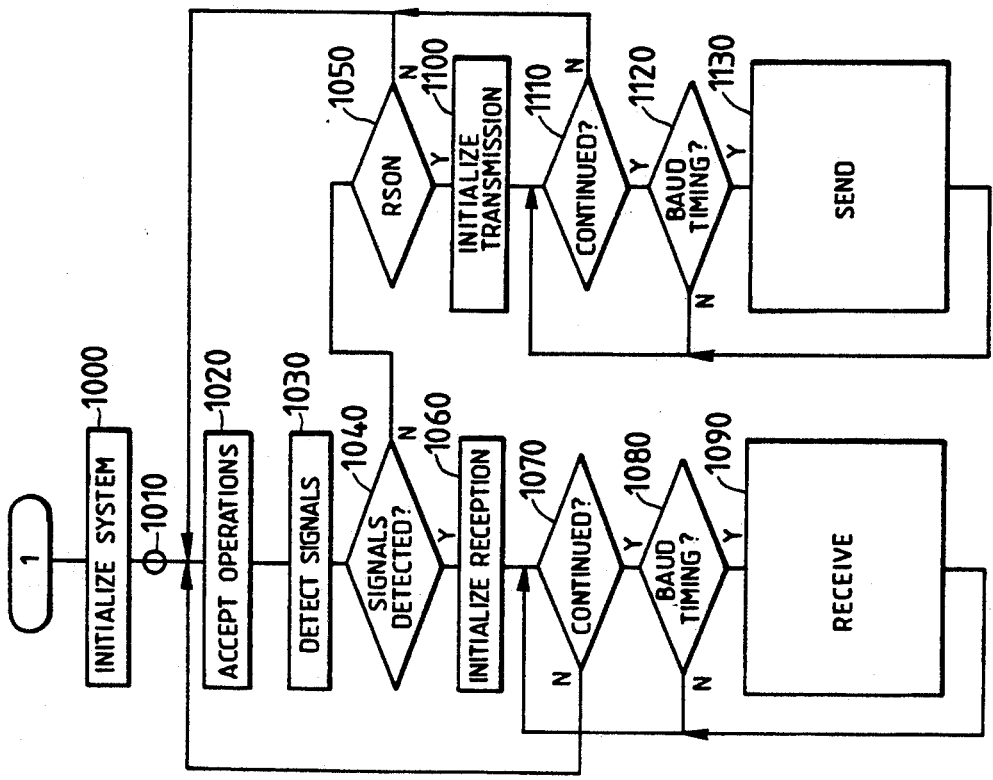

FIG. 39 shows the entire structure of the software which is composed of a main routine started from the symbol (1) and interrupt routines (2) and (3). In the main routine (1), signal processings such as modulations and demodulations are mainly accomplished. In the interrupt routines (2) and (3), the processing timings such as the send data and the receive data divide the important signal input/output processings, and most of the processings as the MODEM are executed in the main routine. The contents of the routines will be described in the following in accordance with the flow charts.

In the main routine (1), at an initializing step 1000, the initial values are stored in the registers (CTR and STR), RAM, SOR and flag in the DSP 91, in the CONT register of the CODEC 92, and in the SW, ST, SCR, RD and RCREO of the MLOGIC 93, and the TSYNC and RSYNC are issued to synchronize the ST, TXS, RXS and RT. Next, the processing program of the operation mode of the MODEM designated from the outside of the terminals or the like is prepared to permit the interrupt of the receive at 1010 because the initialization is ended. Next, the routine enters the processing loop of operation acceptance 1020, signal detection 1030, signal judgement 1040 and operation judgement 1050. In this loop, assuming that the lines to be received be connected, it is processed and judged (at 1040 and 1050) whether or not the signals are sent (at 1030) through the lines, whether or not the MODEM is ordered (at 1020) to send by the operations. Here, since the A/D conversion data is introduced in the portion of the interrupt routine (2), it is sufficient to judge whether or not the signals to be received are at such a level as can be received by monitoring the value of the data. If the signals arrive, a signal FCD (meaning the fast carrier detect) expressing the arrival is defined at the terminal of the EO to inform the outside of it or to prohibit the operation acceptance for the sending operations because the case is internally the half-dual MODEM. Next, the end is judged at 1070, and the routine enters the baud timing judgement at 1080. Here, it is judged whether the receive processing is started or ended. In this case, the FCD signal is just displayed to await the coming baud timing. If the interrupt routine (2) is operated several times for the baud period, the main routine is informed of the baud timing in the form of a count value or flag. With this information, the main routine accomplishes the receive processing 1090. Here, the interrupt routine (2) will be described in the following. If the AD conversion synchronized with the RXS so that the AD converted value enters the SIR 144, the interrupt flag SIF is raised, and the content of the program counter 131 of the DSP 91 is evacuated to the stack 132, and the predetermined PC address (i.e., vector address) for storing the head address of the interrupt routine is set in the PC. Thus, the interrupt routine is started. In this interrupt routine (2), the content of the SIR is first read and stored (at 1200) in the predetermined AD conversion buffer region of the RAM 111 in the memory 110 of the DSP 91. Next, the sample counter value DAM 111 for counting the interrupt number is read and timed to accomplish the sample timing, e.g., the RBT outputting (at 1210) if the timing is at a predetermined value. Next, the sample counter value set on the RAM 111 is updated (or subtracted) (at 1220). If the updated result is at "0", it is the baud timing (at 1230). In this baud timing case, the sample counter value is first initialized, and the AD conversion data stored in the receive buffer is then transferred along the interrupt routine to the receive processing of the main routine, or the receive-processed result is sent out through the RD to the terminal (at 1240). Next, the baud counter set on the RAM 111 is updated to inform the main routine of the time lapse (at 1250). At the end of this routine, the PC is returned to the status before the interrupt to reopen the main routine (at 1260). Incidentally, the description of the register evacuation of the interrupt period is omitted but is executed if necessary. The receive end occurs when the remote side interrupts the send. In this case, there is no signal received. This may be detected to return to the operation acceptance 1020.

The sending operation is caused when the CPU of the terminal or the operator writes the RS (or send requirement) in the iRO 101 of the DSP 91. Incidentally, the RS is also defined in the $P_0$ to $P_3$ of the general-purpose IO and may be at "H". If the RS rises, this is detected (at 1050) to start the sending operation. First of all, the receiving operation is prohibited, and the interrupt of the DA conversion at the sending side is permitted to initialize the sending processing (at 1100). Next, it is confirmed again that the RS is raised by the send continuation judgement, and information of the baud timing from the interrupt routine at the sending side is awaited (at 1120). If the baud timing comes, the receive processing for one baud is accomplished (at 1130). Here, in the interrupt routine (3) at the sending side, inverse processings are accomplished in substantially the same sequence as that of the receiving side. If the SOF is raised at the receive interruption, an interruption comes to start the routine (3). In this routine (3), one word of the DA data in the send DA buffer is first read out and written in the SOR 141 (at 1300). Next, the send sample counter value on the RAM 111 is read out to judge the timing, and the sample timing processing such as the ST1 masking is accomplished (at 1310). Next, the sample counter is updated (or subtracted) and returned (1320) to the RAM 111. If the counted result is at "0", the timing is judged (at 1330) to be the baud timing. In the baud timing case, the baud timing processing is accomplished (at 1340). For example, the sample timer value is initially set, and the empty DA buffer is subjected to the main routine. In place, the DA data of one baud to be outputted is accepted, and the send data SD are inputted through the gate 224. Next, the baud counter is updated to inform the main routine of the baud timing and the time lapse.

Apart from the signal processing content, the processing sequence is simplified to facilitate the program construction and to improve the processing performance, as described above. Above all, the buffer of one baud period for the AD and DA unites the processing into the main routine of the baud timing so that the execution efficiency is highly increased.

Next, the operations of the MODEM will be described with reference to FIG. 40.

Figure 40A:
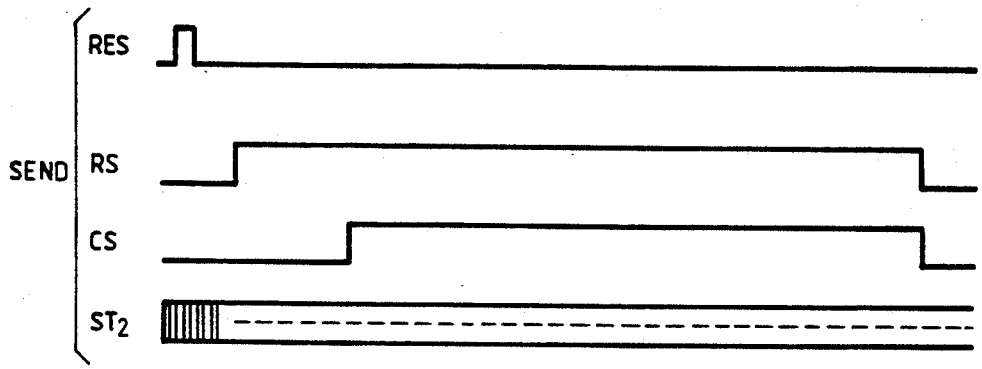
FIGS. 40(a) and 40(b) are timing charts of the same.
Figure 40B:
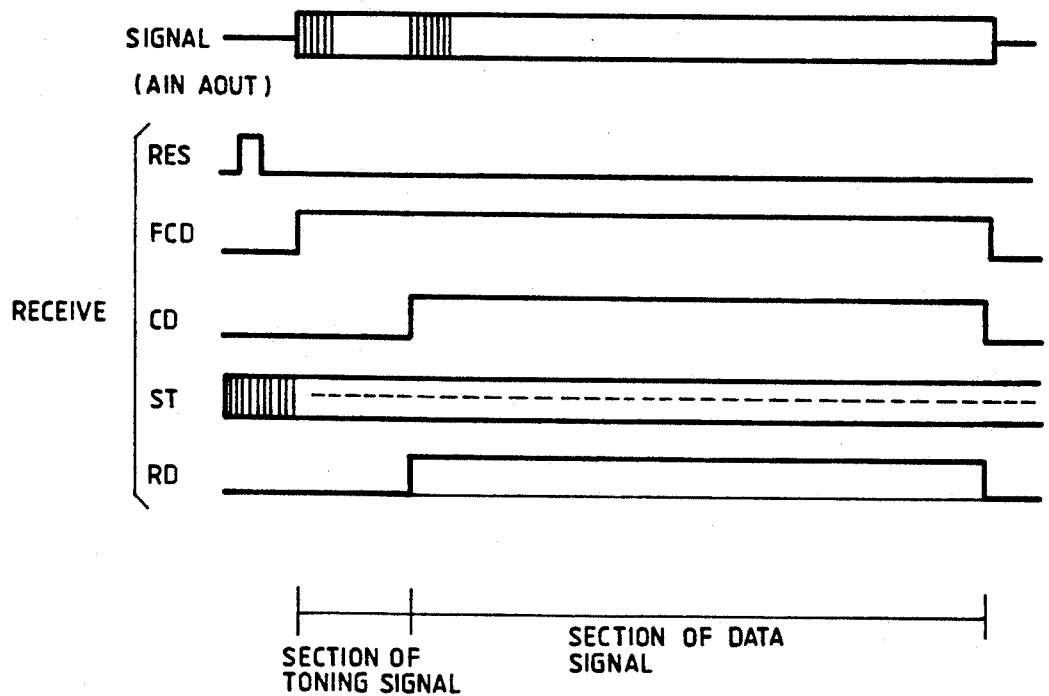

FIG. 40 is a timing chart showing the sequence of the sending side, the transmission waveforms, and the sequence of the receiving side of the MODEM. In the case of the high-speed MODEM, when the RS is raised, the sending side first estimates the line situation, i.e., the training signal to send out a signal for initializing the receiving side. After this, the sending side raises the CS (clear to send) signal to "H" and receives the send data SD from the terminal. These data are modulated and sent out to the line. The receiving side informs the terminal side of the arrival of the training signal in terms of the signal FCD (assigned to $P_4$ to 7) and comes into the receive processing. In the receive processing, the training signal is processed to accomplish the initialization called the "initial lead" such as the automatic gain control (AGC), the timing reproduction, the carrier reproduction or the automatic equalization. This initialization continues for the data signal even after the termination of the training signal. The switching to the data signal is informed to the terminal through the signal CD to allow subsequent reception of the RD.

The end of transmissions is accomplished by the RSOFF at the send side. As a result, the send side is terminated when the CS is stopped so that the remaining data in the MODEM are modulated and sent out. On the other hand, the receive side is informed of this in view of the interruption of the signal arrival.

Figure 41:
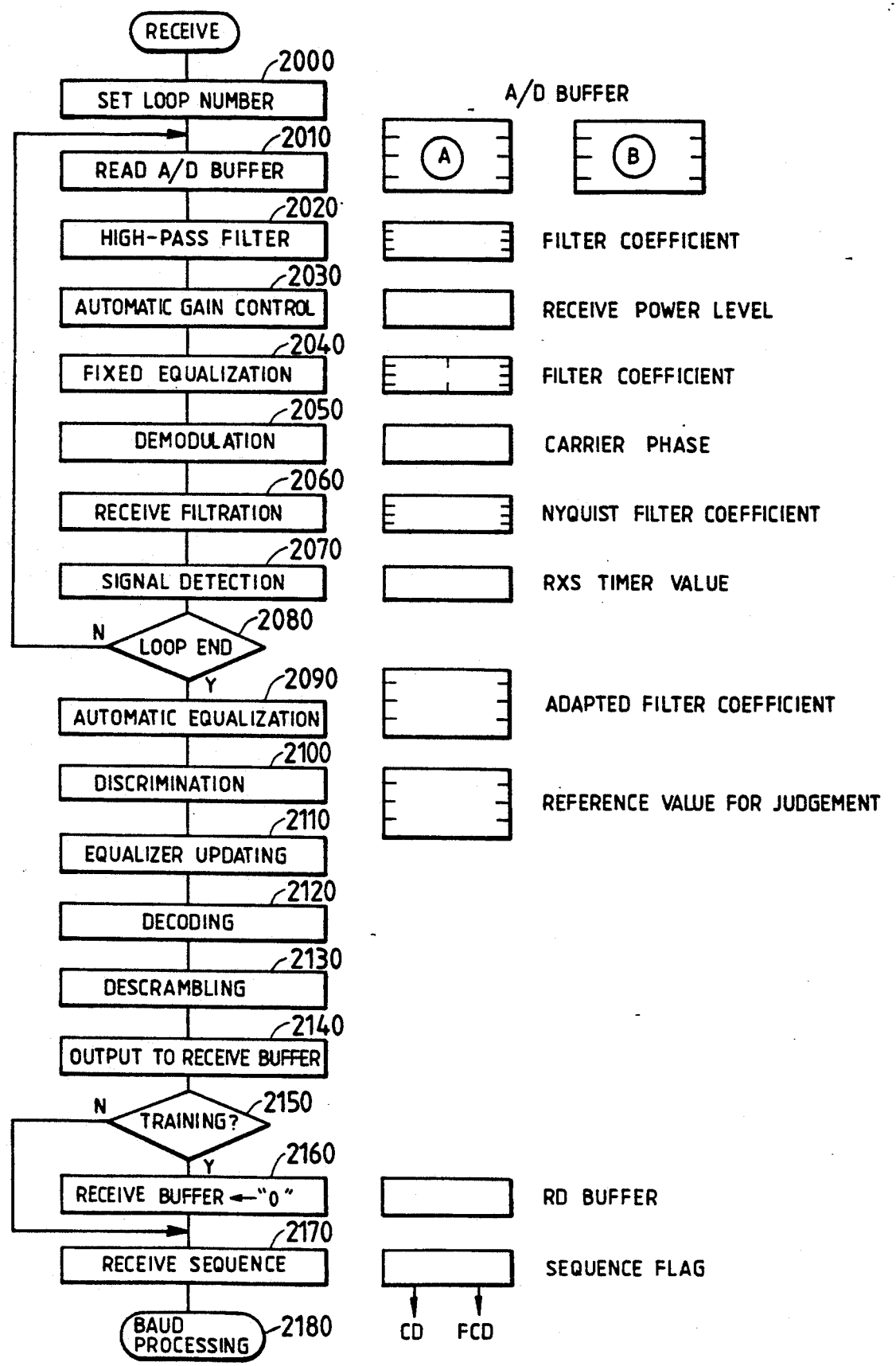
FIG. 41 is a flow chart showing a receiving processing.

FIG. 41 shows an example of the receive processing program. The well-known technique can be used for the content of each processing box. (For example, Section 6 of "Application of Digital Signal Processing" edited by Association of Electronic Communications and published in July, 1983). The present routine is started with a baud timing and the AD conversion data for the baud period transferred from the interrupt routine is subjected to a loop number setting (at 2000). The AD buffer data is read (at 2010) and is subjected to a high-pass filtration (at 2020) to eliminate DC noises. The automatic gain control (AGC) is controlled (at 2,030) according to the receive power level. The data is passed (at 2040) through a fixed line characteristic equalizing filter and is demodulated (at 2050) to eliminate the carriers (at 2060). The set value of the RXS register is altered by grasping the receive timing from those signals to optimize the AD conversion timing (at 2070). These steps 2010 to 2070 are repeatedly accomplished by looping by the number of samples for the baud period until the routine comes into the intrinsic baud timing processing (at 2080). At the baud timing, the line characteristics, i.e., mainly the carrier link characteristics are equalized (at 2090), and the cleared signals are compared and discriminated with the reference (at 2100). An equalization error is determined by comparing the discriminated result and the equalization output to update the equalization characteristics (at 2110). The discriminated result is further decoded (at 2120) and descrambled (at 2130) into receive data of one baud, which is latched (at 2140) in the RD buffer of the RAM 111. If during training (at 2150), the latch is made ineffective (at 2160), and the receive sequence such as the time measurement is accomplished (at 2170), until the routine is returned (at 2180) to the main routine of FIG. 39. Thus, during these receive processings, any special timing need not be taken, but the processing sequence or structure of the program is made free. It is therefore possible to prepare the program easily and to raise the processing efficiency.

Figure 42:
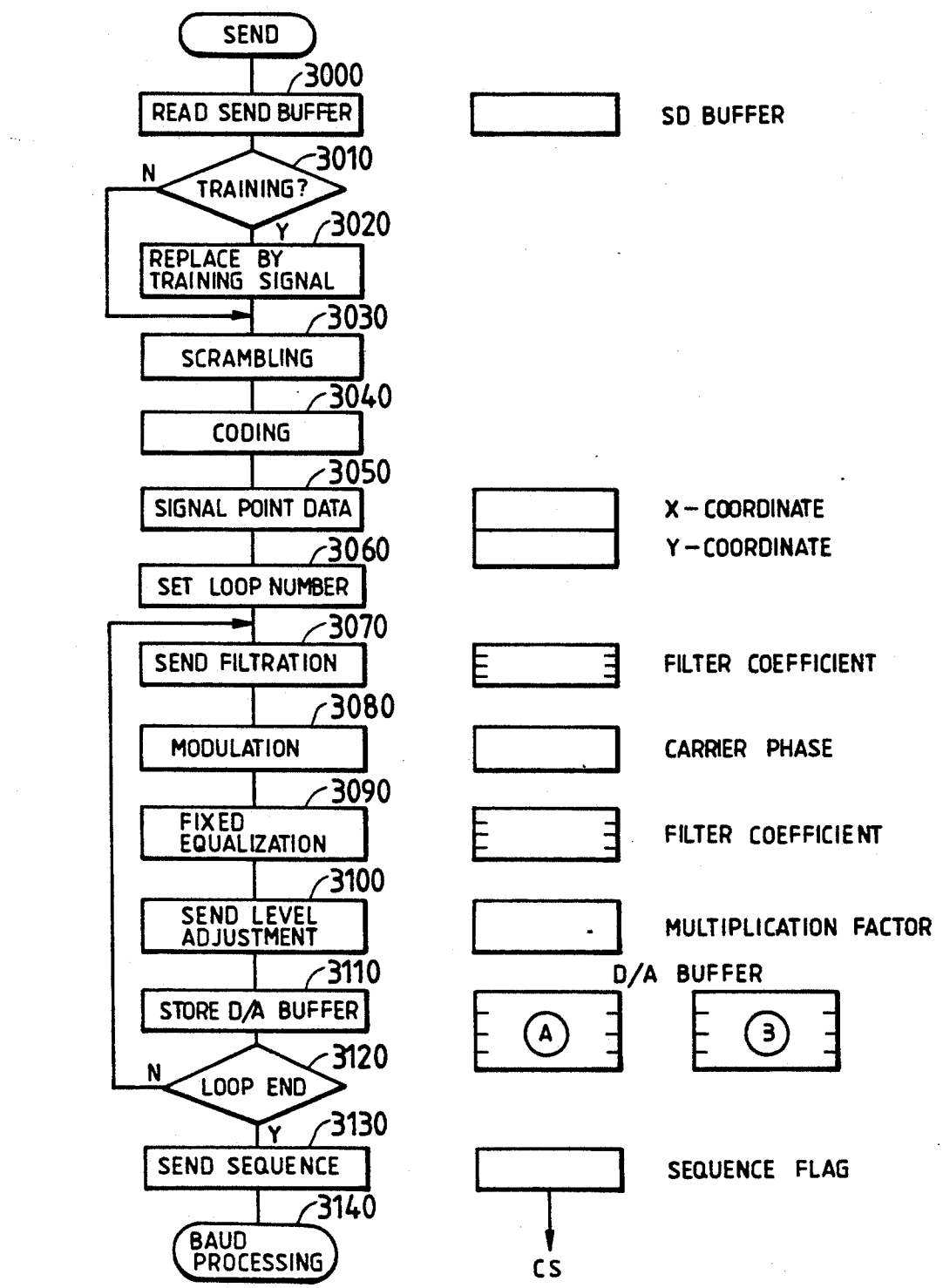
FIG. 42 is a flow chart showing a sending processing.

The routine of the sending side is similar and is shown in FIG. 42. If the program is started, as shown in FIG. 42, the send data inputted in the interrupt routine is first read out (at 3000) from the SD buffer. If during the training signal section (at 3010), the send data is replaced (at 3020) by the training signal for processing. The send data is randomized (at 3030) by scrambling and is coded (at 3040) for facilitating the phase detection. By using the output thus processed, the coordinate point of the signal to be send is determined to prepare the corresponding data (at 3050). At this time, the instrinsic baud processing is completed, and the routine is then transferred to the interrupt routine by setting the loop number (at 3060) for the baud period. The result of the baud processing has its waveform shaped (at 3070) and is modulated (at 3080) by multiplying it by the carriers. Next, the modulated data is fed to the equalizer of fixed characteristics (at 3090) to adjust the send level, (by the soft processing) (at 3100) until it is latched in the DA buffer on the RAM (at 3110). These steps are executed a predetermined number to finish the sample signal processing (at 3120). After this, the send sequence is accomplished (at 3130), and the routine is returned to the main routine of FIG. 39. The effects of the present embodiment are also obtained at the sending side.

As has been described hereinbefore, the MODEM of the embodiment of the present invention has many features, advantages and effects, as will be summarized in the following:

1. According to the present embodiment, the high-speed MODEM can be mounted in a one-chip VLSI. This is because the MODEM is a devised combination of the DSP, the digitized linear CODEC of high S/N ratio, a logic especially for the MODEM, and means for arranging the timing. As a result, a highly efficient production can be accomplished by the semiconductor process suitable for digitizations.

2. The filtering of the DSP is softened. This is partly because the filters for dropping the over-sample in the CODEC to the desired sample rate are constructed of special-purpose circuits and partly because the band pass filters are accorded to the transmission filter characteristics of the MODEM.

3. Various timing synchronizations can be easily accomplished. The synchronizations by the software and its implementation by the hardware can be easily accomplished through the DOLL, RSYN, TSYNC and R-T-SYNC and through the tandem connections between the TXS and ST and RXS and RT.

4. The internal control of the CODEC is feasible and simple. Specifically, the control information of the CODEC can be read and written without any special I/F merely by writing the control data in the SOR, by issuing the CONT1 and CONT2 and by reading the SIR.

5. Since the major timing can be monitored by the software, the software processing of a special timing is feasible. For example, the initial resetting can be simply accomplished in the ST1 mode.

6. The HOST-I/F register has a simple construction of IR, OR and STR only.

7. The AGC control is easy. That is, all the AGC can be executed with an ideal controllability through the processing of the DSP by the digitized linear CODEC of high S/N ratio.

8. Since the WOT is contained, it can monitor the runaway.

9. Since the control of the special-purpose I/O is accomplished by the instruction decoder disposed in the special-purpose I/O portion, not only the DSP but also the special-purpose I/O has a high extensibility.

10. Since two kinds of frequency division ratios are switched to change the data density, the present invention can easily cope with the transmission timings of the specifications different by a fundamental clock.

11. Since the external timing synchronization can be accomplished by the software monitoring and masking, the hardware structure is simplified (according to the ST1 synchronization).

12. The RD timing appears at the terminal with a delay of one bit later than the baud processing of the software, but the status information is likewise delayed by the hardware. As a result, the processing timing is simplified without being conscious of the software.

13. Since the interrupt routine is simplified and limited to the I/O processing and the timing adjustment, the main routine has its structure simplified with a high processing efficiency.

14. Since the processing is accomplished by the single DSP, the transmission interactions are simplified with a high processing efficiency.

As has been described hereinbefore, according to the embodiments of the present invention, the following advantages can be attained in addition to the advantage that the high-speed MODEM can be easily integrated in the one-chip semiconductor.

According to the present invention, the digital linear CODEC having a relatively high S/N ratio of 15 bits or more of AC/DC amplification modulation type is of the over-sample type and can realize a filter having less analog circuit portions and a high accuracy. Moreover, the CODEC can be fabricated by a process for the digital circuit and integrated in the one chip.

Since, moreover, the band pass filter of the CODEC is made identical to the transmission filter of the MODEM in accordance with the present invention, another advantage is that the accuracy of the signal processing and the amount of processing of the general-purpose DSP can be lessened.

Because of the programmable and maskable sampling timing, furthermore, the received signal can be followed by the sample timing to raise an advantage that the timing frequency division can be simpler than that of the MODEM of the prior art.

Furthermore, the present invention has the serial interface circuit for the digital transmission signals between the MODEM and the communication terminals. This serial interface circuit has the rate generator for the serial-to-parallel (S/P) and parallel-to-serial (P/S) data string conversions and for the serial data transfer rates. This makes it unnecessary to convert the data string by the DSP processing so that the load upon the DSP can be lightened. On the other hand, the aforementioned rate generator can alter the rates by the DSP or reset the timings by the DSP. As a result, the multimode MODEM functions can be coped with, and the sampling interrupt and the synchronization of the serial interface can be accomplished. This raises advantages that the timing can be united, that the DSP can be constructed to have the soft structure, and that the timing setting can be simplified.

Moreover, the VLSI of the present invention has one digital signal processor built therein, which is for general purposes, and the interface with the digital linear CODEC is of the interrupt type. Specifically, the A/D or D/A conversions at the aforementioned sampling timing can be informed to the program of the DSP by the interruption. In this interruption, the full-dual MODEM processing can be accomplished because the A/D and D/A portions operate independently of each other. Furthermore, the MODEM VLSI of the present invention has the bus interface for data communications between the built-in DSP the device for external data generation or control so that the data communications can be accomplished by the interruption to the external device or the timing synchronization by the flag with the resultant high affinity with the external device.

Since the timing inside of the DSP is simplified, as described above, it is advantageously easy to set the software structure and processing timing of the DSP.

Since, furthermore, the timing matching PLL is added between the digital linear CODEC and the sampling timer, the correct CODEC operations are warranted. This raises another advantage that the sampling timing can follow the received signal by the programmable sampling timer can be smoothed to incur no deterioration of the A/D conversion signal even if the CODEC uses the over-sample type A/D and D/A converters. Specifically, these over-sample type A/D and D/A converters are practically composed of: the A/D and D/A portions having high sampling rates for the interface with the analog signals; and the digital arithmetic circuit such as the interpolator, the decimeter, the damp, the hold or the band pass filter. Because of provision of the timing PLL, however, the aforementioned integer ratio is not broken even with the sample timing following operation to the received signal so that the correct arithmetic operation is warranted without any deterioration of the signal.

According to the VLSI according to the present invention thus far described, the use of the digital linear CODEC of high S/N ratio makes it possible to drastically digitize the analog circuit and to process the filter with the digital signals so that an outstanding effect can be attained in stabilizing the characteristics. Since, furthermore, the digital linear CODEC of high S/N ratio is used, the automatic gain control by the signal arithmetic operation of the DSP can be accomplished to realize the fine and stable control.

Furthermore, the MODEM using the VLSI of the present invention can process the modulating and demodulating functions and the operating procedures wholly by one software and have its processing structure simplified. Since, furthermore, most of the MODEM functions are realized by the software of the DSP, it is advantageously easy to effect the one-chip integration of multi-modes and to alter or correct the program or parameters.

Figure 43:
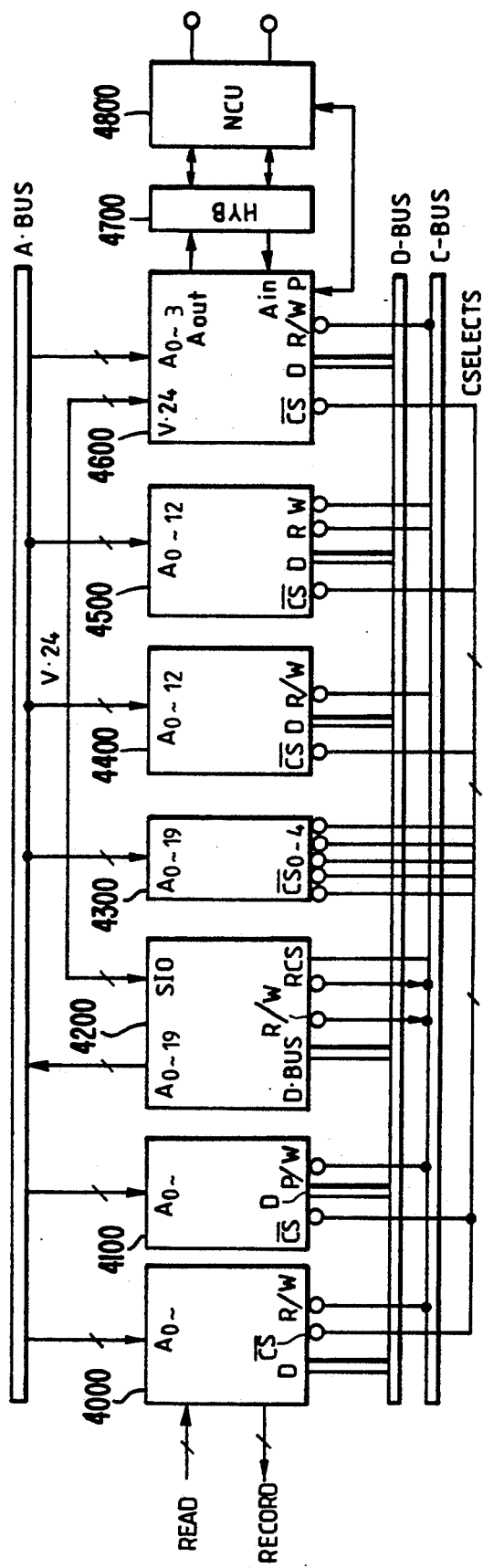
FIG. 43 is a diagram showing an example of application.

FIG. 43 shows an example of the facsimile to which the VLSI MODEM of the present invention is applied. In FIG. 43: reference numeral 4000 designates a DIPP; numeral 4100 a control panel; numeral 4200 a microcomputer; numeral 4300 an address decoder; numeral 4400 a program memory; numeral 4500 a random access memory; numeral 4600 the same VLSI MODEM as that of the foregoing embodiments; numeral 4700 a hybrid circuit; and numeral 4800 an NCU. A small number of these circuit IC components can realize the control portion of the facsimile apparatus using the high-speed MODEM.

Incidentally, the present invention has been described in connection with the embodiments, in which it is used in the half-dual MODEM, but it can naturally be applied to a full-dual MODEM.

In the embodiments, moreover, the receiving HPF is subjected to the DSP processing but may be incorporated as the hardware into the CODEC.

Still moreover, the transmission data SD or RD may be inputted or outputted through the IR or OR.

In this modification, the excess S/P or P/S converters may be used as S/P or P/S conversions of variable lengths so that they may be used for octet editions.

Another embodiment of the MODEM according to the present invention will be described in detail in the following in connection with the accompanying drawings.

Figure 1:
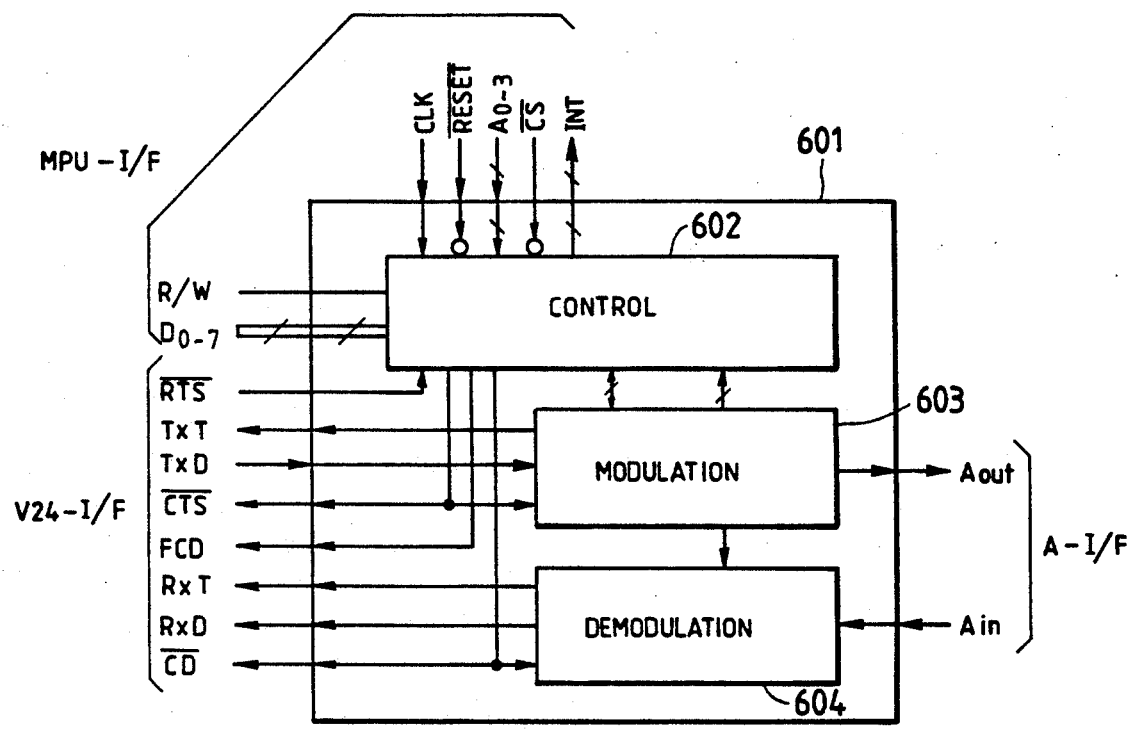
FIG. 1 is a block diagram showing the structure of the MODEM according to the prior art.
Figure 2:
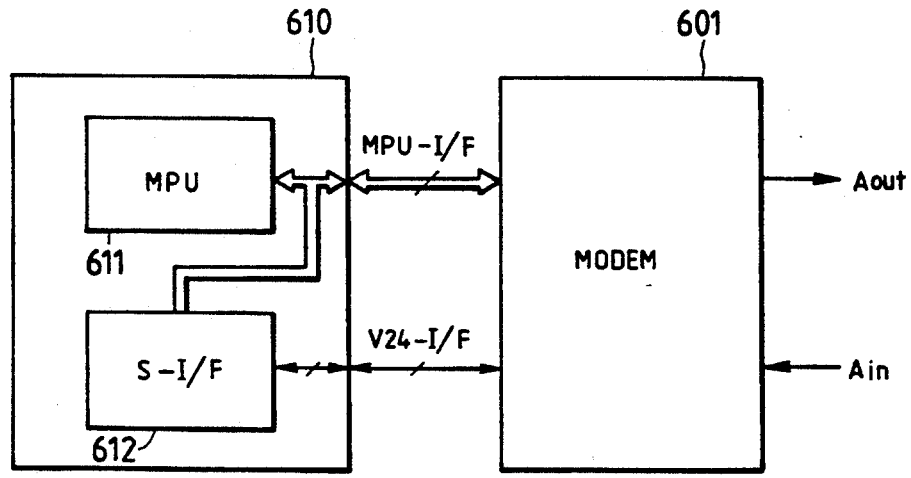
FIG. 2 is a block diagram showing the usage of the MODEM of FIG. 1.
Figure 44:
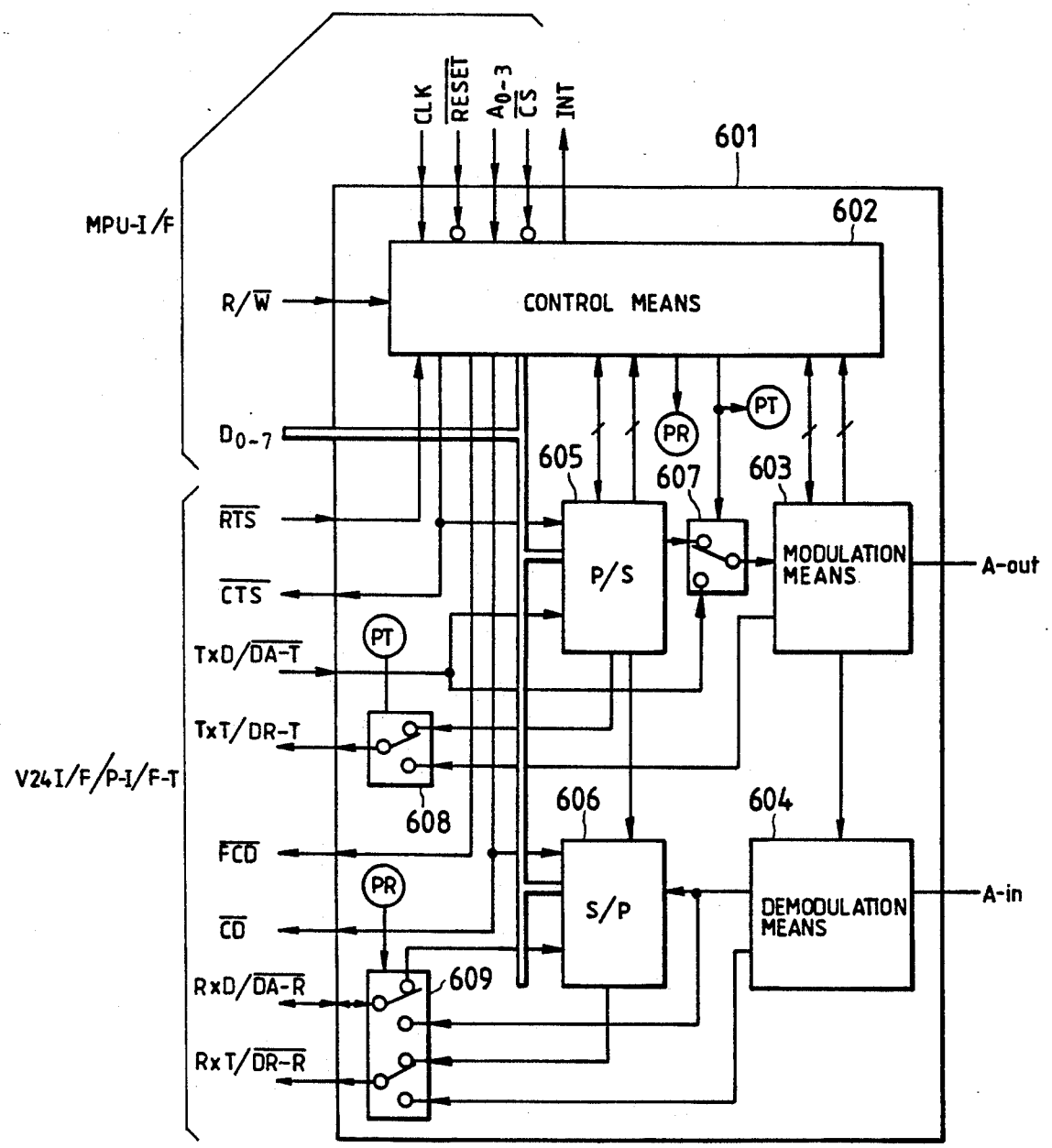
FIG. 44 is a block diagram functionally showing another embodiment of the present invention.
Figure 45:
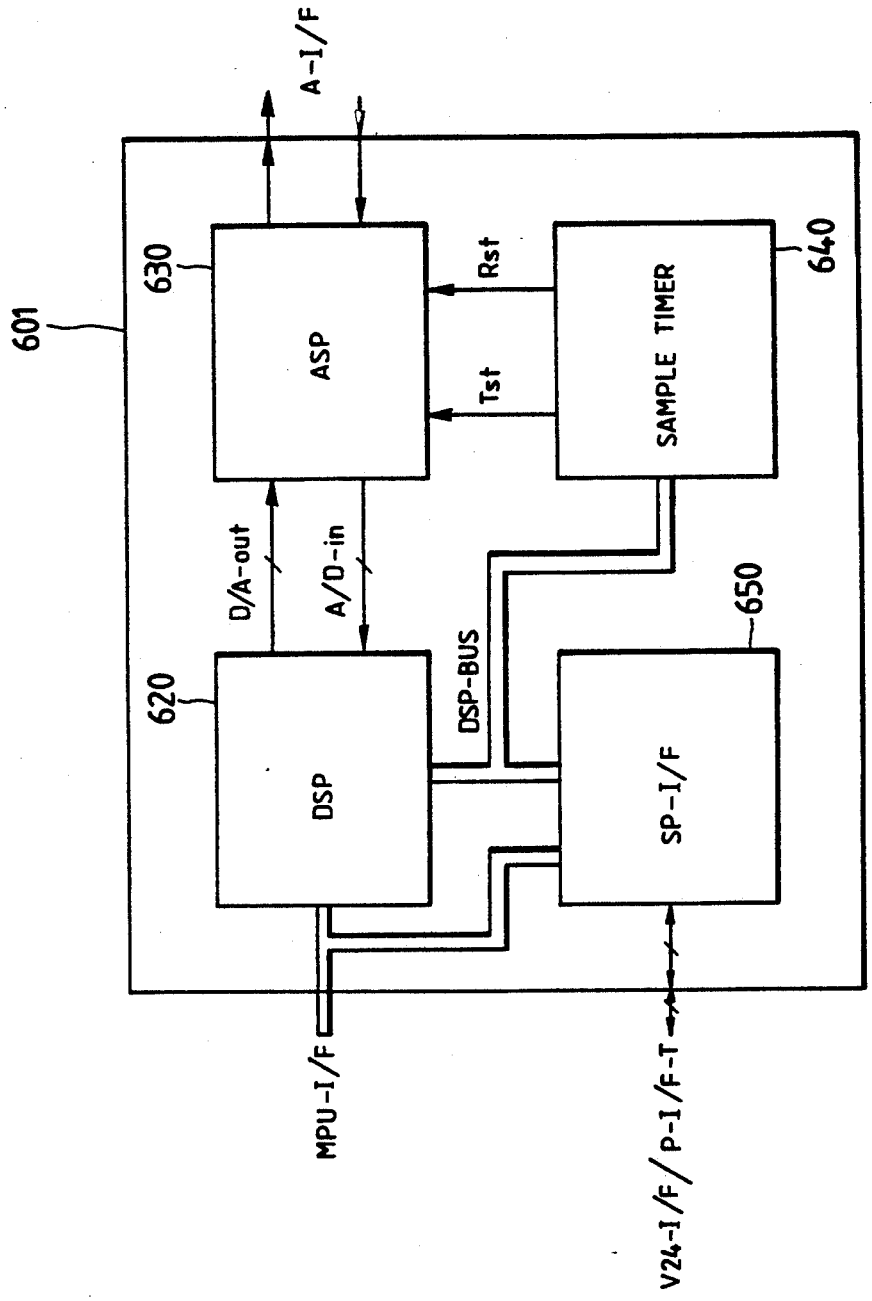
FIG. 45 is a block diagram schematically showing the embodiment of the present invention.
Figure 46:
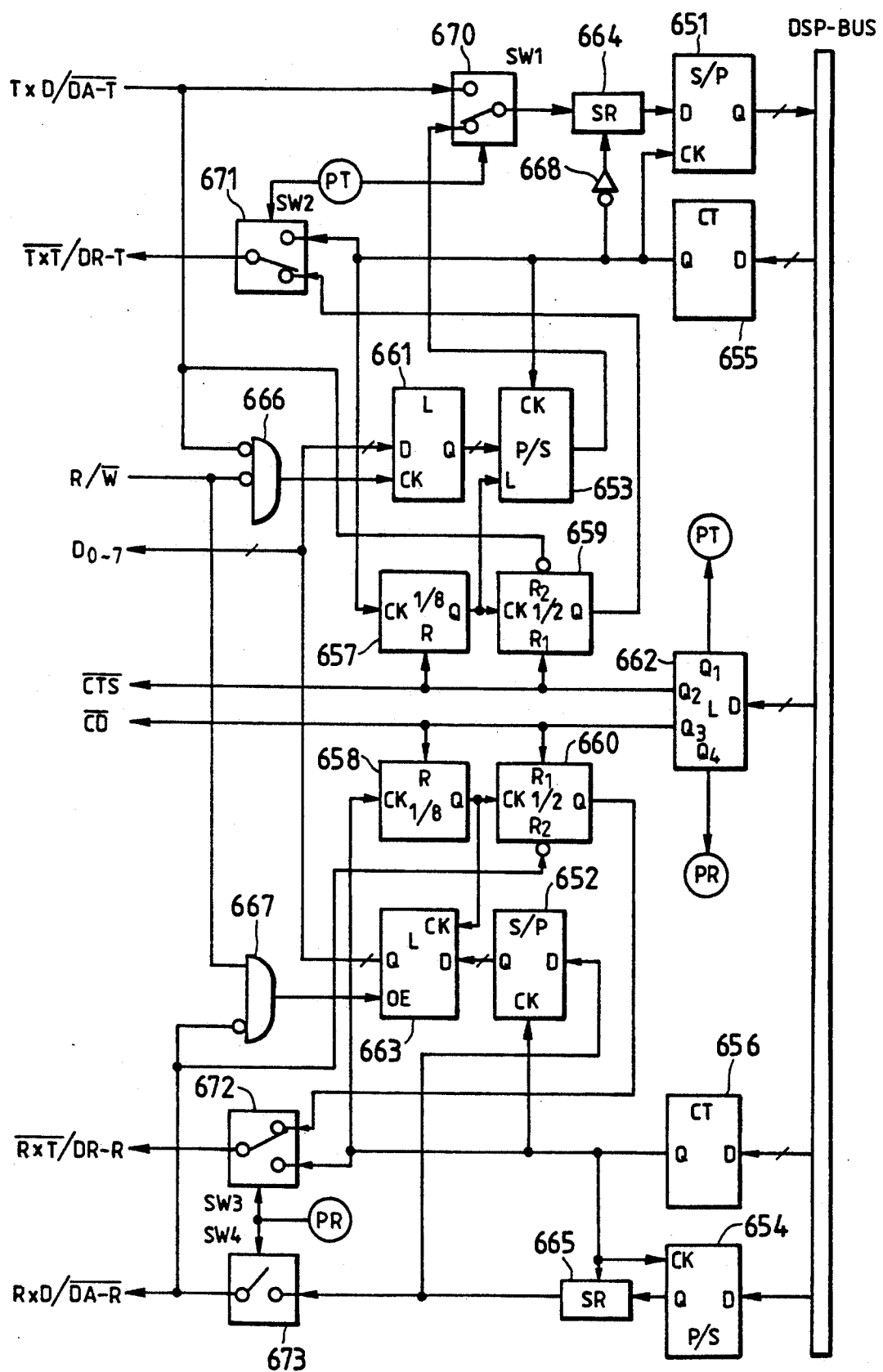
FIG. 46 is a block diagram showing the detail of an SP-I/F of FIG. 45.
Figure 47:
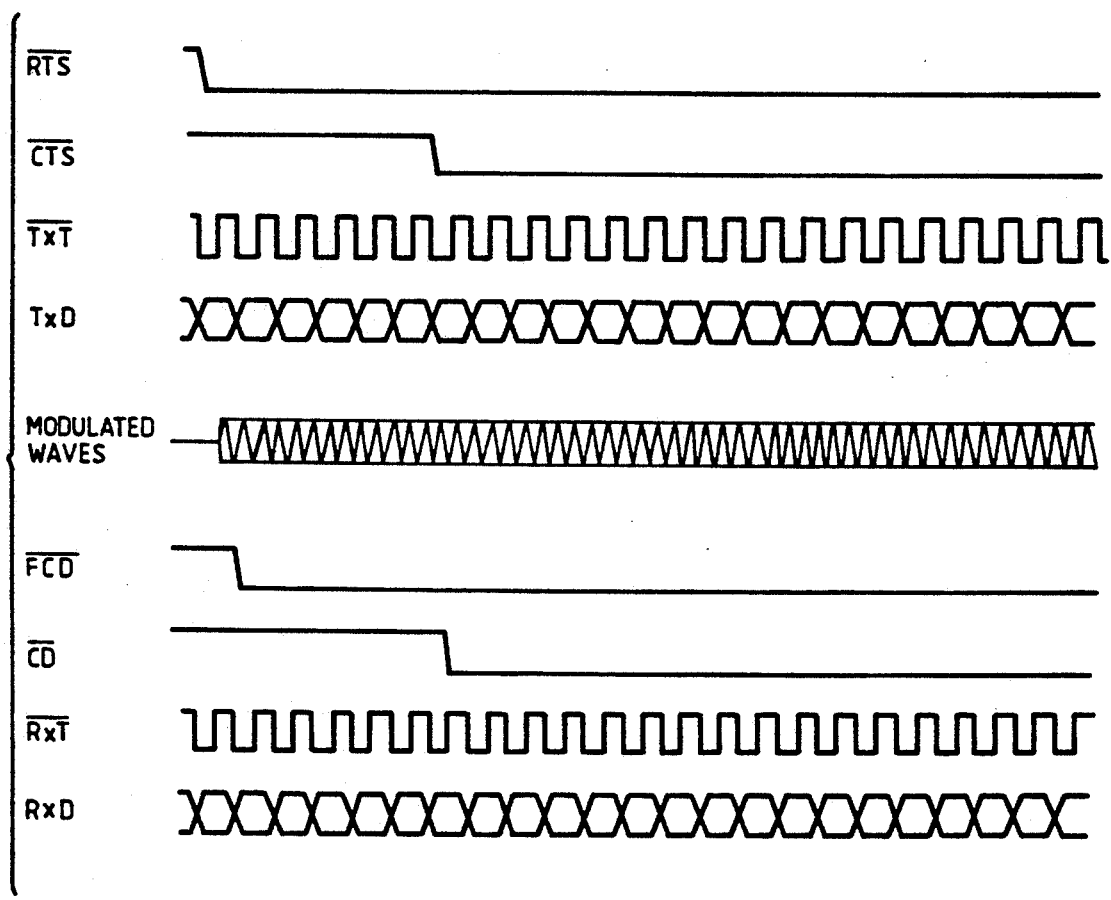
FIG. 47 is a timing chart for explaining the operations of a serial data transfer of FIG. 46.
Figure 48:
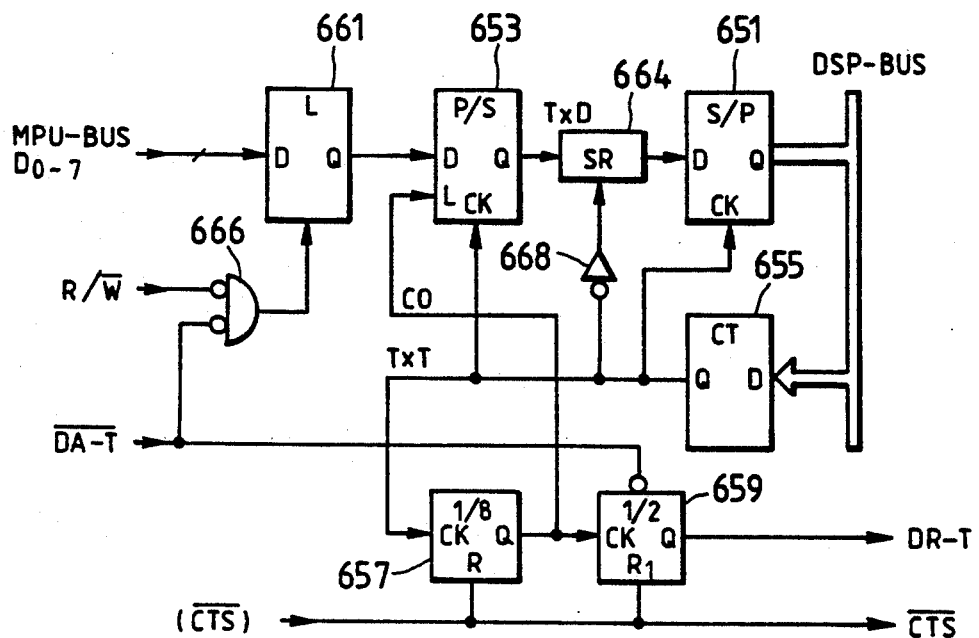
FIG. 48 is a block diagram showing the structure of the sending operations of FIG. 46.
Figure 49:
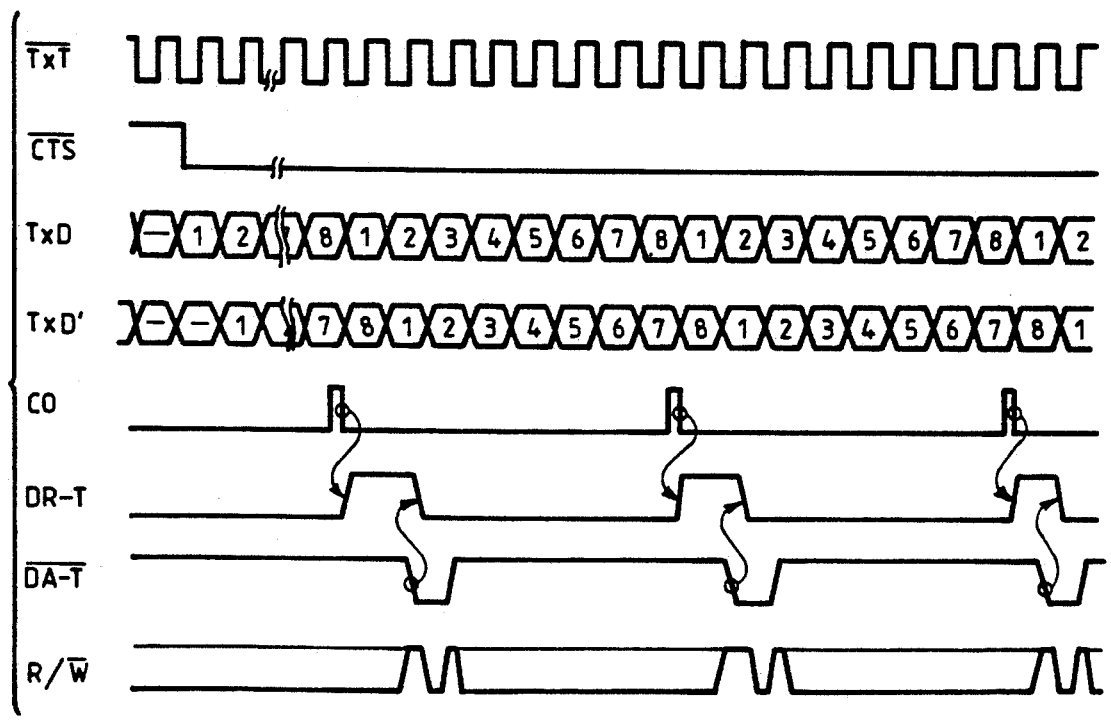
FIG. 49 is a timing chart for explaining the sending operations of FIG. 48.
Figure 50:
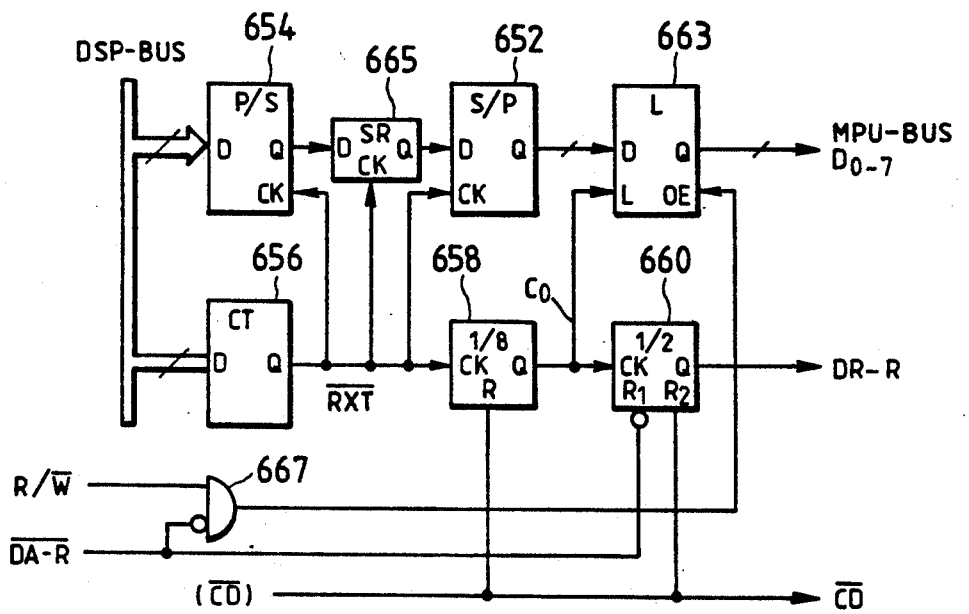
FIG. 50 is a block diagram showing the structure of the receiving and sending operations of FIG. 46.
Figure 51:
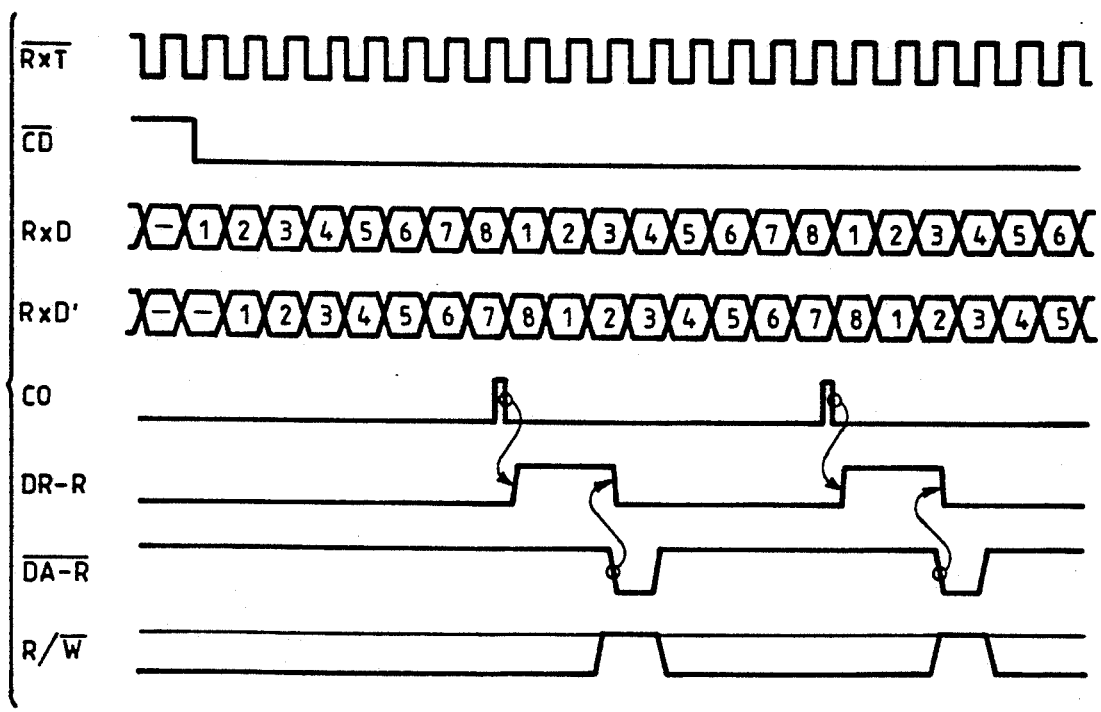
FIG. 51 is a timing chart for explaining the receiving operations of FIG. 50.

FIG. 44 is a block diagram functionally expressing a further embodiment of the present invention. FIG. 45 is a block diagram schematically showing the embodiment of the present invention. FIG. 46 is a block diagram showing the detail of the SP-I/F of FIG. 45. FIG. 47 is a timing chart for explaining the operations when in the serial data transfer of FIG. 46. FIG. 48 is a block diagram showing the structure when in the sending operations of FIG. 46. FIG. 49 is a timing chart for explaining the sending operations of FIG. 48. FIG. 50 is a block diagram showing the structure when in the receiving operations of FIG. 46. FIG. 51 is a timing chart for explaining the receiving operations of FIG. 50. In FIGS. 44 and 45: reference numerals 605 and 606 designate serial-parallel conversion means; numerals 607 to 609 change-over switches; numeral 620 a digital signal processor (which will be shortly referred to as "DSP"); numeral 630 an analog signal processor (which will be shortly referred to as "ASP"); Numeral 640 a sample timer; numeral 650 a serial-parallel interface (which will be shortly referred to as "SP-I/F"); and the remaining reference numerals designate the same components as those of FIGS. 1 and 2. The embodiment of the MODEM according to the present invention is constructed, as shown in FIG. 44, of: control means 602; modulation means 603; demodulation means 604; an A-I/F for controlling the connections with the communication lines; the MPU-I/F and V.24-I/F/P-I/F-T for connections of the DTE; the series-parallel conversion means 605 and 606 connected with the MPU-I/F and the modulation and demodulation means 603 and 604; and the change-over switches 607 to 609 for acting as the interface V.24-I/F/P-I/F-T. In order to perform the aforementioned functions of the embodiment of the present invention, the MODEM 601 of this embodiment is composed, as shown in FIG. 45, of the DSP 620, the ASP 630 for signal conversions between the digital and analog signals, the sample timer 640 for generating the processing timing signal of the analog signal in the ASP 630, and the SP-I/F 650 for supporting the serial data transfer and the parallel data transfer functions with the DTE. Moreover, most of the MODEM functions such as modulations, de-modulations or sequence controls are realized by the program of the DSP 620.

In the case of the sending operations of the MODEM 601 shown in FIG. 45, the not-shown DTE gives the operating conditions through the MPU-I/F to the MODEM 601 prior to the sending operation so that the MODEM 601 starts its operations to input the data in series or parallel through the SP-I/F 50. The DSP 620 modulates the data from the DTE to give the modulated result to the ASP 630. This ASP 630 sends the data to the communication lines through the A-I/F in response to the send timing signal Tst generated by the sample timer 640.

In the case of the receiving operations of the MODEM 601, this MODEM 601 starts its operations after it accepts the operating conditions from the DTE like the case of the sending operations. In response to the receive timing signal Rst issued by the sample timer 640, the ASP 630 receives the data from the A-I/F to convert the received analog signal to the digital signal and transfers the digital signal to the DSP 620. This DSP 620 demodulates this digital signal and transfers it in series or parallel through the SP-I/F 650.

In case the MODEM 601 accomplishes the full-dual operations, the aforementioned sending and receiving operations are executed in parallel.

FIG. 46 shows the detailed structure of the SP-I/F 650 of FIG. 45. This SP-I/F 650 is constructed such that serial-parallel conversion circuits (which will be shortly referred to as "S/P") 651 and 652, parallel-serial conversion circuits (which will be shortly referred to as "P/S") 653 and 654, variable frequency-division counters (which will be shortly referred to as "CT") 655 and 656, ⅛ frequency division counters (which will be shortly referred to as "⅛CT") 657 and 658, ⅛ frequency division counters (which will be shortly referred to as "⅛CT") 659 and 660, latches 661 to 663, one-bit shift registers (which will be shortly referred to as "SR") 664 and 665, AND circuits (which will be shortly referred to as "AND") 666 and 667, an inverter (which will be shortly referred to as "INV") 668, and change-over switches (which will be shortly referred to as "SW") 670 to 673 are connected, as shown. The SW 670 to 673 shown in FIG. 46 are shown in the state of the parallel data transfer and have their contacts inverted to take a serial data transfer mode.

In the serial data transfer mode, the signals shown in FIG. 47 are fed to the individual output terminals of the MODEM 601 shown in FIG. 46. First of all, the DTE at the send side gives the send request signal $\overline{RTS}$ to the MODEM 601 through the MPU-I/F. In response to this signal, the MODEM 601 sends the training signal and outputs the sendable signal $\overline{CTS}$ to inform the DTE of the fact that the send data can be inputted. The send timing signal TXT is generated by the CT 655 and sent through the switch 671 to the DTE and through the SP 651 and the INV 668 to the SR 664. If the DTE inputs the send data TXD varying with the fall of the send timing signal TXT, the send data TXD are inputted to the S/P 651 and converted to the parallel data. The DSP 620 counts the number of parallel bits according to the program and reads out the content of the S/P 651 through the DSP-BUS when the counted number reaches a predetermined number, so the send data necessary for the modulations can be attained. This parallel data is modulated by the DSP 620 through the ASP 630 and A-I/F to the analog signal shown as the modulated signals in FIG. 47 so that it is sent out to the transmission lines and received by the MODEM of the system at the receiving side.

If the MODEM 601 shown in FIGS. 45 and 46 receives the analog signal through the A-I/F, the received data is fed through the ASP 630 and demodulated by the DSP 620. At first, the DSP 620 outputs the received signal detection signal $\overline{FCD}$ informing the reception of modulated waves to the DTE through the MPU-I/F and receives the training signal from the DTE. When the training is finished, the DSP 620 outputs the received carrier detection signal $\overline{CD}$ through the latch 662 and sends out the demodulated received data in series to the DTE through the DSP-BUS, the P/S 654, the SR 665 and the SW 673. The receive timing signal RXT for these operations is generated by the CT 656 and is distributed to the internal circuit and outputted to the DTE through the SW 672.

In the case of the data transfer in parallel between the DTE and the MODEM, the individual SW 671 to 673 shown in FIG. 46 take the positions, as shown. The sending operations in this case are accomplished at the timings shown in FIG. 49 with the circuits in the MODEM 601 being connected, as shown in FIG. 48. The reference characters appearing in FIG. 48 are identical to those of FIG. 46.

Prior to the sending operation, the DTE gives such operating conditions from the MPU-I/F to the MODEM 601 as will inform the latch 662 shown in FIG. 46 of the send mode (PT) by the parallel data transfer. After this, the DTE turns ON the not-shown send request signal $\overline{RTS}$ to send out the training signal. After having accepted the send request signal $\overline{RTS}$ and the training signal from the DTE, the MODEM 601 sends out the sendable signal $\overline{CTS}$ to the DTE like the aforementioned case to start the operations. In the MODEM 601, in response to the sendable signal CTS to the DTE, the resetting of the ⅛CT 657 and ⅛CT 659 is released so that the ⅛CT 657 first counts the send timing signals TXT. When the ⅛CT 657 counts eight TXTs, the ⅛CT 659 operates to send its output as the parallel data transfer request signal DR-T to the not-shown DTE. Upon reception of this parallel data send request signal DR-T, the DTE gives the MODEM 601 both the reference indication signal $\overline{DA\text{-}T}$ for accessing the write latch 661 of the send data and the read/write timing signal R/$\overline{W}$ for the MODEM 601 to write the send data of 8 bits in parallel in the latch 661 from the MPU-I/F. The parallel data transfer request signal DR-T is reset in response to the fall or L-level of the reference indication signal $\overline{DA\text{-}T}$. If the ⅛CT 657 further counts eight send timing signals TXT, the carry-out signal CO is outputted to request the DTE for the transfer of the subsequent eight-bit data. Simultaneously with this, the preceding send data is transferred from the latch 661 to the P/S 653. Since, the send timing signal TXT is fed to the P/S 653 and S/P 651 and SR 664, the send data in the P/S 653 is fed in series to the S/P 651 in response to the send timing signal TXT so that it is converted again to parallel data, which is then transferred for modulations to the DSP 620. The reason why the send data is converted from parallel to serial by the P/S 653 and converted again to the parallel data by the S/P 651 is to cope with the fact that the bit number requested for each modulation by the high-speed MODEM changes as 1, 2, 3 and 4 bits with the speed or modulation type of the MODEM although the MPU-I/F between the DTE and the MODEM 601 transfers the parallel data having a width of 8 bits. In FIG. 49, letters TXD' designate the content of the input side register in the S/P 651. As shown in FIG. 49, the MODEM 601 requests the DTE for the parallel data transfer in response to the first carry-out signal CO from the ⅛ CT 657 and starts the serial data transfer between the P/S 653 and the S/P 651 in response to the second carry-out signal CO so that the data is inputted to the S/P 651 which can be introduced into the DSP 620. This DSP 620 has a function to predetermine the timing, at which the sendable signal $\overline{CTS}$ is to be outputted, in accordance with the timing at which the training is ended.

In case the MODEM 601 receives the data through the transmission line and transfers them in parallel to the DTE, the SP-I/F 650 is connected, as shown in FIG. 50, to operate in accordance with the timings shown in FIG. 51. The reference characters appearing in FIG. 50 are identical to those of FIG. 46.

When the MODEM 601 receives the analog signal, the DSP 620 informs the DTE of the reception of modulated waves, as has been described with reference to FIG. 46. Before acceptance of the received signal, the DTE gives the operating conditions, under which the receive mode (PR) by the parallel data transfer is to be outputted to the latch 662 shown in FIG. 46, through the MPU-I/F to bring the MODEM 601 into the receive state. Then, the MODEM 601 receives the actual signals through the A-I/F to end the training, and then starts the data transfer to the DTE. First of all, the DSP 620 turns ON the receive carrier detection signal $\overline{CD}$ and, simultaneously with this, writes the receive data of plural bits in the P/S 654 through the DSP-BUS. The receive timing signal RXT is fed to not only the P/S 654 and the S/P 652 but also the SR 665 connecting the former. As a result, the receive data set in the P/S 654 is once converted into the serial data RXD and fed to the S/P 652, in which it is converted again to the parallel data. The $\frac{1}{8}$CT 658 and the $\frac{1}{8}$CT 660 start the counting operations of the receive timing signals RXT simultaneously as the receive carrier detection signal $\overline{CD}$ is turned ON. When the receive data RXD of 8 bits is stored in the S/P 652, the $\frac{1}{8}$CT 658 outputs the carry-out signal CO. This carry-out signal CO transfers the receive data of 8 bits in the S/P 652 to the latch 663 and drives the $\frac{1}{8}$CT 660 to output the data transfer request signal DR-R to the DTE. This DTE accesses the latch 663 like the case of the sending operation through the MPU-I/F, when it detects that data transfer request signal DR-R, and reads out its content in parallel. Incidentally, the data transfer request signal DR-R is reset in response to the fall or the L-level of the reference indication signal $\overline{DA\text{-}R}$ for accessing the read latch 663 of the receive data.

According to the embodiment described above, the terminals to be used for the serial data transfer between the MODEM and the DTE are commonly used as the terminals for the timing signals for the parallel data transfer. As a result, the using efficiency of the terminals can be improved, and the DSP can accomplish the parallel transfer with the soft processing, which is hardly different from that of the case of the ordinary serial data transfer, by switching to the parallel data transfer mode prior to the start of the operations of the MODEM. Thus, the MODEM having its hardware and software well balanced can be realized merely by adding a small number of internal circuit components and the switching means.

Figure 52:
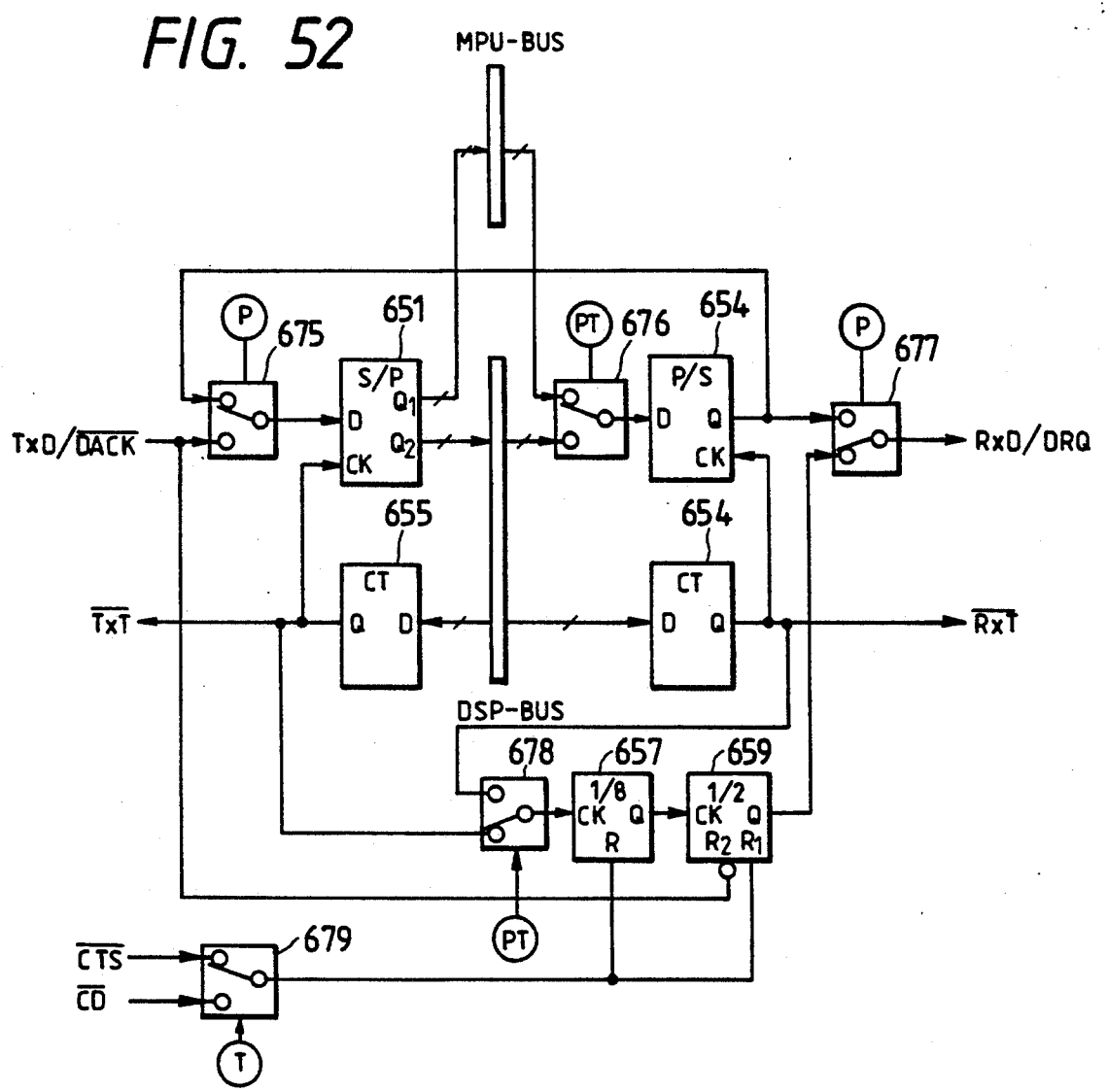
FIGS. 52, 53, 54 and 56 are block diagrams showing other embodiments of the present invention.

FIG. 52 is a block diagram showing the structure of the SP-I/F according to a further embodiment of the present invention. This SP-I/F is applied to the half-dual high-speed MODEM. In FIG. 52, reference numerals 675 and 676 designate change-over switches, and the remaining reference characters designate components identical to those of FIG. 46.

Generally speaking, the high-speed MODEM takes a modulation type, in which the modulations are accomplished discretely to modulate a plurality of data for one signal point. Thus, the MODEM is equipped with serial-parallel conversion means for transmitting a plurality of bits in parallel. According to the embodiment of the present invention shown in FIG. 52, the MODEM is constructed like that of FIG. 46 except that the serial-parallel conversion means belonging intrinsically to the MODEM for data transmissions with the transmission lines is enabled to act as the serial-parallel conversion means to be interfaced with the DTE by making use of the fact that the serial-parallel conversion means at the receive side and at the send side are not used in the sending and receiving operations, respectively. The terminals and the internal structures can be switched between the serial data transfer and the parallel data transfer in response to the switch signal P and the transmission switching signal PT. Thus, it is possible to improve the using efficiency of the terminals better and to make the circuit structure economical.

Figure 53:
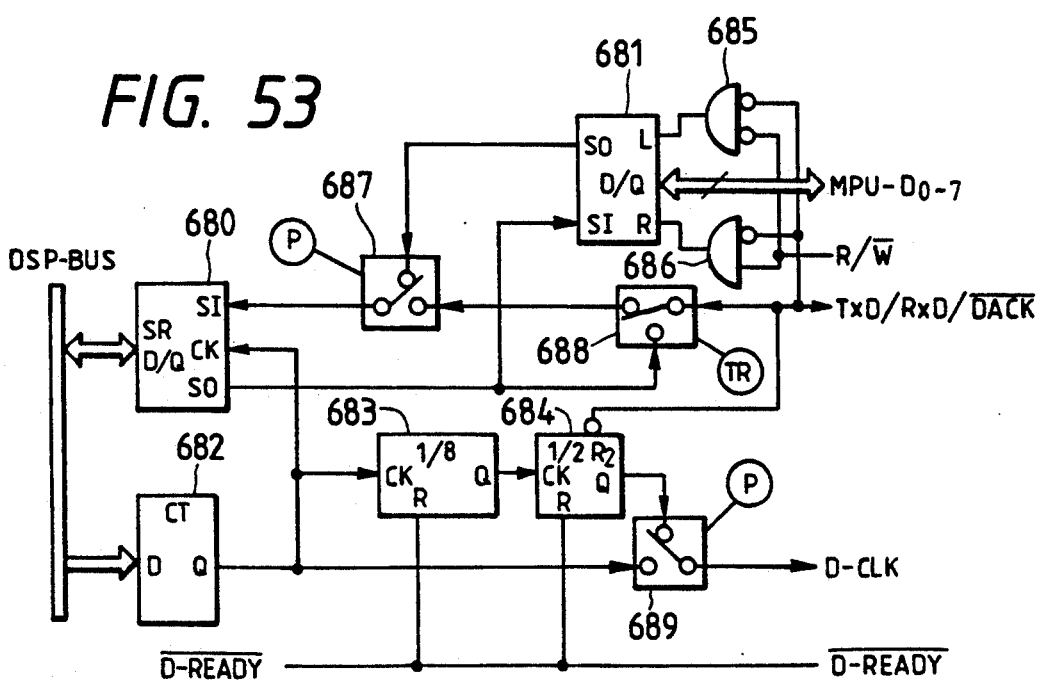

FIG. 53 shows a further embodiment of the present invention and is a block diagram showing the structure SP-I/F, in which the present invention is applied to the half-dual high-speed MODEM. In FIG. 53: reference numerals 680 and 681 designate parallel in/out shift registers; numeral 682 a bit counter; numeral 683 a $\frac{1}{8}$CT; numeral 684 $\frac{1}{8}$CT; numerals 685 and 686 AND circuits; and numerals 687 to 689 change-over switches. This embodiment is constructed like that of FIG. 46 but for the half-dual MODEM so that it can make effective use of the terminals and the internal circuit elements and is economical.

Figure 54:
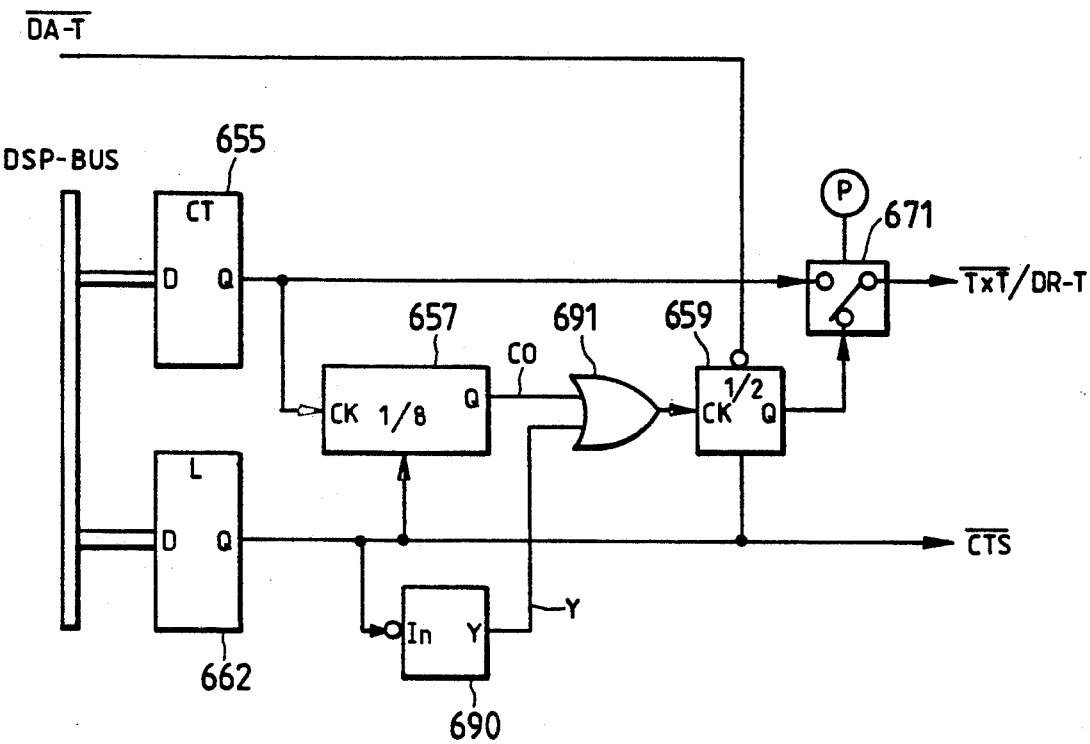
Figure 55:
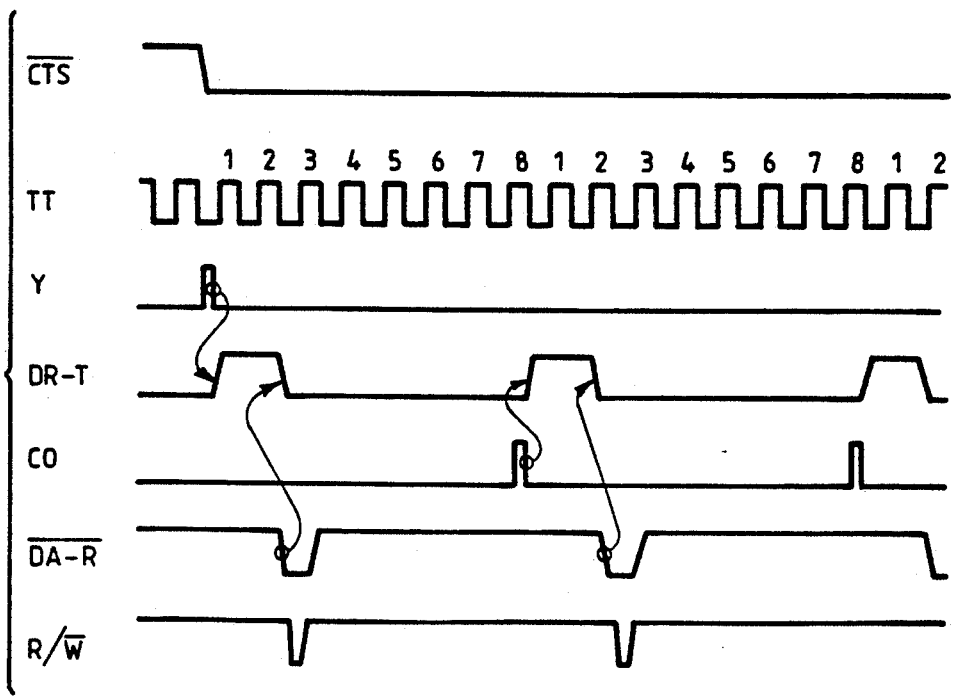
FIGS. 55 and 57 are timing charts for explaining the operations of FIGS. 54 and 56, respectively.

FIG. 54 is a block diagram showing a block diagram showing a further embodiment of the present invention. This embodiment of FIG. 54 is different from that shown in FIG. 46 in that it is additionally equipped with an edge detector 690 and an OR circuit 691. The operations of this embodiment will be described with reference to the time chart of FIG. 55.

When the training is ended, the MODEM 601 sends out the data transferable signal $\overline{CTS}$ from the latch 662 to the DTE. This data transferable signal is fed to the edge detector 690 in the MODEM 601, too, so that its fall is detected. This detected signal Y of the edge detector 690 drives the $\frac{1}{8}$CT 659 so that the parallel data send request signal DR-T is sent out to the DTE. If the DTE receives that parallel data send request signal DR-T to effect the transfer of the parallel data, the parallel data transfer request signal DR-T is reset like the case of FIG. 49 in response to the reference indication signal $\overline{DA\text{-}T}$ for accessing the write latch of the send data. After the data transferable signal $\overline{CTS}$ is enabled, the $\frac{1}{8}$CT 657 counts eight send timing signals TXT. Then, the $\frac{1}{8}$CT 657 outputs the carry-out signal CO to request the subsequent data transfer.

As compared with the embodiments of FIGS. 48 and 49, the embodiment under discussion has an advantage that the DTE can quicken the data transfer timing and accordingly the starting timing of the processing in the DSP 620.

Figure 56:
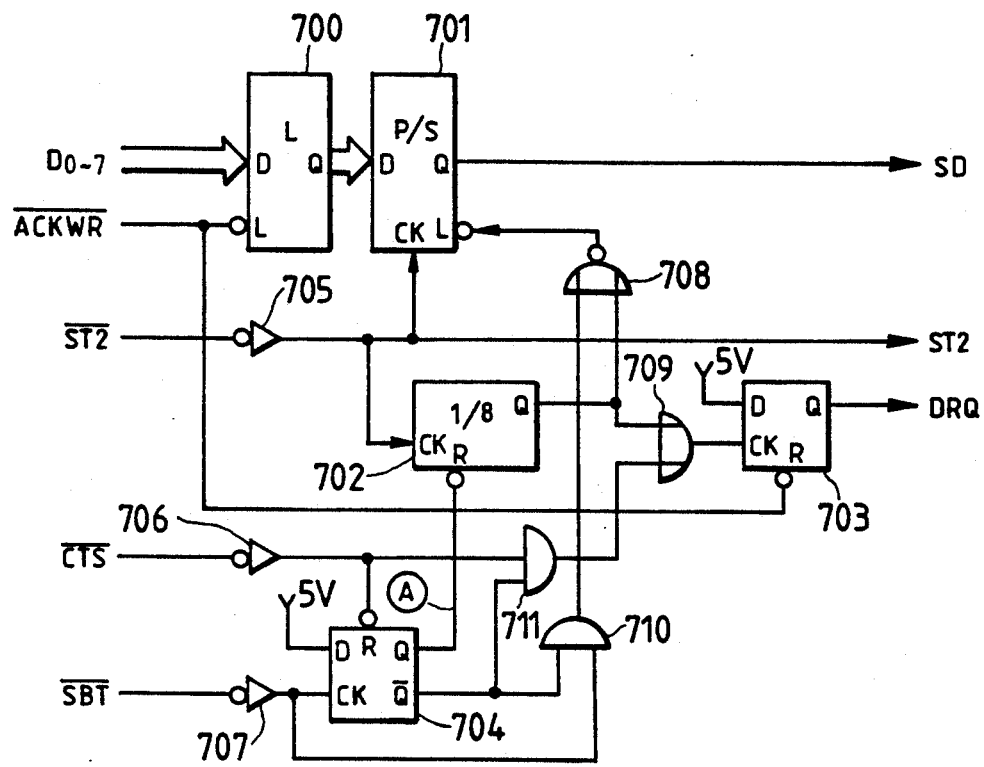
Figure 57:
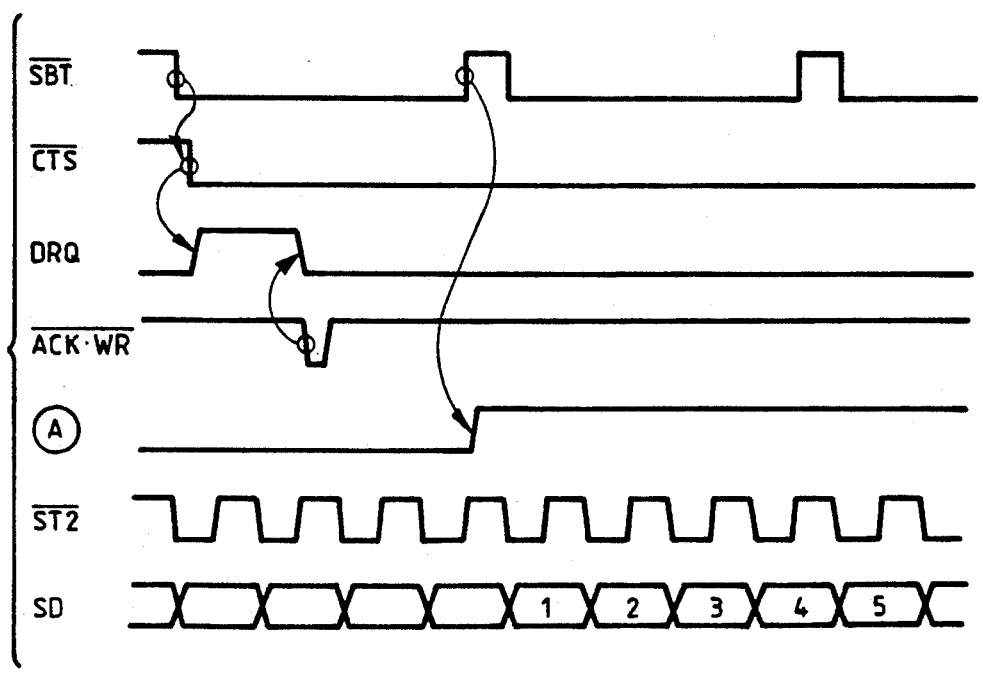

FIG. 56 is a block diagram showing a further embodiment of the present invention and a circuit diagram, in which the timings of the first DMA request and serial transfer in the parallel transfer mode are improved. In FIG. 56: reference numeral 700 designates a 8-bit latch; numeral 701 a P/S; numeral 702 a $\frac{1}{8}$CT; numerals 703 and 704 flip-flops; numerals 705 to 707 INVs; numeral 708 a NOR circuit; numeral 709 an OR circuit; and numerals 710 and 711 AND circuits. The operations of this embodiment will be described with reference to the time chart shown in FIG. 57.

In this embodiment, for executions of the signal processing, the MODEM 601 falls the data transferable signal $\overline{CTS}$ and sends it out to the DTE two symbol intervals before the timing at which the data is actually required. This fall of the data transferable signal is accomplished after the fall of the baud timing signal SBT. Thus, when the data transferable signal $\overline{CTS}$ is at the "H" level, the $\overline{Q}$ output of the flip-flop 704 is at the "H" level. As a result, when the data transferable signal $\overline{CTS}$ falls, the Q output of the flip-flop 703 falls so that the DMA data transfer request signal DRQ is fed out to the DTE. In response to the "H" level of the DMA data transfer request signal DRQ, the DTE transfers the send data in parallel to the 8-bit latch 700 while using the $\overline{\text{ACKWR}}$ signal as the timing signal and writes in them. The flip-flop 703 is reset with that write timing signal $\overline{\text{ACKWR}}$ so that the DMA data transfer request signal DRQ is set at the "L" level. At this time, the ↓CT 702 is in its reset status and is inoperative because it is connected with the Q output of the flip-flop 704. When the next baud timing signal SBT rises to the "H" level, the output of the AND circuit 710 takes the "H" level, and the output of the NOR circuit 708 is held at the "L" level while the baud timing signal $\overline{\text{SBT}}$ is at the "H" level, so that the content of the latch 700 is transferred to the P/S 701. When the baud timing signal $\overline{\text{SBT}}$ falls to the "L" level, the flip-flop changes its Q output to the "H" level and its $\overline{\text{Q}}$ output to the "L" level. As a result, the ↓CT 702 is rendered operative so that the AND circuits 110 and 111 prohibit the restart of the DMA data transfer request signal DRQ in response to the data transferable signal $\overline{\text{CTS}}$ and the baud timing signal $\overline{\text{SBT}}$ and the data transfer from the latch 700 to the P/S 701.

Thus, this embodiment of the present invention has an effect that the first data transfer from the P/S 701 can be synchronized with the timing of the baud timing signal $\overline{\text{SBT}}$. In other words, the present embodiment has an effect that the initial start of the DMA transfer and the baud timing of the MODEM can be synchronized by the action of the flip-flop 704.

According to the present invention, the MODEM is constructed of and controlled by the macro-instruction input means, the response output means, the macro-instruction interpreting and executing means and the macro-instructions. Thus, there can be attained an effect that the structure and the control of the MODEM can be made simple and economical but also easy to handle.

Moreover, the MODEM of high function and performance can be realized by combining the macro-instructions.

According to the present invention, still moreover, the serial data transferring terminals of the MODEM of the prior art and the terminals for the timing signals for parallel data transfer can be commonly used to raise an effect the using efficiency of the terminals can be improved to an econimical level. Since, moreover, the series-parallel conversion means owned by the MODEM of the prior art is utilized for making the data parallel, the circuit structure can be made economical.

What is claimed is:

1. A modulator-demodulator apparatus comprising: accepting means for receiving a macro-instruction, including an execution control instruction and a mode setting instruction, from an external source for controlling operations in the modulator-demodulator apparatus; means for interpreting said macro-instruction received by said accepting means; operating means for performing at least one of modulations and demodulations; and control means for controlling said operating means in response to said interpreted macro-instruction; wherein said macro-instruction further includes a direct memory access instruction (DMA) capable of referring to or altering the content of an internal memory or a register.

2. A modulator-demodulator apparatus according to claim 1, wherein said accepting means includes a macro-instruction input register; and further including a response register connected to receive an output of said interpreting means and an internal status register for indicating the status of said operating means; said control means including a digital signal processor, an analog serial interface, and a digital serial interface circuit interconnected by a system bus.

3. A modulator-demodulator apparatus according to claim 1, wherein said macro instruction further includes a start/stop instruction (CTL) for starting and stopping said modulations and demodulations.

4. A modulator-demodulator apparatus comprising: accepting means for receiving a macro-instruction, including a start/stop instruction (CTL) for starting and stopping modulations and demodulations, from an external source for controlling operations in the modulator-demodulator apparatus; means for interpreting said macro-instruction received by said accepting means; operating means for performing at least one of modulations and demodulations; and control means for controlling said operating means in response to said interpreted macro-instruction; wherein said macro-instruction further includes a set up instruction (STP) for initially setting the operation mode and parameters corresponding to the content of said mode setting instruction into the memory or register within a MODEM, even before said start/stop instruction (CTL) is received.

5. A modulator-demodulator apparatus according to claim 4, wherein the operation modes and/or processing parameters of said modulations and demodulations are altered in response to a direct memory access instruction after a set up instruction (STF) has been received.

6. A modulator-demodulator apparatus according to claim 4, wherein said set up instruction (STP) is rendered ineffective when a MODEM is set in a signal processing status in response to said start/stop instruction (CTC).

7. A modulator-demodulator apparatus according to claim 4, wherein said set up instruction (STP) is executed only in response to a mode setting instruction different from that in a previous set up operation.

8. A modulator-demodulator apparatus comprising: accepting means for receiving a macro-instruction, including a start/stop instruction (CTL) for starting and stopping modulations and demodulations, from an external source for controlling operations in the modulator-demodulator apparatus; means for interpreting said macro-instruction received by said accepting means; operating means for performing at least one of modulations and demodulations; and control means for controlling said operating means in response to said interpreted macro-instruction; wherein said macro-instruction further includes a mode setting instruction and wherein said mode setting instruction is rendered ineffective when said modulation or demodulation has been started by said start/stop instruction (CTL).

9. A modulator-demodulator apparatus comprising: accepting means connected to receive a macro-instruction, including a start/stop instruction (CTL) for starting and stopping modulations and demodulations, from an external source to be used for controlling modulator-demodulator operations; means for interpreting said macro-instruction received by said accepting means; operating means for performing at least one of modulation and demodulation on data signals; and control means for controlling the functioning of said operating means in response to said interpreted macro-instruction; wherein said macro-instruction includes a set up instruction (STP) for initially setting the operation modes and parameters corresponding to the content of a mode setting instruction into the memory or register within a MODEM, even before said start/stop instruction (CTL) is received.

10. A modulator-demodulator apparatus according to claim 9, wherein said macro-instruction further includes an execution control instruction and a mode setting instruction.

11. A modulator-demodulator apparatus according to claim 10, wherein said macro instruction includes a direct memory access instruction (DMA) capable of referring to or altering the content of an internal memory or a register.

12. A modulator-demodulator apparatus according to claim 9, wherein the operation modes and/or processing parameters of said modulations and demodulations are altered in response to a direct memory access instruction after a set up instruction (STP) has been received.

13. A modulator-demodulator apparatus according to claim 10, wherein a mode setting instruction is rendered ineffective when said modulation or demodulation has been started by said start/stop instruction (CTL).

14. A modulator-demodulator apparatus according to claim 9, wherein said set up instruction (STP) is rendered ineffective when a MODEM is set in a signal processing status in response to said start/stop instruction (CTC).

15. A modulator-demodulator apparatus according to claim 9, wherein said set up instruction (STP) is executed only in response to a mode setting instruction different from that in a previous set up operation.

16. A modulator-demodulator apparatus, comprising:
memory means for storing a macro-instruction; and
a modulator-demodulator apparatus formed over a single semiconductor substrate, and including accepting means for receiving a macro-instruction, including a start/stop instruction (CTL) for starting and stopping modulations and demodulations, from an external source for controlling operations in the modulator-demodulator system; means for interpreting said macro-instruction; operating means for performing at least one of modulations and demodulations on data signals; control means for controlling said operating means in response to said interpreted macro-instruction; and outputting means for outputting a response to said macro-instruction;
wherein said macro-instruction includes a set up instruction (STP) for initially setting the operation modes and parameters corresponding to the content of a mode setting instruction into the memory or register within a MODEM, even before said start/stop instruction (CTL) is received.

17. A modulator-demodulator apparatus according to claim 16, wherein said accepting means includes a macro-instruction input register; and further including a response register connected to receive an output of said interpreting means and an internal status register for indicating the status of said operating means; said control means including a digital signal processor, an analog serial interface, and a digital serial interface circuit interconnected by a system bus.

18. A modulator-demodulator system according to claim 16, wherein said macro-instruction includes an execution control instruction and a mode setting instruction.

19. A modulator-demodulator system according to claim 18, wherein said macro instruction further includes a direct memory access instruction (DMA) capable of referring to or altering the content of an internal memory or a register.

20. A modulator-demodulator system according to claim 16, wherein the operation modes and/or processing parameters of said modulations and demodulations are altered in response to a direct memory access instruction after a set up instruction (STP) has been received.

21. A modulator-demodulator system according to claim 18, wherein a mode setting instruction is rendered ineffective when said modulation or demodulation has been started by said start/stop instruction (CTL).

22. A modulator-demodulator system according to claim 16, wherein said set up instruction (STP) is rendered ineffective when a MODEM is set in a signal processing status in response to said start/stop instruction (CTL).

23. A modulator-demodulator system according to claim 16, wherein said set up instruction (STP) is executed only in response to a mode setting instruction different from that in a previous set up operation.

24. A modulator-demodulator system according to claim 16, including means for receiving said macro-instruction from said memory means along a path which is different from that on which data is transmitted.

25. A modulator-demodulator apparatus comprising: accepting means including a macro-instruction input register connected to receive macro-instructions from an external source for controlling modulator-demodulator operations; means for interpreting said macro-instructions received by said accepting means; a response register connected to receive an output of said interpreting means; operating means for performing at least one of modulation and demodulation on data signals; control means for controlling said operating means in response to the content of said response register; and an internal status register for indicating the status of said operating means; wherein said control means includes a digital signal processor, an analog serial interface, and a digital serial interface circuit interconnected by a system bus.

26. A modulator-demodulator apparatus comprising: accepting means connected to receive macro-instructions from an external source for controlling modulator-demodulator operations; means for interpreting said macro-instructions received by said accepting means; operating means for performing at least one of modulation and demodulation on data signals; and control means for controlling said operating means in response to said interpreting means; wherein said macro-instructions include a direct memory access instruction capable of rendering to or altering the content of an internal storage device in said operating means, a mode setting instruction and a set up instruction for initially setting the operation modes and parameters corresponding to the content of said mode setting instruction into said internal storage device.

27. A modulator-demodulator apparatus according to claim 26, further including means for rendering said mode setting instruction ineffective when said operating means has started a modulation or demodulation of data signals in response to said start/stop instruction, for rendering said set up instruction ineffective when said operating means is set in a signal processing status in response to said start/stop instruction and for executing said set up instruction only in response to a mode setting instruction different from that executed in a previous set up operation.

28. A modulator-demodulator system comprising:
a communication terminal device having a memory for storing a macro-instruction; and
a modulator-demodulator apparatus including modulation means for modulating data; demodulation means for demodulating data; an analog signal interface connected to a transmission line; a microcomputer bus interface connected to said communication terminal device to receive a macro-instruction from said memory; a serial data interface for rendering and receiving data; a digital signal processor; serial-parallel conversion means, including a serial-parallel conversion circuit disposed in common in said modulation means and said demodulation means, and connected to said microcomputer bus interface, said modulation means and said demodulation means for effecting serial-parallel conversion of data; and accepting means for storing a macro-instruction received via said microcomputer bus interface; means for interpreting said macro-instruction; and control means for controlling the functioning of said modulation means and said demodulation means in response to said interpreted macro-instruction; wherein an internal routine of said digital signal processor is software processed with respect to a sampling timing interruption; a terminal for receiving reference timing signal of said serial-parallel conversion means through said microcomputer bus interface and a terminal for receiving serial data at said serial data interface are formed as a common terminal, and a serial data timing signal and a parallel data timing signal commonly use the same terminal.

* * * * *